United States Patent [19]

Pelley et al.

[11] 4,455,621

[45] Jun. 19, 1984

[54] PROGRAMMABLE CONTROLLER WITH MULTIPLE FUNCTIONS

[75] Inventors: Michael S. Pelley, Willoughby Hills; David R. Rohn, Richmond Heights; Lawrence A. Komarek, Euclid; Raymond A. Grudowski, South Euclid, all of Ohio

[73] Assignee: Allen-Bradley Company, Milwaukee, Wis.

[21] Appl. No.: 328,428

[22] Filed: Dec. 7, 1981

Related U.S. Application Data

[63] Continuation-in-part of Ser. No. 241,723, Mar. 9, 1981, abandoned.

[51] Int. Cl.³ .................... G06F 5/00; G06F 15/46
[52] U.S. Cl. .................................................. 364/900
[58] Field of Search ... 364/200 MS File, 900 MS File, 364/136

[56] References Cited

U.S. PATENT DOCUMENTS 3,930,233  12/1975  Morley et al. .................. 364/900
4,303,990  12/1981  Seipp ............................... 364/900
4,307,447  12/1981  Provanzano et al. ............ 364/200

Primary Examiner—Thomas M. Heckler
Attorney, Agent, or Firm—Barry E. Sammons

[57] ABSTRACT

A programmable controller includes a memory which stores an I/O image table and a data table. An I/O scanner module updates the I/O image table with the status of I/O devices connected to the programmable controller. The processor executes a control program to perform logical and arithmetic operations on the data in the data table. Such operations may be performed on data of different types and any necessary data conversions are performed automatically. Also, such operations may be performed on entire data files without degrading the response time of the programmable controller.

10 Claims, 36 Drawing Figures

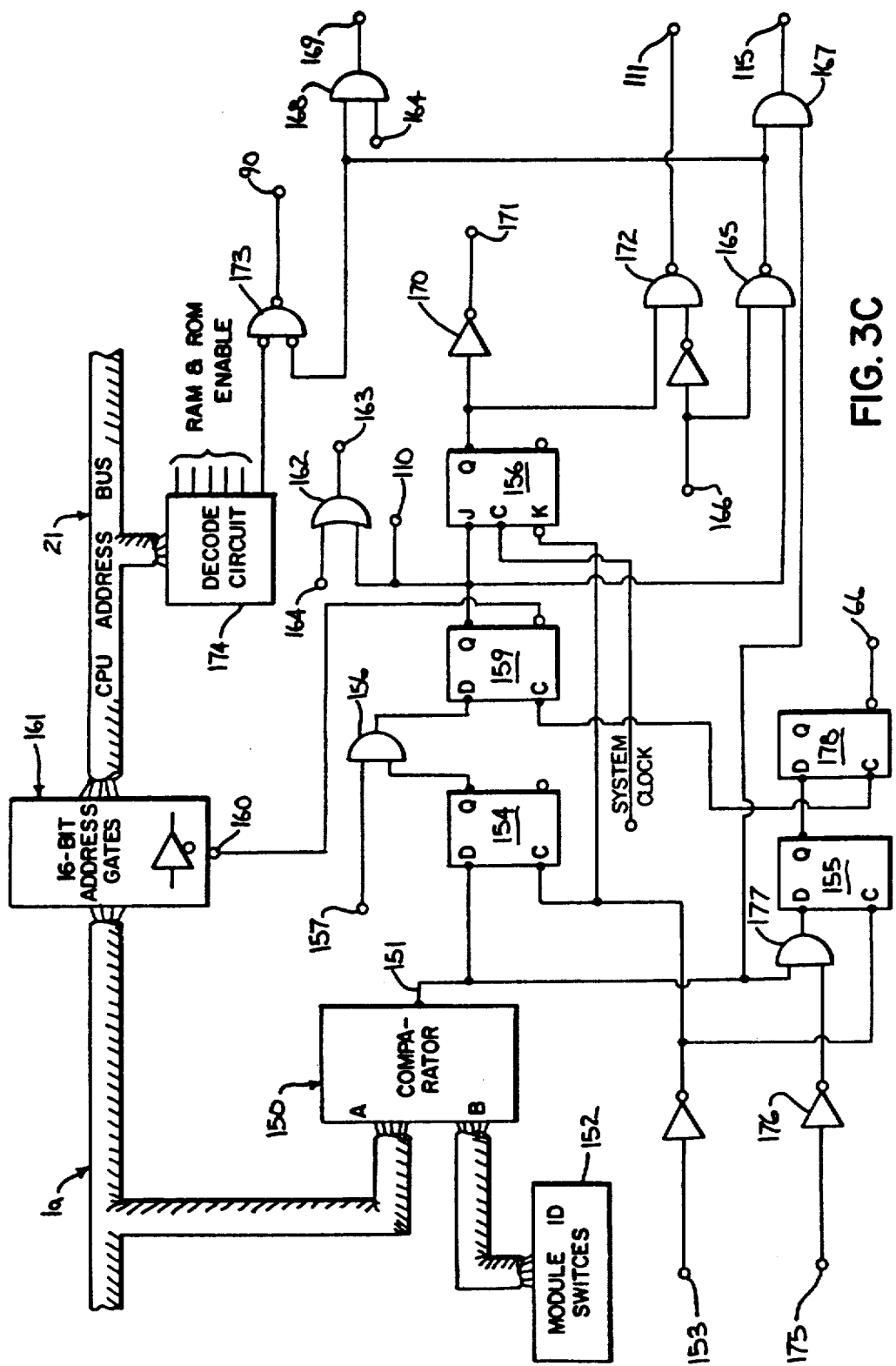

| FIELD DESCRIPTION | MICRO-SEQUENCER INSTRUCTION | SOURCE FOR JUMP | | ALU INTERNAL SOURCE | ALU FUNCTION | ALU INTERNAL DESTINATION | ALU RAM "B" ADDRESS | SOURCE FOR ALU PORT 27 | ALU Y PORT 30 DESTINATION | SOURCE FOR ALU PORT 28 | READ/ WRITE CONTROL | CARRY CONTROL |
|---|---|---|---|---|---|---|---|---|---|---|---|---|
| MICRO BIT NO. | 0 1 2 3 | 4 5 6 7 | 8 | 9 10 11 | 12 13 14 15 | 16 17 18 19 | 20 21 22 23 | 24 25 26 27 | 28 29 30 31 | 32 33 34 | 35 36 37 | 38 39 |
| 0 | JUMP 3 | PIPE | | R=A, S=B | | RAn | B REG. 0 | INSTR | NOP | NOP | NOP | ZER |
| 1 | CONT | ALU16 | | R=A, S=DB | S-R-1+Cn | RLn | B REG. 1 | INSTR | ASDR | NOP | HOLD | ONE |
| 2 | LOOP | MACRO | | R=A, S=Q | R-S-1+Cn | RAnQ | B REG. 2 | DATA | BACK L | NOP | BWH | ZFL |
| 3 | LOAD | NOP | | R=A, S=Q | R+S+Cn | RLnQ | B REG. 3 | RAM | FETH I | NOP | BRH | CAR |
| 4 | IMPOP | IVECT | | R=DA,S=B | S+Cn | SnP | B REG. 4 | BFLOP | BACKH | IMM | WRITE | |
| 5 | RET | ALU | | R=DA,S=DB | S+Cn | QR | B REG. 5 | BFLOP | FETCH | IMM | READ | |
| 6 | AGAIN | MAP | | R=DA,S=Q | R+Cn | Q | B REG. 6 | TIME | DATA | MASK | BACK W | |
| 7 | BACK | VECT | | R=DA,S=Q | R+Cn | SnQ | B REG. 7 | TIME | BACK D | NMASK | BACK R | |
| 8 | JUMP 2 | | | | LOW | L An | B REG. 8 | FLAGS | NOP | | | |
| 9 | VECT | | | | R AND S | L Ln | B REG. 9 | FLAGS | NOP | | | |
| A | CALL 2 | | | | R XNOR S | L An Q | B REG.10 | NOP | NOP | | | |
| B | PUSH | | | | R XOR S | LLn Q | B REG.11 | NOP | IRES | | | |
| C | JUMP | | | | R AND S | N | B REG.12 | NOP | SYST | | | |
| D | MAP | | | | R NOR S | QL | B REG.13 | NOP | TIME | | | |
| E | CALL | | | | R NAND S | X | B REG.14 | NOP | I MASK | | | |
| F | RESET | | | | R OR S | Sn | B REG.15 | NOP | I LOAD | | | |
| HEXADECIMAL VALUE OF MICROFIELD | | | | | | | | | | | | |

EXTERNAL ACCESS ENABLE (MACRO FLAG LATCH ENABLE)

OR ALU RAM "A" REGISTERS

| FIELD DESCRIPTION | CONDITION | IMMEDIATE DATA / TARGET ADDRESS |
|---|---|---|
| MICRO BIT NO | 40 41 42 43 | 44 45 46 47 48 49 50 51 52 53 54 55 |
| 0 | TRUE | |
| 1 | FALSE | |
| 2 | INTER | |
| 3 | NOP | |
| 4 | NOP | |
| 5 | NOP | |
| 6 | NOP | |
| 7 | NOP | |
| 8 | CARRY | |
| 9 | N CARR | |
| A | OVER | |
| B | N OVER | |
| C | MINUS | |
| D | PLUS | |
| E | ZERO | |
| F | N ZERO | |

HEXADECIMAL VALUE OF MICROFIELD

| ID WORD | | | |
|---|---|---|---|
| REMOTE ACCESS REQUEST COUNTER | | OUTPUTS RESET REQUEST COUNTER | |
| F1 | FREEZE COUNTER | F2 | SYNCHRONOUS FREEZE COUNTER |
| ON-LINE EDITING DATA | | | |
| REMOTE DEVELOPEMENT DATA | | | |
| MINOR FAULT FLAGS | | | |
| SYSTEM MAJOR FAULT FLAGS | | | |
| USER MAJOR FAULT FLAGS | | | |
| SYSTEM MODE DATA | | | |
| I/O PRESCAN COUNTER | | DESIRED CONTEXT | ACTUAL CONTEXT |
| | | | |
| CPU COMMAND DATA | | | |
| CPU WATCHDOG SET POINT | | CPU WATCHDOG HIGH VALVE | |
| SYSTEM COUNTER | | CPU WATCHDOG PRESENT VALVE | |
| YEAR | | | |
| MONTH | | | |
| DAY | | | |
| HOUR | | | |
| MINUTE | | | |
| SECOND | | | |
| REAL TIME CLOCK STATUS DATA | | | |

FIG.9A

ACCESS CONTROL BLOCK

| X | S | A | B | C |
|---|---|---|---|---|
| P | ACCESS COUNTER | | MSB OF POINTER | |
| LSB OF POINTER | | | | |
| | | | MSB OF SIZE | |
| LSB OF DATA SECTION SIZE | | | | |

FIG.9B

FIG.10A  RUNG CONTROL INSTRUCTIONS
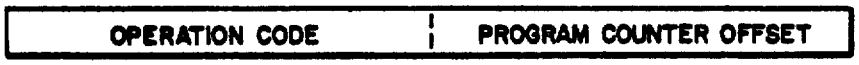
FIG.10B  PROGRAM CONTROL INSTRUCTIONS
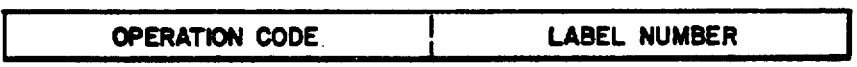
FIG.10C  TEST/CONTROL BIT INSTRUCTIONS
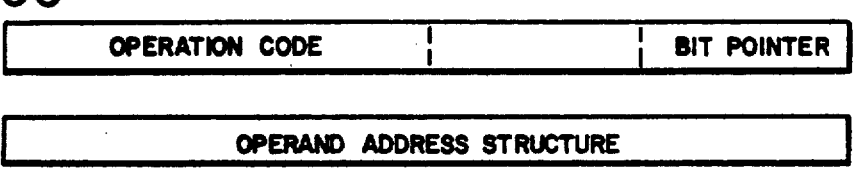
FIG.10D  TIMER/COUNTER INSTRUCTIONS
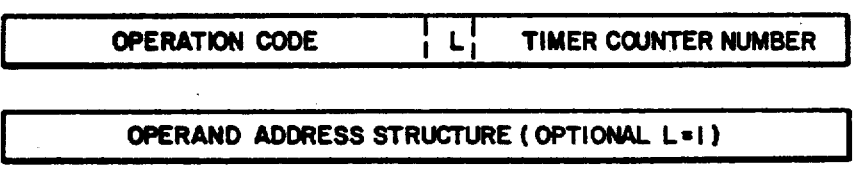
FIG.10E  ARITHMETIC/LOGIC INSTRUCTIONS
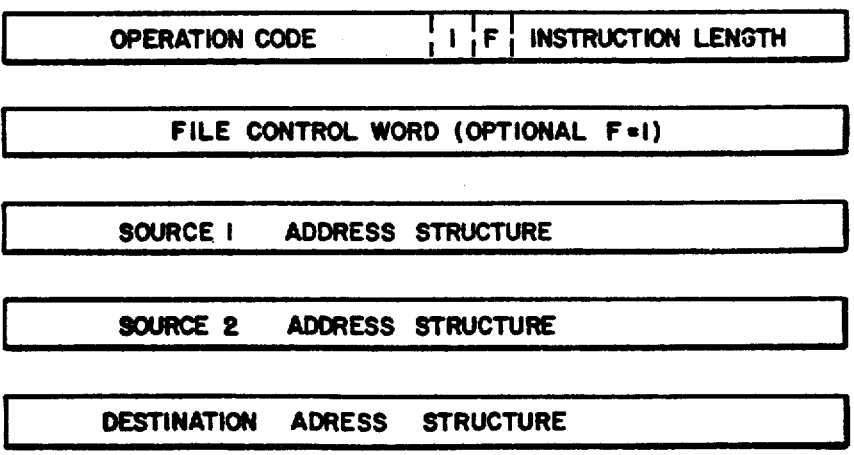

FIG.11  OPERAND ADDRESS STRUCTUE
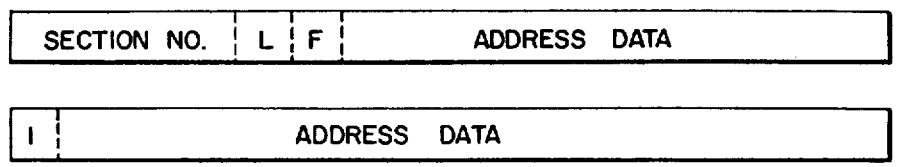
FIG.12  FILE CONTROL WORD STRUCTURES
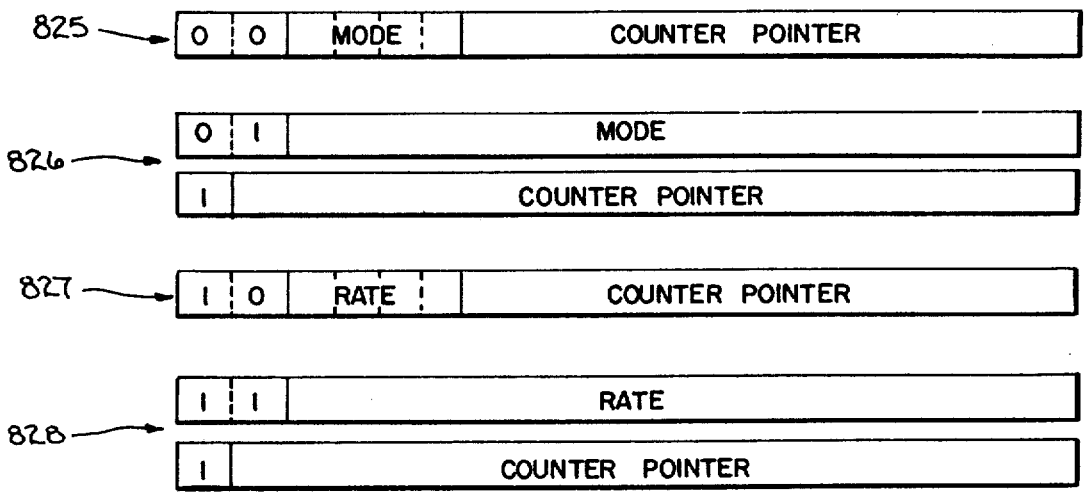
FIG.13  TIMER/COUNTER STRUCTURE
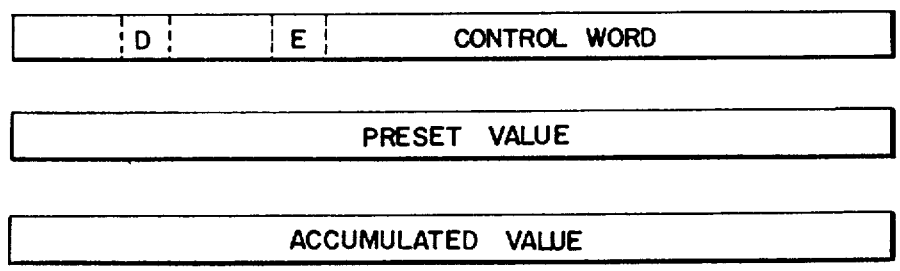

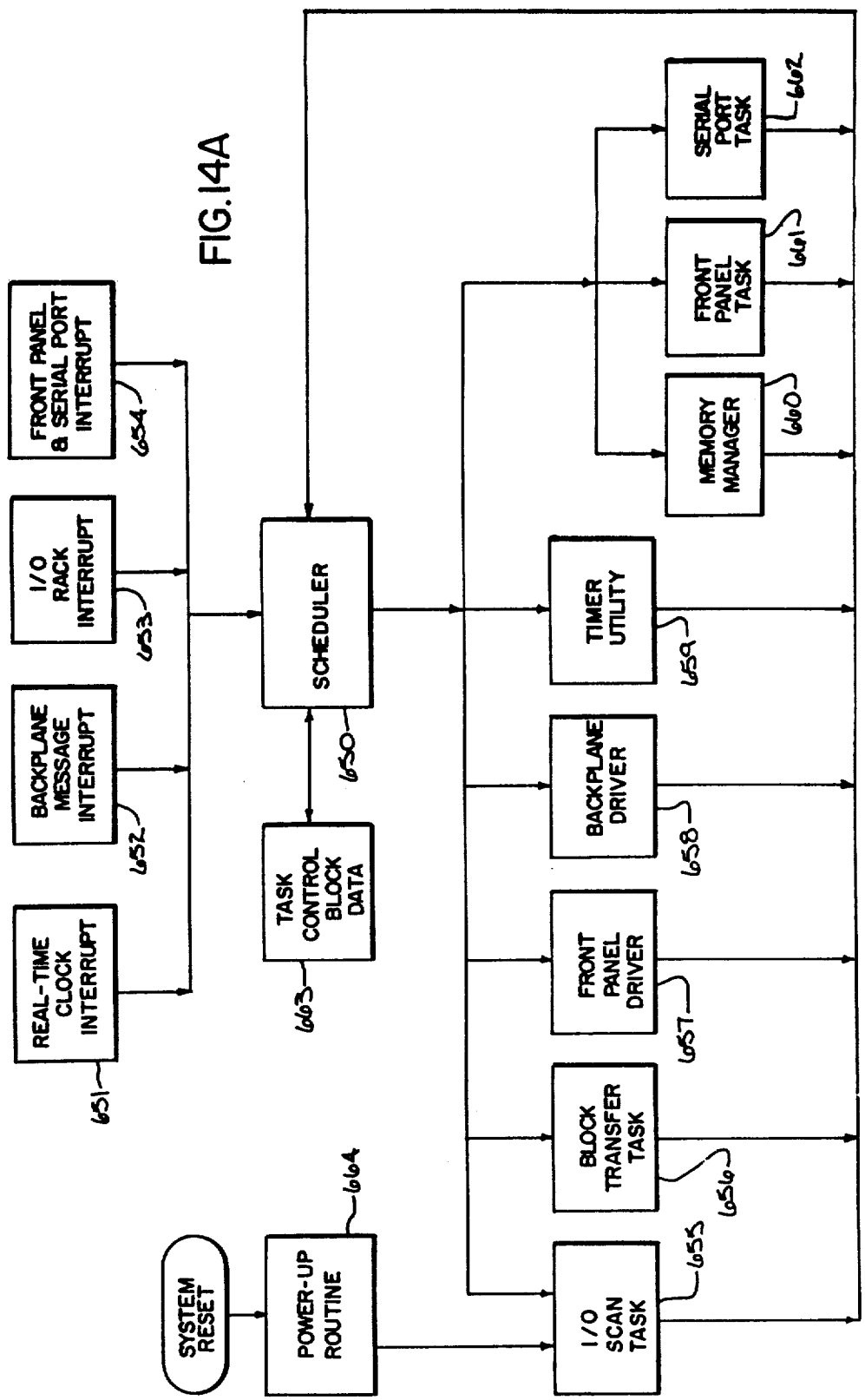

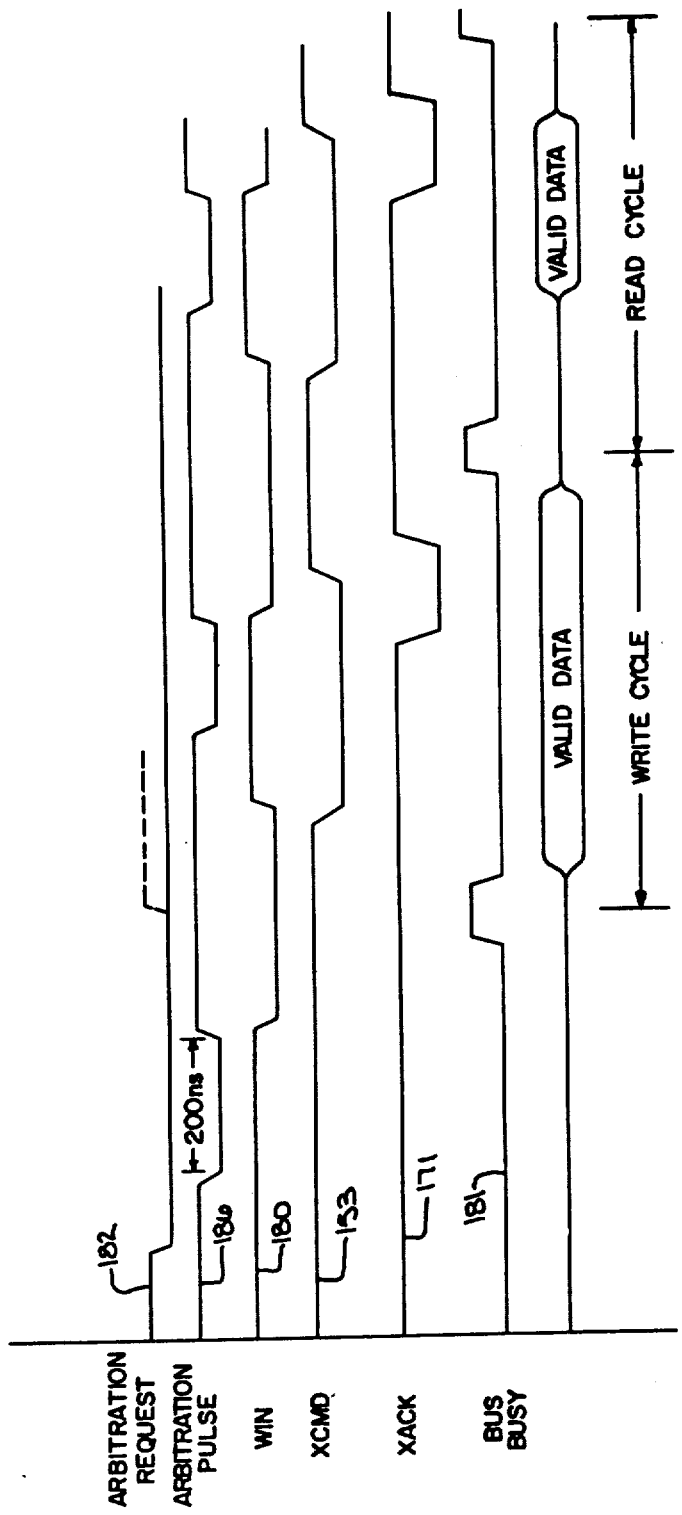

PROGRAMMABLE CONTROLLER WITH MULTIPLE FUNCTIONS

RELATED APPLICATIONS

This is a continuation-in-part application of Ser. No. 241,723 which was filed on Mar. 9, 1981 and which is entitled "Programmable Controller with Multiple Processor Modules", abandoned.

BACKGROUND OF THE INVENTION

The field of the invention is programmable controllers such as those described in U.S. Pat. Nos 3,810,118; 3,942,158; and 4,165,534.

Programmable controllers are typically connected to industrial equipment such as assembly lines and machine tools to sequentially operate the equipment in accordance with a stored program. In programmable controllers such as those disclosed in the above cited patents, for example, the control program is stored in a memory and includes instructions which are read out in rapid sequence to examine the condition of selected sensing devices on the controlled equipment and instructions which energize or deenergize selected operating devices on the controlled equipment contingent upon the status of one or more of the examined sensing devices.

The processor in a programmable controller is designed to rapidly execute programmable controller type instructions, which for the most part call for the manipulation of single-bit input data and the control of single-bit output data. The length of the control program, and hence the complexity of the system to be controlled, must be limited to insure that the entire control program can be executed, or scanned, within a set time. Such time limits are required to insure that the programmable controller will provide virtually instantaneous response to any change in the status of sensing devices on the controlled system. Therefore, the speed with which a controller processor can execute programmable controller instructions has a direct bearing on the size of the machine or process which it can effectively control.

In addition to the more conventional programmable controller instructions, there is an increasing need for an expanded instruction set which will enable programmable controllers to perform functions hitherto associated with general purpose computers. This is particularly true of large programmable controllers which are capable of controlling more than one industrial process, gathering management data, and generating management reports. It is important, however, that such functions not degrade the response time of the controller.

Another requirement of programmable controllers is that they be flexible in terms of the number and types of I/O devices with which they will operate. There are numerous types of input devices available ranging from simple switches to a variety of analog to digital converter devices. Similarly, output devices range from simple lights and solenoids to a wide variety of digital to analog conversion devices. There is a wide range of protocols, and data types associated with such I/O devices and the user should be provided with the means for using these devices without special hardware interface circuits and complex data conversion requirements.

SUMMARY OF THE INVENTION

The present invention relates to a programmable controller with an expanded instruction set, and particularly, a programmable controller which performs file manipulation functions without significantly degrading controller response time, and which conveniently performs arithmetic and logic functions on a wide variety of data types.

More specifically, the programmable controller includes: an I/O image table which stores data input from various input devices and output data which is output to various devices; a data table for storing in separate segments data of various types; and processor means which operates in response to instructions in a stored control program to move data between the I/O image table and the data table without data conversion and to perform logical and arithmetic functions on data in the data table by converting data read from the data table to a native data type, performing the indicated function, converting the result from the native data type to the proper data type and writing it into the data table. Another aspect of the invention is the ability to store data in the data table as a file comprised of more than one memory word, and the processor is operable in response to control program instructions to perform logic and arithmetic functions on an entire file.

A general object of the invention is to provide a programmable controller with a powerful instruction set which is easy to program. The instruction set includes many logic and arithmetic functions which are executed by the processor and which operate on data stored in the data table. The user may write a program using these instructions without regard to the data type, since any necessary conversion of data is automatically performed both before the function is performed and afterwards. Thus, arithmetic functions may be performed on data of two different types and the result stored in the data table in a third type. For example, a binary integer may be added to a binary coded decimal integer and the result stored as a floating point binary number. All necessary data conversions are done automatically and are "transparent" to the user.

Another general object of the invention is to increase the speed at which control instructions can be executed. Control instructions which operate on data files are included in the instruction set and these may be executed in segments such that their execution time is spread over a number of scans through the control program. The CPU module also includes means for measuring the control program scan time so that the effects of control program editing can be immediately determined and the size of the segments executed during each program scan can be altered if required.

The foregoing and other objects and advantages of the present invention will become apparent from the following description of the preferred embodiment. Such embodiment does not necessarily represent the full scope of the invention, however, and reference is made to the claims for interpreting the breadth of the invention.

BRIEF DESCRIPTION OF THE DRAWINGS

FIGS. 3A–3D are electrical schematic diagrams of the processor interface circuit which forms part of the circuit of FIG. 2;

FIGS. 5A and 5B are a chart of the CPU module microfields;

FIGS. 9A-9D are schematic representations of data structures which form a part of the memory module in FIG. 1;

FIGS. 10A-10E and 11-13 are schematic representations of data structures which are employed to execute selected control program instructions;

FIGS. 14A, 14B, and 14C are charts illustrating the functions performed by the I/O scanner module of FIG. 1;

FIG. 15 is a timing diagram which illustrates a write cycle and a read cycle on the system backplane bus which forms part of the system of FIG. 1;

DESCRIPTION OF THE PREFERRED EMBODIMENT

Figure 1:
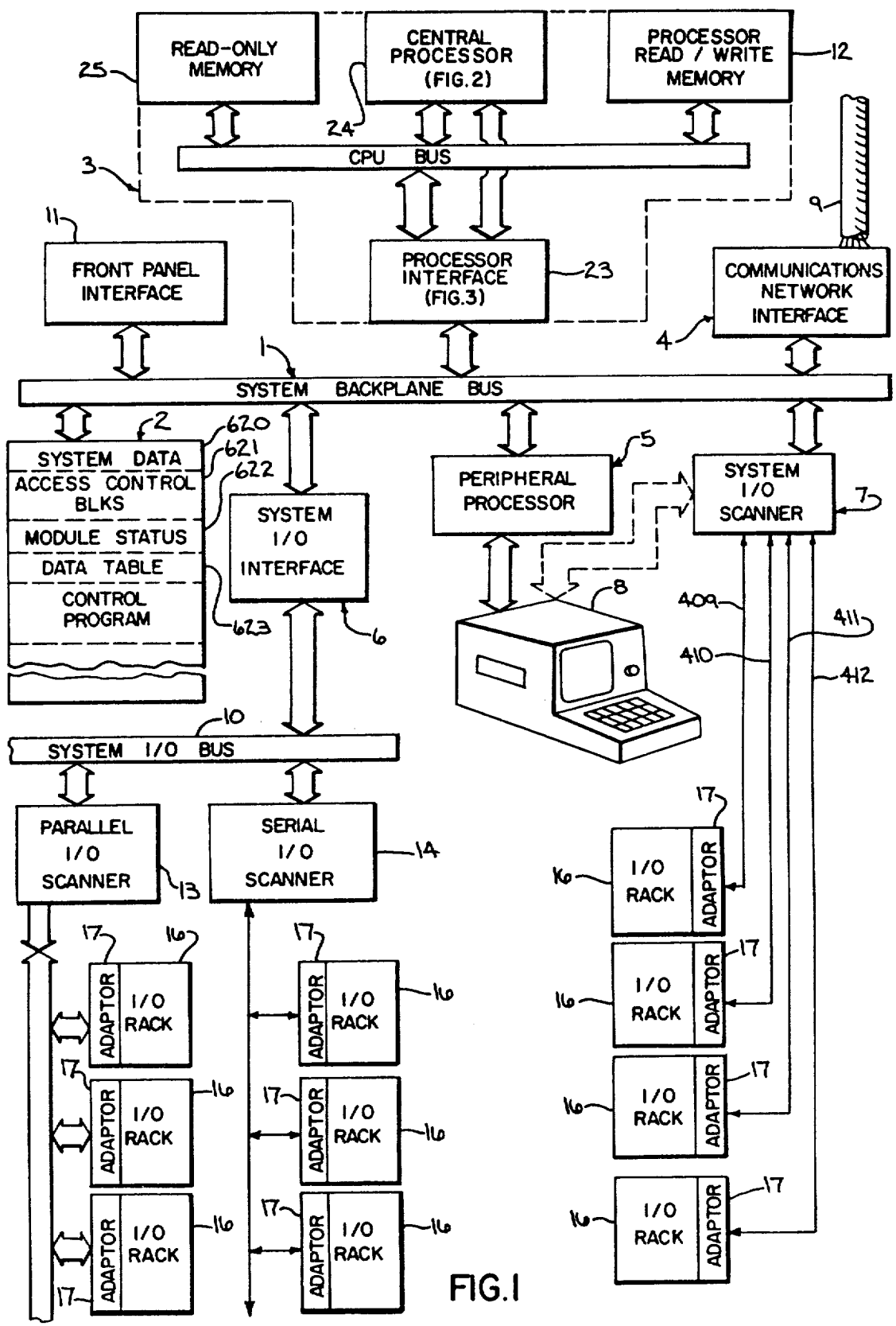
FIG. 1 is a block diagram of the programmable controller of the present invention.

Referring to FIG. 1, the programmable controller includes a number of functionally oriented modules which communicate with each other over a high-performance system backplane bus 1. The system backplane bus 1 includes 16 bidirectional data lines (D0-D15), 26 address lines (A1-A26), and a number of control lines which are employed to signal the transfer of data and to perform bus arbitration and other functions. All of the modules except a memory module 2 are potential masters of the system backplane bus 1 and each can control read and write functions on the bus 1. The backplane bus 1 is physically formed on a motherboard and the various system modules plug into edge connectors which attach to the bus leads and which form "slots" that mechanically support the module circuit boards.

There are a number of different functional modules which may be connected to the system backplane bus 1. These modules need not be present in every system, and indeed, one advantage of this architecture is that the programmable controller can be configured to a particular control function by selection of the proper type and number of modules. In addition, to the memory module 2, the programmable controller described herein includes a CPU module 3, a communications network interface module 4, a peripheral processor module 5, a system I/O bus interface module 6, a system I/O scanner module 7 and a front panel 11. Most of the modules are allocated an address space of 256K and, with the exception of the CPU module 3, all modules may be duplicated in the system.

The memory module 2 contains from 4096 (4K) to 32,768 (32K) words of storage capacity. Each word contains 16-bits of data and one error detection bit. The module 2 occupies one slot in the system backplane bus 1, however, more than one memory module 2 may be used. The memory module 2 stores the user control program which is comprised of a set of macroinstructions that are executed to perform the desired control functions. The macroinstruction set includes conventional programmable controller instructions, arithmetic instructions and logic instructions, as well as many newly-defined instructions which employ the unique architecture of this programmable controller. The macroinstruction set is described in detail hereinafter in connection with the description of the CPU module 3.

The user control program is loaded into the memory module 2 and edited using a terminal 8 which is shown connected to the peripheral processor module 5, but which also may connect to the system I/O scanner module 7. The terminal 8 includes a keyboard having keys labeled with the proper instruction set mnemonics and a display which presents the control program in rung diagram format. A terminal such as that described in co-pending U.S. patent application, Ser. Nos. 75,175 and 75,176 filed on Sept. 12, 1979, is employed.

The communications network interface module 4 connects the programmable controller to a high speed data highway 9 which connects to other programmable controllers and computers in a network. Indeed, it may be a primary function of the programmable controller of the present invention to perform supervisory control operations in a distributed control system. The communications network interface 4 is microprocessor based and it functions to interface the network communication protocol with the system backplane bus protocol. For a detailed description of the communications network protocol and hardware interface, reference is made to copending U.S. patent application, Ser. No. 102,970, filed on Dec. 12, 1979 and entitled "Industrial Communications Network".

The peripheral processor 5 is a microcomputer system which provides interface capability with up to four peripheral devices through serial data links. In addition to the programming terminal 8, the peripheral processor may communicate with devices such as printers and teletypes, and with other computers, either directly or through modems. The peripheral processor 5 services each serial I/O port and communicates through the backplane bus 1 with other modules. For example, control program data entered from the terminal 8 is interpreted by the module 5 and written into the memory module 2. Or, if an editing function is input at the terminal 8, the peripheral processor 5 may perform a number of read and write cycles to shift portions of the control program in the memory module 2.

The system I/O bus interface module 6 provides a high performance interface between the system backplane bus 1 and a system I/O bus 10. The I/O bus interface module 6 includes a random access memory which stores an image of the I/O system input and output points. Changes in the state of input points in the I/O system are received by the interface module 6 from one of the thirty-two possible I/O scanner circuits attached to the system I/O bus 10. The module 6 updates the state of its own I/O image in the RAM and then obtains control of the backplane bus 1 and transfers this information to an I/O image and data table stored in a processor read/write memory 12 located in the CPU module 3, or to an I/O image and data table 623 in the memory module 2. In addition to the exchange of I/O data which reflects state changes in I/O points, the interface module 6 also performs a periodic "refresh" scan of all I/O points in the system. By this method, the integrity of the state of the I/O image and data table in memory 12 is insured as well as all output points in the I/O system.

Up to 32 separate I/O scanners or instrumentation interface circuits may be attached to the system I/O bus 10, and with these, up to 4096 input points and 4096 output points may be serviced by the programmable controller without degrading its response time. In the preferred embodiment shown in FIG. 1 only a single parallel I/O scanner 13 and a serial I/O scanner 14 are shown. Up to 32 separate I/O racks 16 may be attached to each of these scanners 13 or 14, and each I/O rack 16 contains an adapter circuit 17 which interfaces with one or more I/O modules.

The I/O modules in each rack 16 contain circuitry which connects the programmable controller to the machine being controlled. These include input circuits such as those disclosed in U.S. Pat. Nos. 3,643,115 and 4,275,307 which sense the opening and closing of switches. This circuitry also includes output circuits such as that disclosed in U.S. Pat. No. 3,745,546 which may be employed to control motors and solenoids. Although a vast majority of these modules are single-bit oriented, word oriented modules such as analog-to-digital and digital-to analog converter modules disclosed in U.S. Pat. No. 4,104,731 may also be employed. Physically, the I/O racks 16 may take a number of forms as disclosed in U.S. Pat. Nos. 3,992,654; 4,151,580 and 4,152,750.

The system I/O scanner module 7 serves much the same purpose as the system I/O bus interface module 6, but on a smaller scale. Indeed, in smaller systems it may be the only I/O interface module employed. The system I/O scanner module 7 is microprocessor-based and it includes four serial ports which may be software configured to drive a number of components. In the preferred embodiment shown in FIG. 1, it is configured to communicate with four I/O racks 16 through their respective adapter circuits 17, but on smaller systems one port may be employed to communicate with the programming terminal 8.

The front panel module 11 provides a convenient, but rather limited means for manually entering data into the system and for displaying data and diagnostic information. It is microprocessor-based and is operable to receive commands through a keyboard and process the commands to configure the system and control its mode of operation. The contents of selected lines of the I/O image and data table memory 12 can also be displayed and changed. The module 11 is mounted on the door of the processor housing and is connected to the system I/O scanner module 7 through the system backplane bus 1 and a ribbon cable.

Memory Module

As indicated above, one or more memory modules 2 may be connected to the system backplane bus 1 and any other module in the programmable controller may read or write to these memory modules. In addition to storing one or more control programs, the memory module 2 stores considerable data which relates to the status and operation of each module in the programmable controller system. These data structures serve to coordinate the operation of the various system modules.

Referring particularly to FIGS. 1 and 9A-9D, the memory module 2 includes a system data section 620, an access control block section 621, a module status section 622, and a data table section 623. The system data section 620 occupies twenty-one words of memory and is divided into fields that are dedicated to specific functions. The access control block section 621 is comprised of a set of data blocks, each associated with a particular system module or section of the memory module 2. Each such block of data occupies five lines of memory and is divided into fields which are dedicated to specific functions. The module status section 622 of the memory module 2 is comprised of blocks of data which each contain information concerning the status of specific system modules. And finally, the data table section 623 is comprised of sixteen sections, each of which is dedicated to store a specific type of data.

Referring to FIG. 9A, the system data section includes a number of fields which provide information concerning the status of the programmable controller system. These fields are defined as follows:

Remote Access Request Counter. This counter indicates the number of remote devices requesting control of the programmable controller.

Outputs Reset Request Counter. This counter indicates the number of tasks requesting that all output devices connected to the programmable controller be reset.

(F1) Freeze Counter. F1 is a bit which indicates that the CPU module has been commanded to stop execution of the control program, and the counter indicates the number of tasks making this request.

(F2) Synchronous Freeze Counter. F2 is a bit which indicates that the CPU module has been commanded to stop execution at the end of the next scan through the control program and the counter indicates the number of tasks making this request.

System Mode Data. This is a collection of status bits which indicate the mode of operation of the programmable controller, the memory protection mode and the programming mode.

I/O Prescan Counter. This is a four-bit counter used during initialization to indicate the number of I/O scanner modules yet to complete their I/O prescans.

CPU Timer and Counter Field. This field is comprised of four parts: a CPU watchdog timer set-point; a CPU scan time high value; a CPU scan time present value; and a system counter 606. The CPU watchdog timer set-point defines the timeout period which generates a fault condition if the CPU does not periodically reset the watchdog timer. The high value is the longest scan time actually recorded and the present value is the accumulated time of the current scan. The scan time set-point is set by the CPU during its execution of the entire control program. This value is available to the user through the terminal 8. The system counter 606 has a number of uses. During the CPU pre-scan mode of operation this stores the number of pre-scans, and during the other CPU modes of operation this serves as a "heartbeat counter" which indicates to other modules in the system that the CPU module 3 is operating.

Real Time Clock. The remainder of the system data section 620 is occupied by a real time clock which is periodically updated by the CPU module 3. This clock has a range from years to 0.0001 seconds.

Referring particularly to FIGS. 1 and 9B, the access control block section 621 of the memory module 2 includes a five word block of data associated with each logical unit in the programmable controller. Each access control block includes a number of fields which are dedicated to performing the following functions.

(X) Configure Command Bit. When this bit is set it indicates that this logical unit should be initialized and included in the system configuration prior to running the programmable controller.

(S) Status Bit. When set this bit indicates that the logical unit is ready to run.

(A) Memory Section Number. This six-bit number indicates the memory module section number to which the logical unit relates. These are as follows:
- 0 = System data section
- 1 = Access control block section
- 2 = Module status section
- 3 = Data table section
- 4 = Control program section
- 5 = Messages section
- 6 = System symbols
- 7 = User symbols
- 63 = End of memory (B) Subsection Number. This four-bit number is a further definition of the logical unit. If the logical unit is a module, this number defines the type of module as follows:
- 1 = Memory module
- 2 = CPU module
- 3 = I/O Scanner module
- 4 = Peripheral processor module
- 5 = Communications network module On the other hand, if the logical unit is a data structure, this number indicates one of a plurality of such data structures, or in other words, the context of the data structure.

(C) Subsection Number. This four-bit number is yet a further definition of the logical unit. If the logical unit is a module, it indicates one out of a plurality of similar modules. If the logical unit is a section of memory it defines a subsection of that data structure. Referring particularly to FIG. 9D for example, this number identifies a subsection of the data table portion of the memory as follows:
- 1 = Output image table
- 2 = Input image table
- 3 = Timer structures
- 4 = Counter structures
- 5 = Binary integers
- 6 = Floating point numbers
- 7 = BCD integers
- 8 = Binary data
- 9 = ASCII characters
- 10 = Gray code data
- 11 = Twelve-bit I/O data (P) Write protect bit. When set, data is not to be written to the logical unit.

Access Counter. This indicates the number of processes which are currently accessing the logical unit.

Pointer. This is an address pointer to the start of the logical unit. If the logical unit is a data structure it points to its memory address and if the logical unit is a module, it points to the memory address for the module's status area.

The remaining two lines of the access control block 621 define the size of the logical unit when it is a data structure stored in the memory module 2. This information is needed to perform certain editing functions.

Figure 9C:
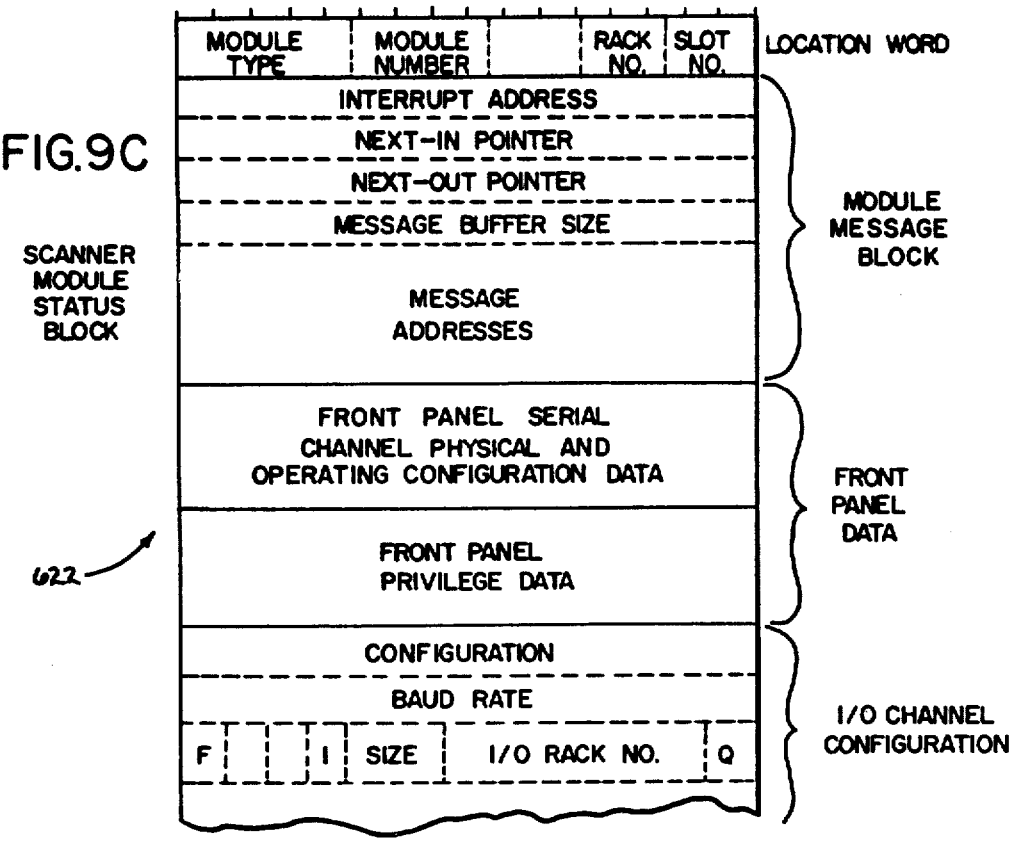
Figure 9D:
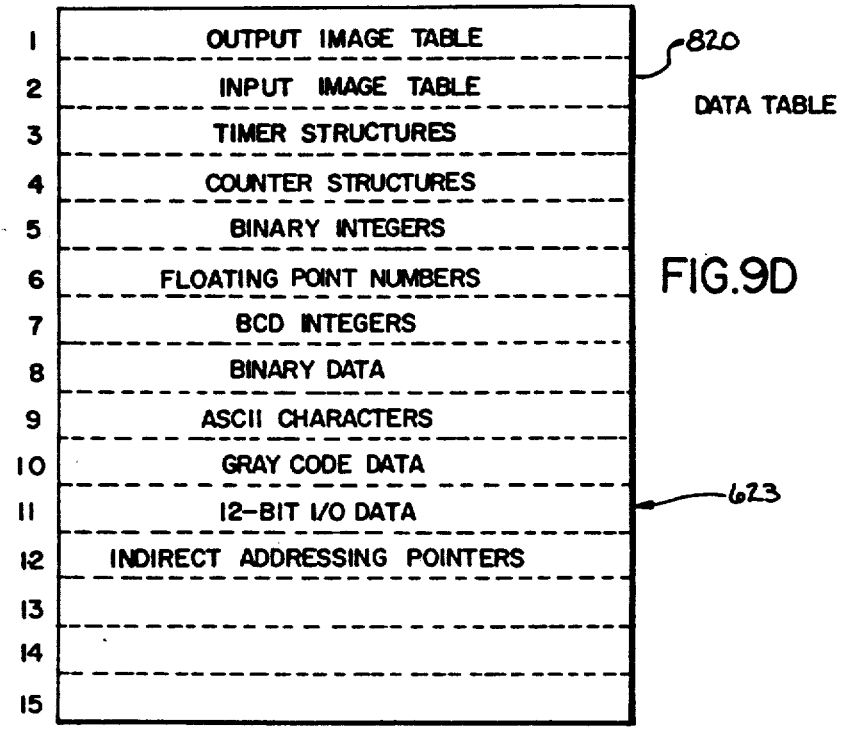

Referring particularly to FIGS. 1 and 9C, each module in the system includes a corresponding block of data in the module status section 622 of the memory 2. Although much of the data in these module status blocks 622 is unique to each type of module, they do contain some common data structures. Such structures include a location word that identifies the module type, the module number, and its physical location on the system backplane. In addition, those modules which support processor-to-processor communications include a "module message block" data structure. As will be described in more detail hereinafter, the message data block includes an interrupt address for that module, as well as a buffer containing the backplane address of each message for the module. A pair of pointers indicate the next message address into and out of this buffer and a third word indicates the buffer's size.

When a module supports the front panel 11, its module status block 622 also includes a front panel data structure. In the preferred embodiment described herein the front panel is supported by the I/O scanner module 7 and thus this data structure appears in its module status block 622 as shown in FIG. 19C. This data includes both physical and operating configuration data for the front panel serial port, as well as data regarding the control privileges allowed the front panel 11.

Referring still to FIG. 9C, the module status block 622 for the I/O scanner module 7 includes data structures corresponding to each of the four I/O channels. Each of these data structures includes a configuration word which indicates if the I/O channel is active, and if so, what purpose it is serving. Another word indicates the baud rate at which communications is occurring as well as further data which is peculiar to the particular purpose it is serving. In the preferred embodiment each I/O channel is connected to an I/O rack 16, and this further data is a single word which indicates the size, nature and address space of the I/O rack 16.

In summary, the module status blocks 622 store data which is available to all modules on the backplane bus 1 and which indicates the number and type of modules in the system and the basic functions they are performing. For example, by examining the module status blocks 622 the CPU module 3 can determine which module and channel on that module is supporting the terminal 8 and the front panel interface 11.

Referring particularly to FIGS. 1 and 9D, the data table 623 in the memory module 2 is divided into fifteen sections, each of which stores a specific data type. Section 2, the input image table, stores input data which is received through either the system I/O interface module 6 or the system I/O scanner module 7. This data is written into the memory module 2 by the module 6 or 7 as it is received from the I/O racks 16. It is, therefore, an "image" of the state of the sensing devices which connect to the machine being controlled. Similarly, Section 1 of the data table 623 stores output data which is an image of the state of the operating devices on the machine being controlled.

The type, or form, of the data in the input and output image tables is the same as that of the particular input or outut device to which it relates. For example, a position encoder which serves as an input device to the system may generate a digital number using a "grey" code, where as a bar code reader may generate input data as a series of "ASCII" characters. Such data is input automatically to the input image table by the module 6 or 7 without alteration. It is then the responsibility of the user to employ "MOVE" instructions in the control program to transfer this data to the appropriate data type section of the data table 623. Although such a transfer of data using the MOVE instruction does not perform a data conversion, when the MOVE instruction is used to transfer data of one type to a data table section of another type, the appropriate data conversion is made. Thus for example, a transfer of data using the MOVE instruction from the "binary data" section to the "BCD integer" section will make the appropriate data conversion. In addition, as will be explained in more detail below, when data is read from a particular data type section of the data table 623 by the CPU module 3, it is automatically converted to a "native" data type which is consistent with the function being performed by the CPU module 3. Conversely, when data is written back to the data table 623 by the CPU module 3, the data is automatically converted from the native data type back to the indicated form.

CPU Module

Figure 2:
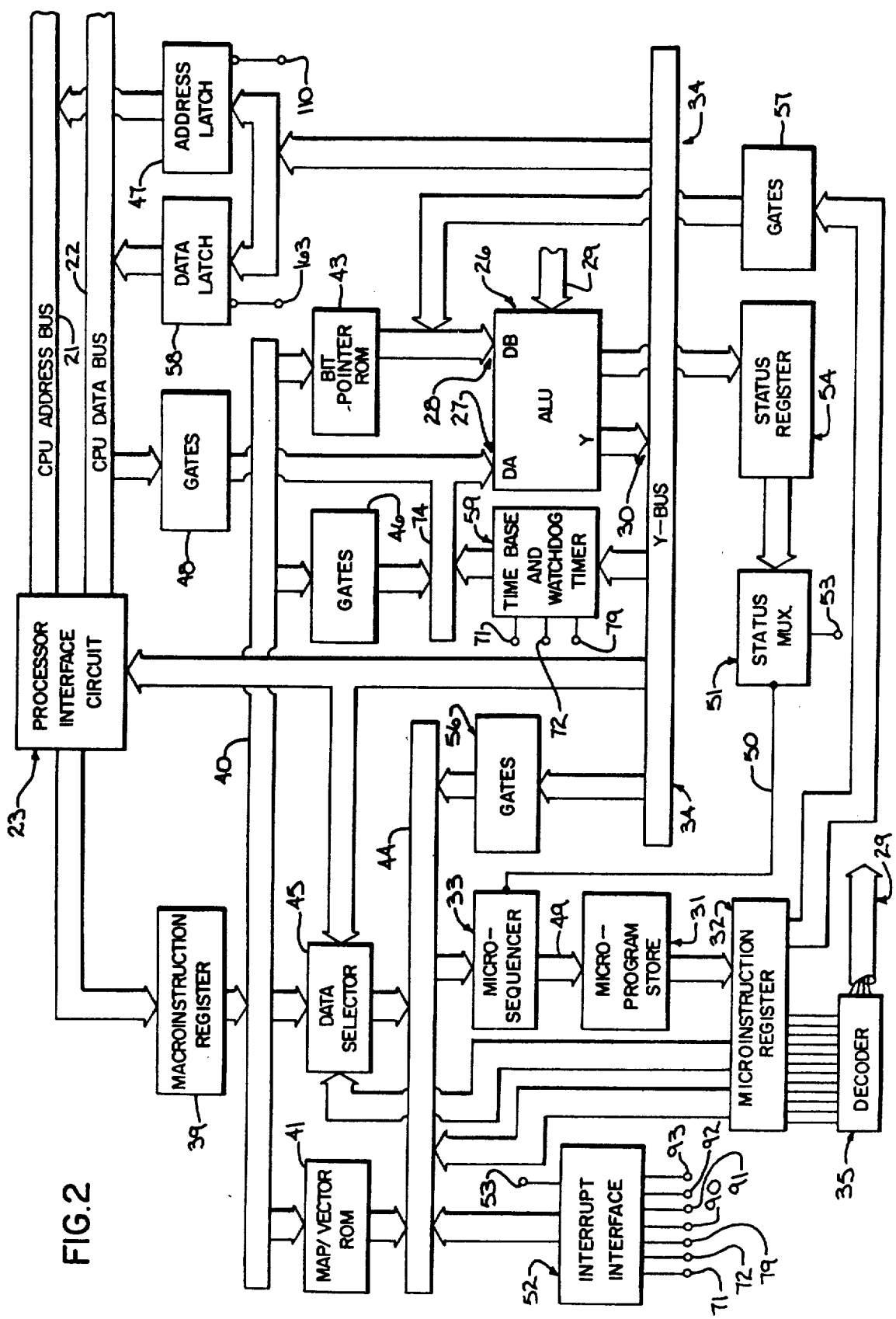
FIG. 2 is a block diagram of the CPU module which forms part of FIG. 1.

Referring particularly to FIGS. 1 and 2, the CPU module 3 is structured around a CPU bus 20 which includes a 16-lead CPU address bus 21 and a 16-lead bi-directional CPU data bus 22. These are coupled to the system backplane bus 1 by a processor interface circuit 23 and they connect to a central processor 24, a read-only memory 25 and the I/O image and data table memory 12. The read-only memory 25 is an 8K×16-bit high-speed EPROM which stores power-up and house keeping programs, masks, and other constants. This data is read onto the CPU data bus 22 either in response to microinstructions executed by the central processor 24 or in response to a read operation initiated by one of the modules connected to the system backplane bus 1. In the latter case, the data is coupled through the processor interface circuit 23 and backplane bus 1 to the requesting module.

The I/O image and data table memory 12 is a high-speed random access memory organized as 4K×16-bit words. This memory 12 stores an image of the most often accessed portion of the I/O image table. The central processor 24 accesses the memory 12 to determine the status of system inputs, and the central processor 24 modifies the contents of the memory 12 to effect changes in system outputs. The remainder of the I/O image table is stored in the data table portion 623 of the memory module 2, and the central processor 24 accesses this data as well. The CPU module 3 couples data which indicates "changes" made in the I/O image table through its processor interface circuit 23 to the corresponding I/O image tables in the I/O bus interface module 6 and I/O scanner module 7. The memory 12 also stores data associated with the execution of certain macroinstructions, and in general, it provides storage for data which is to be accessed at high speed.

Referring particularly to FIG. 2, the central processor 24 is a 16-bit, microprogrammed processor which fetches macroinstructions (user control program instructions) from the memory module 2, and decodes each into one or more microinstructions which perform the required operations. The processing of a macroinstruction may also require further access to the memory module 2 or the RAM memory 12 for operands or other required data.

The central processor 24 is structured about an arithmetic and logic unit, ALU 26, which is comprised of four cascaded 4-bit bipolar microprocessor slices (AM2903) manufactured by Advanced Micro Devices, Inc. The ALU 26 includes sixteen internal registers (Reg 0–15) and it receives 16-bit data input words at a DA port 27 or a DB port 28. The ALU 26 performs a number of arithmetic and logic functions in response to signals on a control bus 29 and 16-bit data output words are generated at a Y port 30. For a detailed description of the ALU 26 reference is made to "The AM2900 Family Data Book" published in 1979 by Advanced Micro Devices, Inc.

The operation of not only the ALU 26, but also the remaining elements of the central processor 24 is controlled by 56-bit microinstructions which are sequentially read from a microprogram store 31 to a microinstruction register 32. Referring particularly to FIGS. 2, 5A and 5B, the 56-bit microinstructions which control the operation of the central processor 24 are divided into micro fields. Each micro field is a code of one or more bits in length which is decoded to provide control signals to specific elements of the central processor 24. For example, the micro field formed by bits 0–3 of each microinstruction operate a microsequencer 33 to control the order in which microinstructions are read from the microprogram store 31. The micro field formed by bits 12–15 on the other hand, control the arithmetic and logic functions performed by the ALU 26 and the micro field formed by bits 28–31 control the various latches and gates which attach to the ALU Y-port 30 through a 16-bit Y-bus 34. Some of the microinstruction bit lines are attached directly to the elements which they control while others are combined and decoded to provide control signals for various system elements. This decoding circuitry is shown collectively in FIG. 2 as reference number 35 and the resulting control lines form the control bus 29. The actual control lines have not been shown in FIG. 2, but instead, Appendix A lists the function performed by each decoded micro field using the mnemonics in FIGS. 5A and 5B.

Referring particularly to FIG. 2, the macroinstructions from the user control program are read into the central processor 24 through the processor interface circuit 23 and stored in a 16-bit macroinstruction register 39. The macroinstruction register 39 retains the macroinstruction word for reference during the execution of the resulting microroutine. A 10-bit operation code in the macroinstruction is applied through a macro-bus 40 to the address inputs of a map/vector ROM 41, and a 4-bit bit-pointer code is applied to the address inputs of a bit pointer rom 43. The operation code is converted by the ROM 41 to a twelve-bit microaddress which is applied to a microbranch address bus 44. This decoded operation code is employed to address a microroutine which is then executed to perform the functions indicated by the operation code. The four least significant bits of the macroinstruction may also directly drive the four least significant bit leads in the 12-bit microbranch address bus 44 through a data selector 45. The data selector 45 is enabled when special 16-way microbranch instructions are executed that require four bits from the macroinstruction.

The microsequencer 33 is an address sequencer for controlling the sequence of execution of microinstructions stored in the microprogram store 31. During the execution of each microinstruction, the microsequencer 33 provides a 12-bit address on a bus 49 to the microprogram store 31. This address selects one of 4096 microinstructions to be executed next. The address generated by the microsequencer 33 may originate from one of four sources within the microsequencer 33: (1) a microprogram address register, which usually contains an address one greater than the previous address; (2) an external direct input from the microbranch address bus 44; (3) a register/counter retaining data loaded during a previous microinstruction; or (4) a five-deep last-in, first-out stack register which provides return address linkage when executing microsubroutines or loops. The microsequencer 33 is responsive to microinstruction bits 0-3 to perform one of sixteen operations, nine of which are conditioned by a signal on a control line 50. That is, an operation such as a jump is performed only if the control line 50 is at a logic low voltage. The microsequencer 33 is available in integrated circuit form as the AM2910, and for a more complete description of its structure and operation, reference is made to "The AM2900 Family Data Book With Related Supportk Circuits" published in 1979 by Advanced Micro Devices, Inc.

The control line 50 is driven by a status multiplexer 51 which is controlled by bits 40-43 in each microinstruction. The status multiplexer 51 receives a status signal from an interrupt interface circuit 52 through a control line 53 and it receives status signals from a 4-bit status register 54. The inputs of the status register 54 are driven by the "carry", "overflow", "zero" and "sign" status outputs of the ALU 26. The operation of the microsequencer 33 can thus be conditioned by the status of the ALU 26 or by the existence of an interrupt request from the interrupt interface circuit 52.

Referring still to FIG. 2, a microprogram address may be supplied to the microsequencer 33 through the bus 44 from a number of sources. For example, when a microinstruction is fetched its operation code is applied to the map/vector ROM 41, and it is converted, or mapped, to a 12-bit microprogram address which is generated on the bus 44. In this manner, each macroinstruction is mapped to its corresponding microroutine. Also, when a jump microinstruction is executed, bits 44-45 of the microinstruction are coupled directly to the bus 44 from the microinstruction register 32. This "target address" identifies the point in the microprogram at which processing is to continue. In addition, a 12-bit microaddress may be coupled from the Y port 30 of the ALU 26 through a set of gates 56. This allows, for example, the target address of a microjump to be calculated by the ALU 26. And finally, microaddress data may be coupled to the microsequencer 33 from a data selector 45 and an interrupt interface 52.

Referring to FIG. 2, the central processor 24 includes other elements which enable it to perform a wide variety of functions. Gates 46 couple data from the bus 40 to the ALU 26, and when enabled for example, they allow the 9-bit operand address which accompanies a bit pointer code to be coupled through the ALU 26 to an address latch 47 and then to the CPU address bus 21. Gates 48 on the other hand, connect the CPU data bus 22 to the DA port 27 on the ALU 26. This enables a 16-bit data word from either the processor interface circuit 23, the I/O image and data table memory 12 or the read-only member 25 to be applied through the gates 48 directly to the ALU 26. In addition, bits 40-55 of the microinstruction register 32 are coupled to a set of sixteen gates 57 and the outputs of gates 57 are connected to the DB port 28 on the ALU 26. A sixteen bit data word can thus be applied to the ALU 26 "immediately" by a microinstruction. Such a data word might be, for example, a mask which is logically combined with a data word applied to the ALU DA port 27. Also, the output of the ALU 26 may be coupled through the Y-bus 34 to a 16-bit data latch 58, the address latch 47 or the processor interface circuit 23. The data latch 58 connects to the CPU data bus 22 and the output of the ALU 26 can thus be written into the I/O image and data table memory 12. And finally, the ALU Y-bus 34 connects to the input of a time base and watchdog timer circuit 59. As will now be described in more detail, the output of this circuit 59 also connects to the ALU DA input port 27.

Figure 4:
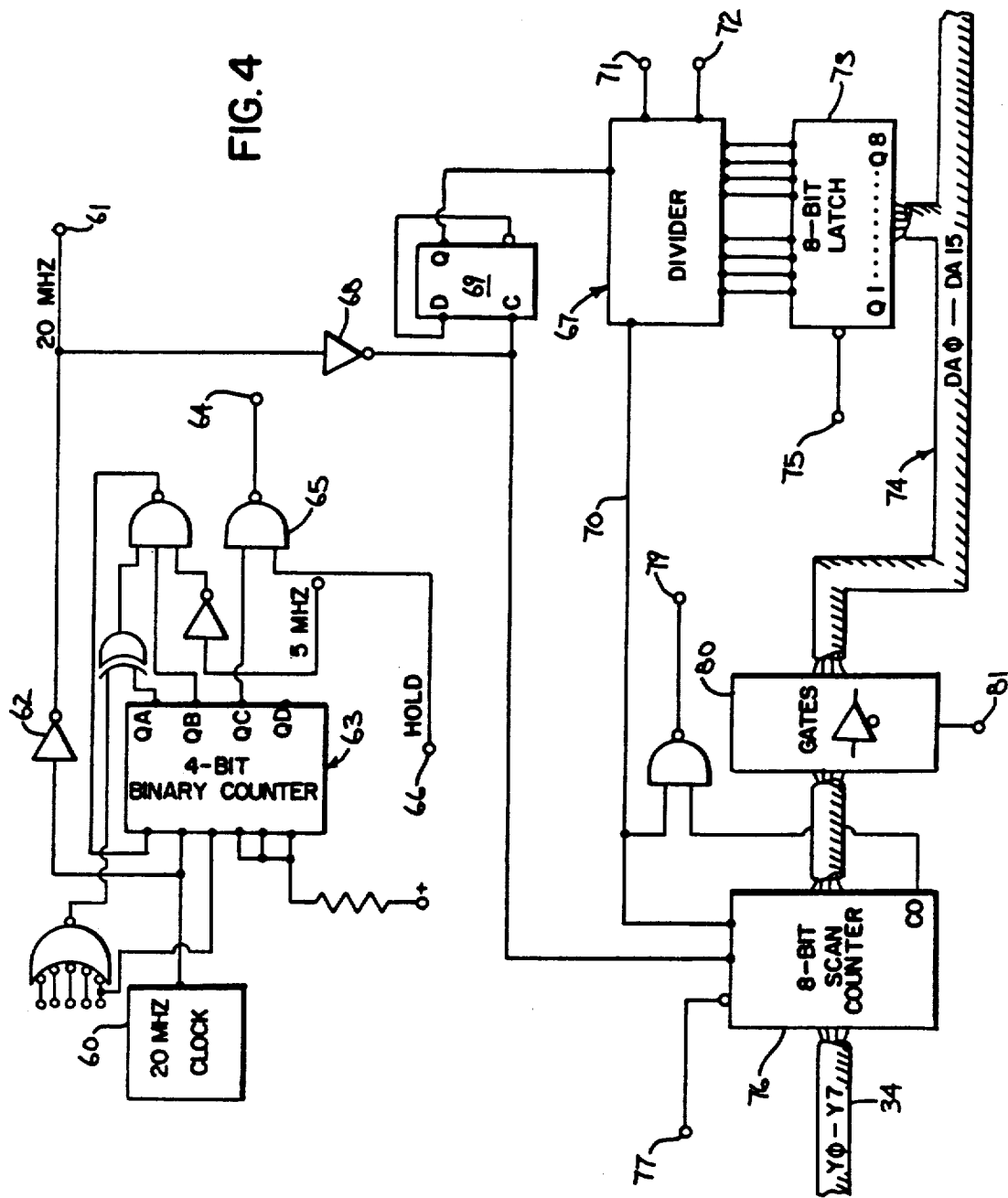
FIG. 4 is an electrical schematic diagram of the time base and watchdog timer which forms part of the circuit of FIG. 2.

Referring particularly to FIGS. 2 and 4, the time base and watchdog timer circuit provides the system clock signals and the real time clock signals employed in timer macroinstructions. It includes a 20 megahertz single phase clock 60 which drives a clock line 61 through a driver 62. The 20 megahertz clock 60 also drives a 4-bit binary counter 63 which generates a system clock signal on a line 64. The system clock provides a time base of 200, 250 or 300 nanoseconds depending on the type of instruction being executed. The system clock can be inhibited, by a NAND gate 65 which is responsive to a HOLD signal on a control line 66.

The 20 megahertz clock also drives a divider circuit 67 through an inverter 68 and a D-type flip-flop 69. The divider 67 is comprised of a series of dividers and counters which reduce the clock rate to values that provide the desired time bases. More specifically, a time base of one millisecond is generated on a line 70, a time base of 0.01 seconds is generated on a line 71 and a time base of 0.1 seconds is generated on a line 72. In addition, an 8-bit latch 73 connects to the divider 67 to store a 4-bit binary count of the 0.01 second time intervals, a 2-bit binary count of the 0.1 second time intervals and a 2-bit count of 0.5 second intervals. The eight Q outputs on the latch 73 connect to the ALU DA port 27 through bus 74, and when a logic low control signal is received on a line 75, the contents of the latch 73 are read into the ALU 26.

The line 70 increments an 8-bit scan counter 76 which serves as a means for measuring the time required to execute the user's control program. The eight inputs to the scan counter 76 are connected to the eight least significant leads in the Y-bus 34 aand it is present through a control line 77 to the one's compliment of the maximum allowable scan time prior to each pass through the user's control program. As the user's control program is executed, the counter is incremented, in ten millisecond time increments until it overflows, or is again present at the beginning of the next scan. A NAND gate 78 connects to detect an overflow and it generates a logic low voltage on a control line 79 when this event occurs. As will be explained in more detail below, the control line 79 connects to the interrupt interface circuit 52 to initiate an interrupt when the scan counter "times out". In addition, a set of eight tri-state gates 80 connect to the outputs of the scan counter 76, and whan a logic low voltage is applied to control line 81, the contents of the counter 76 is read onto the bus 74 and into the ALU 26. In this manner, the time required to execute the control program, or portions of it, can be measured.

Figure 6:
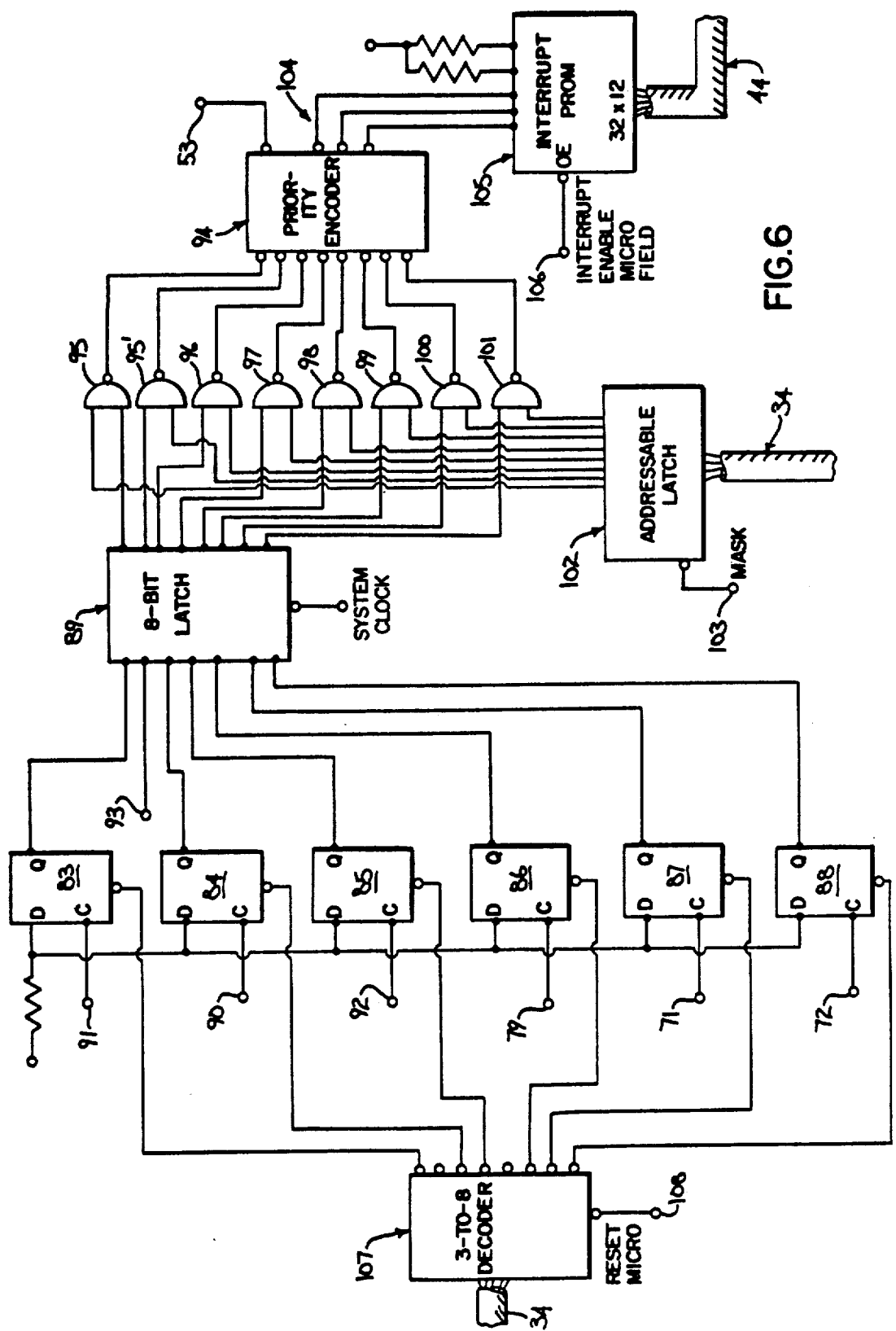
FIG. 6 is an electrical schematic diagram of the interrupt interface circuit which forms part of the circuit of FIG. 2.

Referring particularly to FIGS. 2 and 6, the interrupt interface circuit 52 receives interrupt requests from seven sources, prioritizes them, and generates a code to an interrupt PROM which supplies the starting address on the microbranch address bus 44 of the highest priority service routine. Six of the interrupt requests are received at the clock terminals of respective D-type flip-flops 83–88 and the seventh is applied directly to one input of an 8-bit latch 89. Three of the interrupt requests eminate from the time base and watchdog timer circuit described above to interrupt processing when the allowable scan time has been exceeded or when the 0.01 second real-time clock has "ticked" or when the 0.1 second real-time clock has ticked. A fourth interrupt request eminates from a line 90 in the backplane bus when a module attached thereto requests an interrupt, and a fifth interrupt is requested by line 91 when a.c. power failure is detected. The remaining two interrupts are fault related. The first appears on line 92 when an error is detected during a read or write operation to the system backplane bus 1 and the other appears on line 93 when a fault such as a memory parity error occurs.

Any interrupt requests remain in the respective flip-flops 83–88 until serviced. The Q outputs of flip-flops 83–88 are connected to inputs on the latch 89 and the interrupt requests are latched in synchronizm with the 5 MHZ system clock. The eight latch outputs are coupled to a priority encoder 94 through respective NAND gates 94–101.

The NAND gates 95–101 enable interrupt requests to be masked. A second input on each connects to a respective output of an eight-bit addressable latch 102 which has its three latch select inputs and its data input connected to the Y-bus 34. When a control line 103 is driven low, a selected one of the NAND gates 95–101 maay be either enabled or disabled (i.e. mask the interrupt) by data which is output from the ALU 26 to the addressable latch 102.

The priority encoder 94 generates a three-bit binary code at its outputs 104 which identifies the highest priority interrupt applied to its eight inputs. A "EO" output on the priority encoder 94 connects to the control line 53 and it is driven high if any interrupts are requested. The outputs 104 connect to the address inputs of the interrupt PROM 105, and the 3-bit code thereon is mapped to the starting address of the corresponding interrupt service microroutine. When the interrupt PROM 105 is enabled by control line 106, this address is applied to the bus 44 and loaded into the microsequencer 33.

After an interrupt has been serviced the request is reset. Referring still to FIG. 6, this is accomplished by a 3-line-to-8-line decoder 107 which has its three inputs connected to leads 0–2 in the Y-bus 34. Six of its outputs are connected to reset terminals on respective flip-flops 83–88, and when enabled by a control line 108, the flip-flop indicated by the 3-bit code on the Y-bus 34 is reset. The interrupt indicated on line 93 requires a manual reset following correction of the indicated fault.

It should be apparent that the interrupt interface circuit 52 maay be expanded to enable additional interrupt input events and that the nature of the interrupt events can be easily changed by altering the contents of the interrupt PROM 105.

There are certain functions performed by a programmable controlling which to a great extent determine its capacity in terms of the number of I/O points it can support. The preferred embodiment described herein is intended to service up to 4096 input points and 4096 output points without degradation of the scan time (i.e. the time needed for a single execution of the user control program). This is accomplished in part by maintaining the I/O image and data table in the memory 12, which is not only constructed using high speed memory devices, but which is also physically located on the same circuit board as the central processor 24. Most operations performed by the central processor 24 involve this local high speed memory, because most instructions in the typical user control program require the examination of a single bit in the I/O image table or the setting of a single bit in the I/O image table. The separation of the CPU bus 20 from the system backplane bus 1 and the use of local high speed memory therefore substantially enhances the speed of the CPU module 3.

As indicated above, it is the function of the system I/O bus interface module 6 and the I/O scanner module 7 to periodically update the state of the I/O image table in the memory 12 and it is a function of the central processor 24 to fetch control instructions (i.e. macroinstructions) from the memory module 2. These functions require bi-directional communications between the central processor 24 and the system backplane bus 1. Also, because a number of asynchronously operating modules are connected to the system backplane bus 1, an arbitration means must be provided to allocate the backplane bus 1 to the requesting system module or the central processor 24 in accordance with a preselected priority scheme.

Figure 3A:
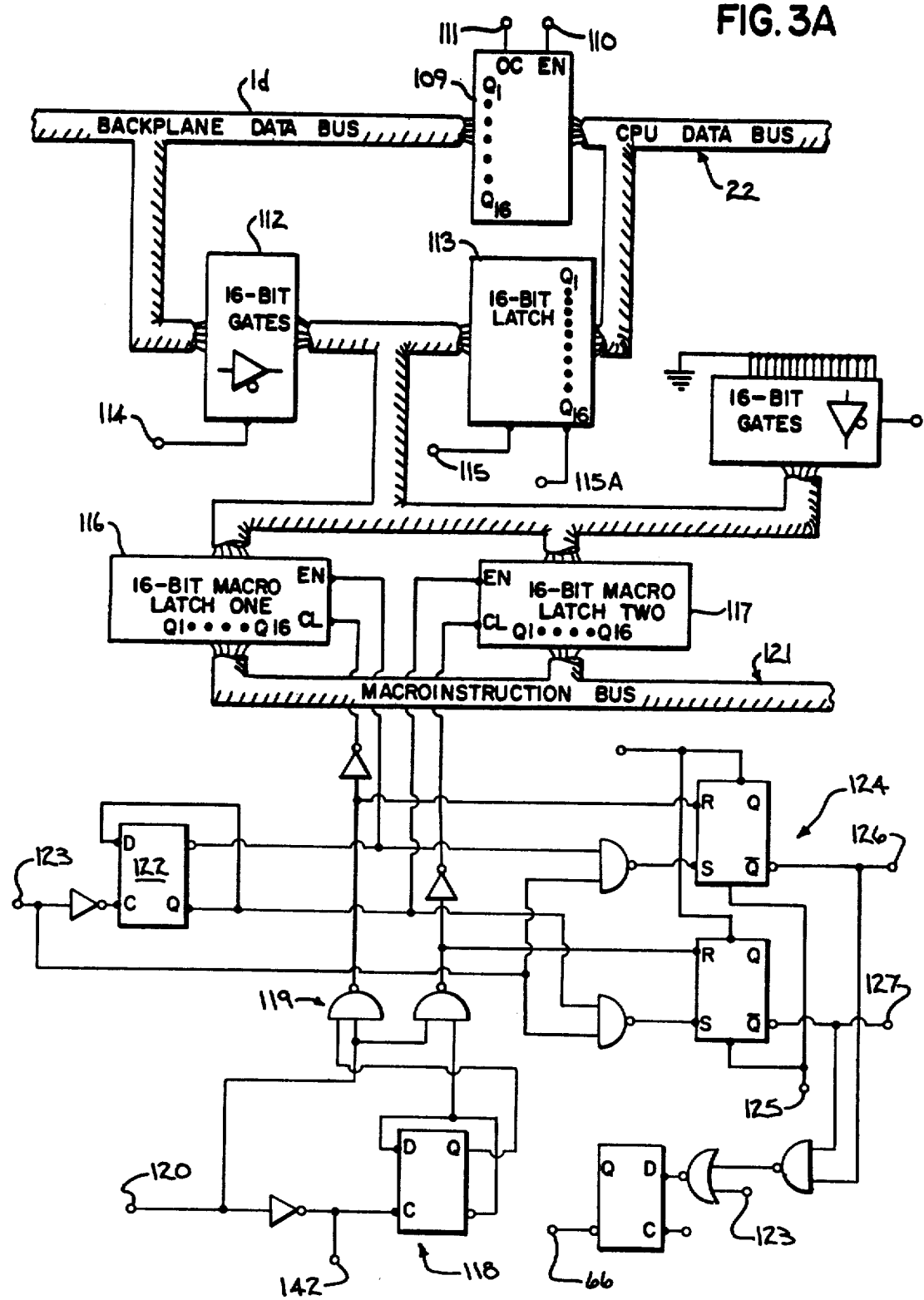

These functions are performed by the processor interface circuit 23. Referring particularly to FIGS. 1, 2 and 3A, the sixteen leads in the CPU data bus 22 are coupled to the sixteen leads in the system backplane bus 1d by a 16-bit latch 109. Data is clocked into the latch 109 from the bus 22 when a control line 110 goes high and this data is applied to the backplane data bus 1d when a control line 111 becomes active. On the other hand, a set of sixteen tri-state gates 112 and a latch 113 couple the backplane data bus 1d to the CPU data bus 22. When enabled by control lines 114 and 115 data from the backplane bus 1 may be coupled through the gates 112 and the latch 113 and written to an addressed destination in the central processor module 24. It is in this manner, for example, that the system I/O bus interface module 6 updates the I/O image and data table memory 12 with changes occurring at input points in the I/O racks 16.

In addition to coupling the respective data buses 1d and 22, the gates 112 also input control program macroinstructions which are fetched from the memory module 2. These macroinstructions are applied to the inputs of a first macro latch 116 and to the inputs of a second macro latch 117. As fetched macroinstructions are received, they are alternately loaded into the respective latches 116 and 117. This enables macroinstructions to be "prefetched" so that the central processor module 24 can operate at maximum speed without waiting for the next macroinstruction. Control of the latches 116 and 117 is accomplished by a flip-flop 118 and a pair of NAND gates 119. The flip-flop 118 serves to alternately clock the latches 116 and 117 and to time the clock pulse such that the macroinstruction is latched properly when received from the memory module 2. As a result, when a macroinstruction is fetched, a control line 120 becomes active and one of the two NAND gates 119 is momentarily gated to clock one of the latches 116 or 117.

The output of the latches 116 and 117 connect to the leads in a macroinstruction bus 121 which connects to the inputs of the macroinstruction register 39. A flip-flop 122 connects to the enable terminals on the respective latches 116 and 117, and the contents of the latches are alternately output to the macroinstruction register 39 in response to signals on control line 123. A set of flip-flops and gates indicated generally at 124 keep track of macroinstructions loaded into and read out of the latches 116 and 117, and if a request is made for another macroinstruction and none is available, an active signal is generated on the control line 66 to disable the central processor clock (see FIG. 4). The central processor is thus held in an idle state until another macroinstruction is received from the memory module 2. Control lines 126 and 127, which also emanate from this circuit, indicate when either of the latches 116 or 117 is empty, and as will be described below, these signals initiate a prefetch of another macroinstruction when either of the macro latches 116 or 117 is empty.

As long as the control program macroinstructions are executed in sequence, the subsequent macroinstructions are prefetched to the macro latches 116 and 117 and are available when needed by the central processor 24. However, when the control program deviates from a straight sequential execution of macroinstructions, as occurs during a jump or branch, the prefetched macroinstructions in the latches 116 and 117 are of no use. When this occurs, a control line 125 is enabled and the flip-flops 124 are reset to indicate that no macroinstructions are available for execution.

Figure 3B:
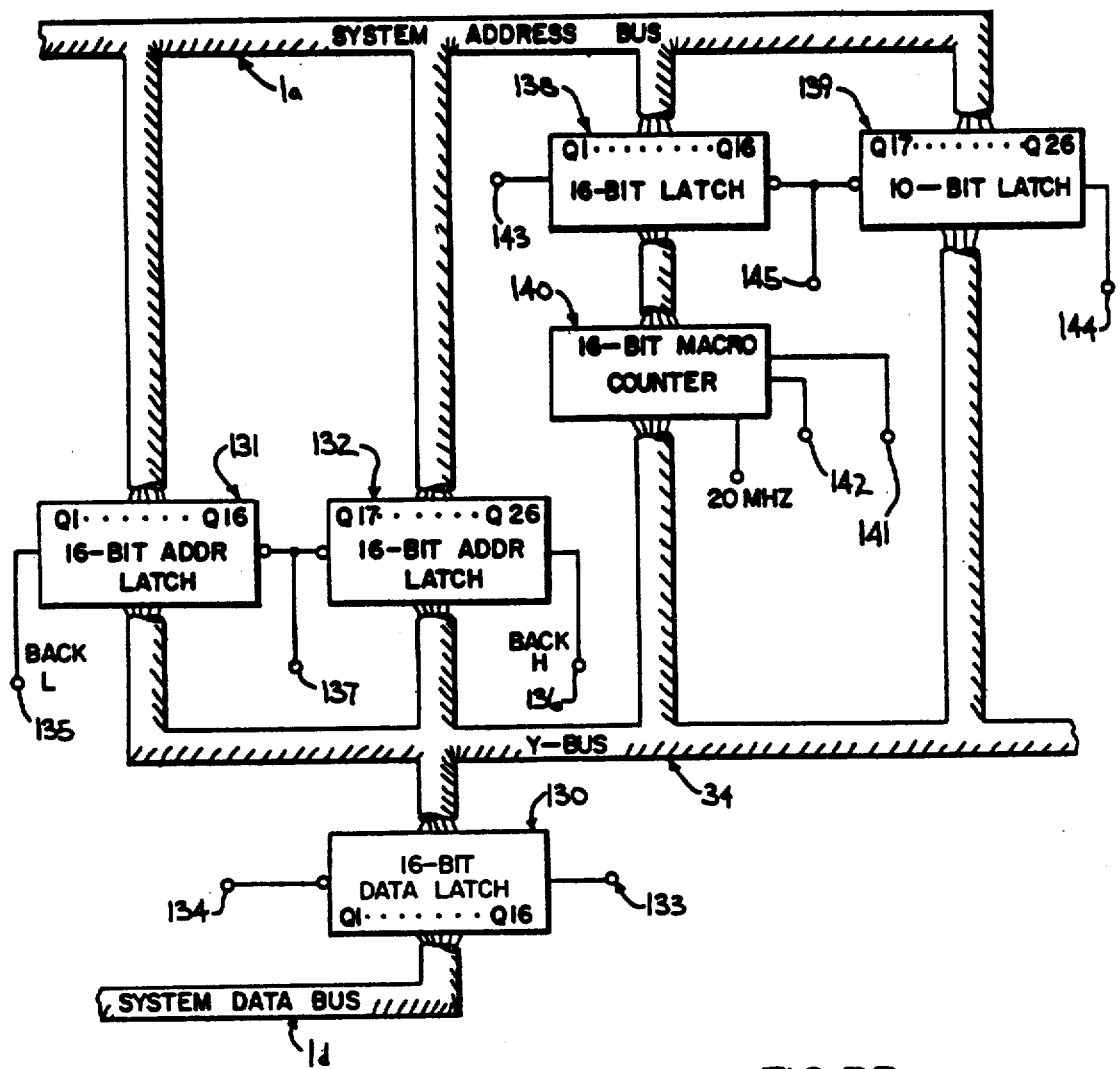

Referring particularly to FIGS. 2 and 3B, the ALU Y-bus 34 is also coupled to the system backplane bus 1 through the processor interface circuit 23. It connects to the system data bus 1d through a 16-bit data latch 130 and it connects to the system address bus 1a through a pair of address latches 131 and 132. The data latch 130 is loaded with data which is output from the ALU 26 when a control line 133 is active (i.e. micro-bits 28-31=BACKD) and this data is written onto the backplane data bus 1d when a control line 134 is active. Similarly, address data is output to the respective latches 131 and 132 when control lines 135 and 136 are active (i.e. micro-bits 28-31=BACKL or BACKH) and this 26-bit address is applied to the backplate address bus 1a when a control line 137 is active. Data and addresses can thus be generated directly by the ALU 26 for application to the backplane bus 1, and hence to other modules in the system.

Control program macroinstructions stored in the memory module 2 are addressed by the CPU module 3 by means of data stored in a 16-bit latch 138 and a 10-bit latch 139. The inputs of the 10-bit latch 139 are connected directly to leads in the Y-bus 34, however, the inputs to the 16-bit latch 138 are driven by a 16-bit "macro" counter 140. The macro counter 140 may be present to an address generated by the ALU 26 on the Y-bus 34 when a control line 141 is active (i.e. microbits 28-31=FETCH) and the counter 140 is incremented each time a macroinstruction is fetched. This is accomplished by a control line 142 which emanates from the clock terminal of flip-flop 118 (see FIG. 3A). The contents of the macro counter 140 are loaded into the latch 138 when control line 142 becomes active, and the 10-bit latch 139 is loaded with high order address data from the Y-bus 34 when the control line 144 becomes active. The resulting 26-bit address is applied to the backplane address bus 1a when the central processor module 24 obtains access to the backplane bus 1 and a control line 145 becomes active.

Referring to FIGS. 2 and 3C, a module connected to the system backplane bus 1 accesses the CPU module 3 by asserting an address within a preselected range on the address bus 1a and asserting the proper signals on the system backplane bus control lines. Ten of the most significant digit leads in the system address bus 1a couple to the "A" inputs of a comparator circuit 150, and when the CPU module 3 is addressed by another module, the comparator 150 generates a logic high voltage at an output 151. A set of module ID switches, or jumpers 152, connect to the "B" inputs of the comparator and these serve as a means for preselecting the CPU access address range.

The module requesting access to the CPU module 3 also asserts a logic low voltage on a backplane control line (XCMD) 153 to indicate that valid data is present on the backplane bus 1. This signal is inverted and applied to the clock terminals on two D-type flip-flops 154 and 155 and to the K terminal on a J-K flip-flop 156. The output of the comparator 150 is thus clocked into the flip-flop 154 and applied to one input of an AND gate 156. A second input 157 on AND gate 156 connects to receive bit 4 from the microinstruction register 32, and if access to the CPU module 3 is to be blocked, it is set low. Otherwise, the output of AND gate 156 is clocked into a second D-type flip-flop 159.

The Q and $\bar{Q}$ outputs on the second D-type flip-flop 159 enable a number of elements in the CPU module 3. The $\bar{Q}$ output connects to an enable terminal 160 on a set of sixteen address gates 161 and a sixteen bit address is thus applied to the CPU address bus 21 when access to the CPU module 3 is obtained. The Q output of flip-flop 159 connects directly to control line 110 to disable the address latch 47 (FIG. 2) and to enable the inputs of the latch 109 (FIG. 3A). In addition, this Q output connects through an OR gate 162 to a control line 163 which disables the data latch 58 (FIG. 2) when external access is granted. A second input on the OR gate 162 is driven by a control line 164 which becomes active during a central processor write operation (i.e. micro-bits 35-37). The Q output on flip-flop 159 also connects to one input of a NAND gate 165. The second input on this NAND gate 165 is driven by a control line 166, and when data is to be read by the CPU module 3, the output of gate 165 is driven low. The output of gate 165 drives a pair of AND gates 167 and 168. The AND gate 167 in turn drives the control line 115 which controls latch 113 (FIG. 3A) and the AND gate 168 drives a CPU WE control line 169. When a module on the system backplane bus 1 writes to the CPU module 3, therefore, the control lines 115 and 169 are driven low.

The J-K flip-flop 156 is set shortly after the flip-flop 159 by the system clock applied to its clock terminal.

The Q output on flip-flop 156 connects to an inverter gate 170 that drives a backplane acknowledge (XACK) control line 171. The signal thus generated on the XACK control line 171 indicates to the requesting module that the CPU module 3 has received its request and that valid data is on the system bus 1. The flip-flop 156 also drives a NAND gate 172, and if a read operation is indicated by the backplane read/write line 166, the output of this gate 172 is driven low to enable the outputs of latch 109 (FIG. 3A) through control line 111. The flip-flops 154 and 156 are reset by the backplane control line XCMD 153 and the signal is removed from the XACK control line 171 by the flip-flop 156 to indicate that the data transfer is complete.

Referring to FIGS. 2 and 3C, in addition to reading from or writing to the CPU module 3, an external module may also interrupt the central processor 24 or force it into a "hold" state. An interrupt request is accomplished by writing to a specific address which causes an interrupt request to be generated on a line 90 by a NAND gate 173. One input to this gate 173 is enabled low by the NAND gate 165 when a backplane write operation is indicated, and its other input is enabled low when the preselected interrupt address is present on the CPU address bus 21. A decoder circuit 174 detectes not only this interrupt address, but it also decodes other addresses on the bus 21 to generate appropriate chip enable signals to the I/O image and data table memory 12 and the read only memory 25.

An external module may also place the central processor 24 in "hold" by asserting a logic low voltage on a backplane control line (CPU HOLD) 175. This signal is coupled through an inverter gate 176 and AND gate 177 to the D input of the flip-flop 155. The Q output of flip-flop 155 connects to the D input of another D-type flip-flop 178 and the Q output on this flip-flop 178 connects to the hold control line 66 to disable the system clock (FIG. 4). The central processor 24 remains in the hold condition until another backplane command is generated to reset the flip-flops 155 and 178.

Figure 3D:
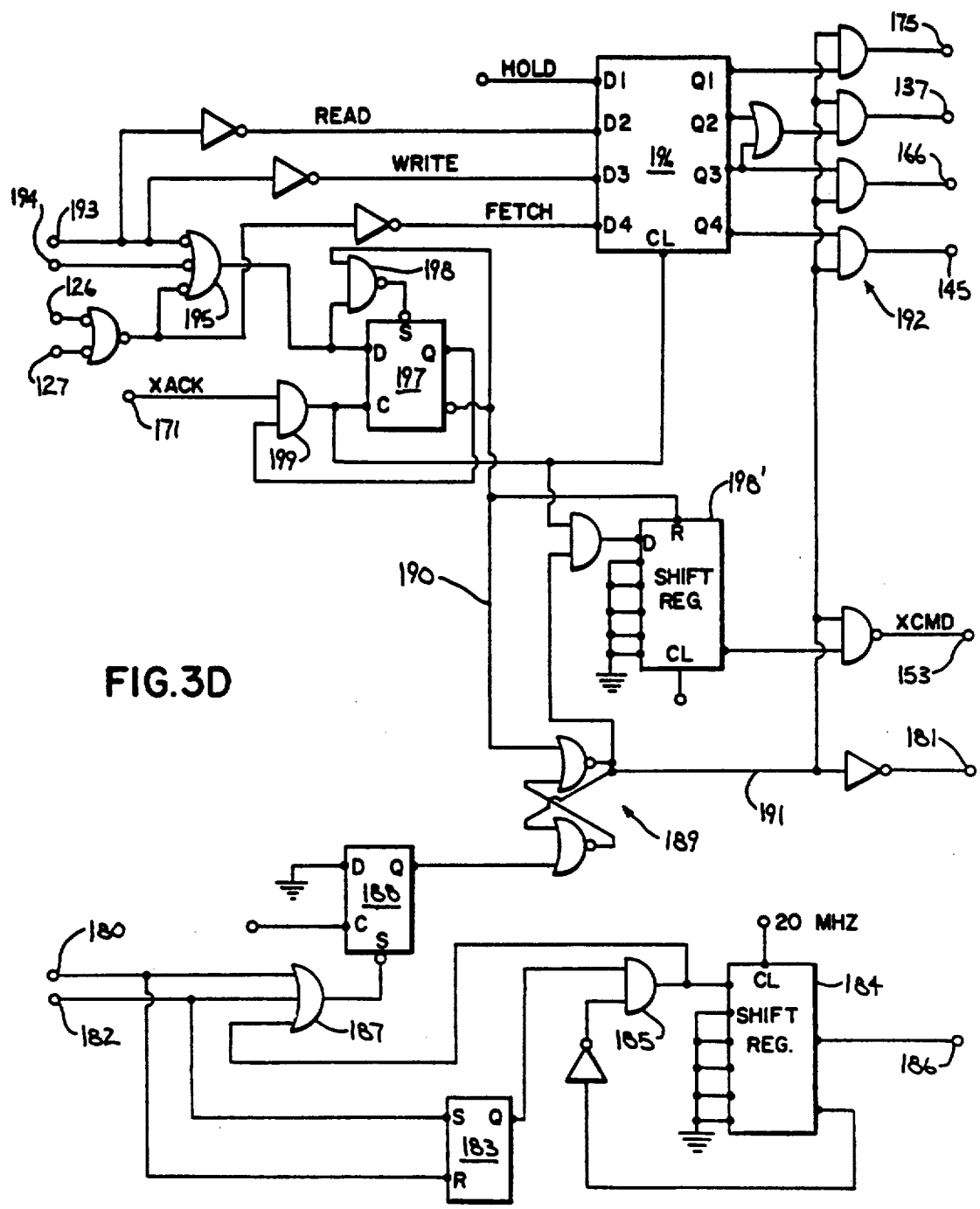

Referring particularly to FIGS. 2, 3D and 15, the central processor 24 contains circuitry for determining which module in the programmable controller may have access to the backplane bus 1. An arbitration request control line 182 connects to each module on the backplane bus 1 and when a module wants access, it asserts an arbitration request logic signal to the arbitration circuit on the central processor 24. This signal sets a flip-flop 183, which in turn applies a logic signal to a shift register 184. The shift register 184 generates a 200 nanosecond arbitration pulse on a backplane control line 186, and as will be described in more detail hereinafter, the requesting module having the highest priority will respond to this pulse by asserting a signal on a WIN control line 180. The successful module will then assert a "bus busy" signal on a backplane control line 181 and initiate a data transfer.

The central processor module 24 may gain access to the backplane bus 1 when no other module in the programmable controller needs it. Referring to FIG. 3D, this condition is sensed by an OR gate 187 which sets a flip-flop 188 when the backplane bus 1 is not requested by another module. The flip-flop 188 drives a pair of NOR gates 189 and when the central processor module 24 wants access, as indicated by the logic state of a WANT control line 190, a logic high enabling signal is generated on an IGOT control line 191. The IGOT control line 191 drives the BUS BUSY control line 181 and it enables a series of AND gates 192 which couple the processor module 24 to the backplane HOLD control line 175, the control line 137 (see FIG. 3B), the backplane read/write control line 166 and the control line 145 (see FIG. 3B).

The WANT control line 190 is enabled whenever the central processor module 24 requires the backplane bus 1 to perform a read operation, a write operation or a macroinstruction FETCH. A BACK READ control line 193 is enabled when a BACKR microcode is executed and a BACK WRITE control line 194 is enabled when a BACKW microcode is executed. These signals along with the macroinstruction buffer empty signals on lines 126 and 127 are applied to an OR gate 195 and to the respective inputs of a quad D-type flip-flop 196. The output of the OR gate 195 drives a D-type flip-flop 197 which is set by a NAND gate 198 when access is desired and the flip-flop 197 generates a logic low signal on WANT control line 190. This logic low voltage releases a shift register 185 from reset and a logic high voltage is generated by the flip-flop 197 to an AND gate 199 to clock the quad flip-flop 196. The contents of the quad flip-flop 196 is gated to the respective control lines 175, 137, 166 and 145 by the AND gates 192, and a short time thereafter, the XCMD backplane control line 153 is activated by the output of the shift register 185 to indicate that valid data is on the system backplane bus 1. When the module with which the central processor module 24 is communicating acknowledges that the data transfer has occurred, the backplane control line XACK 171 rises to a logic high voltage to clock the flip-flop 197 and to thereby either initiate another transfer or reset it.

Referring particularly to FIG. 15, the arbitration process is performed concurrently with the transfer of data between modules. That is, prior to the completion of a read or write cycle on the backplane bus 1, the arbitration process has already occurred and the highest priority module desiring access to the backplane bus 1 has been found and is ready to perform a read or write operation when the bus becomes available. Bus availability is indicated by a logic high on the bus busy control line 181 and shortly thereafter the new "master" module of the backplane bus initiates a read or write cycle. The master module drives the XCMD control line 153 low to indicate that a valid address is on the backplane bus 1 and the addressed "slave" module responds by driving the XACK control line 171 low. The XCMD control line 153 is released by the master module shortly thereafter and the slave module responds by releasing the XACK control line 171 to complete the read or write cycle.

Any module, except the CPU module 3, can request arbitration by driving the control line 182 low. As described previously, this causes an arbitration pulse to be sent to all modules through the control line 186, and the highest priority module will drive the WIN control line 180 low to terminate arbitration. That module will then take control of the backplane bus 1 when the bus busy control line 181 goes high.

Referring particularly to FIGS. 1, 2, 8 and 9, when the CPU module 3 is powered up it operates in one of five possible modes. In mode 1 the CPU module 3 is not processing, but is waiting for other modules in the system to initialize. In mode 2, it is waiting for the I/O scanner module 7 to perform a "prescan" which initializes the I/O image and data table memory 12 and the data table in the memory module 2. In mode 3 the CPU module 3 performs a "program prescan" in which the control program is executed, but all output devices are disabled. Mode 4 is the "run" mode in which the control program is executed to operate the devices connected to the programmable controller, and mode 5 is the program load mode in which the control program is entered and edited from the terminal 8. The current CPU mode is stored in the CPU ram 12 and in the system status portion of the memory module 2.

Figure 8:
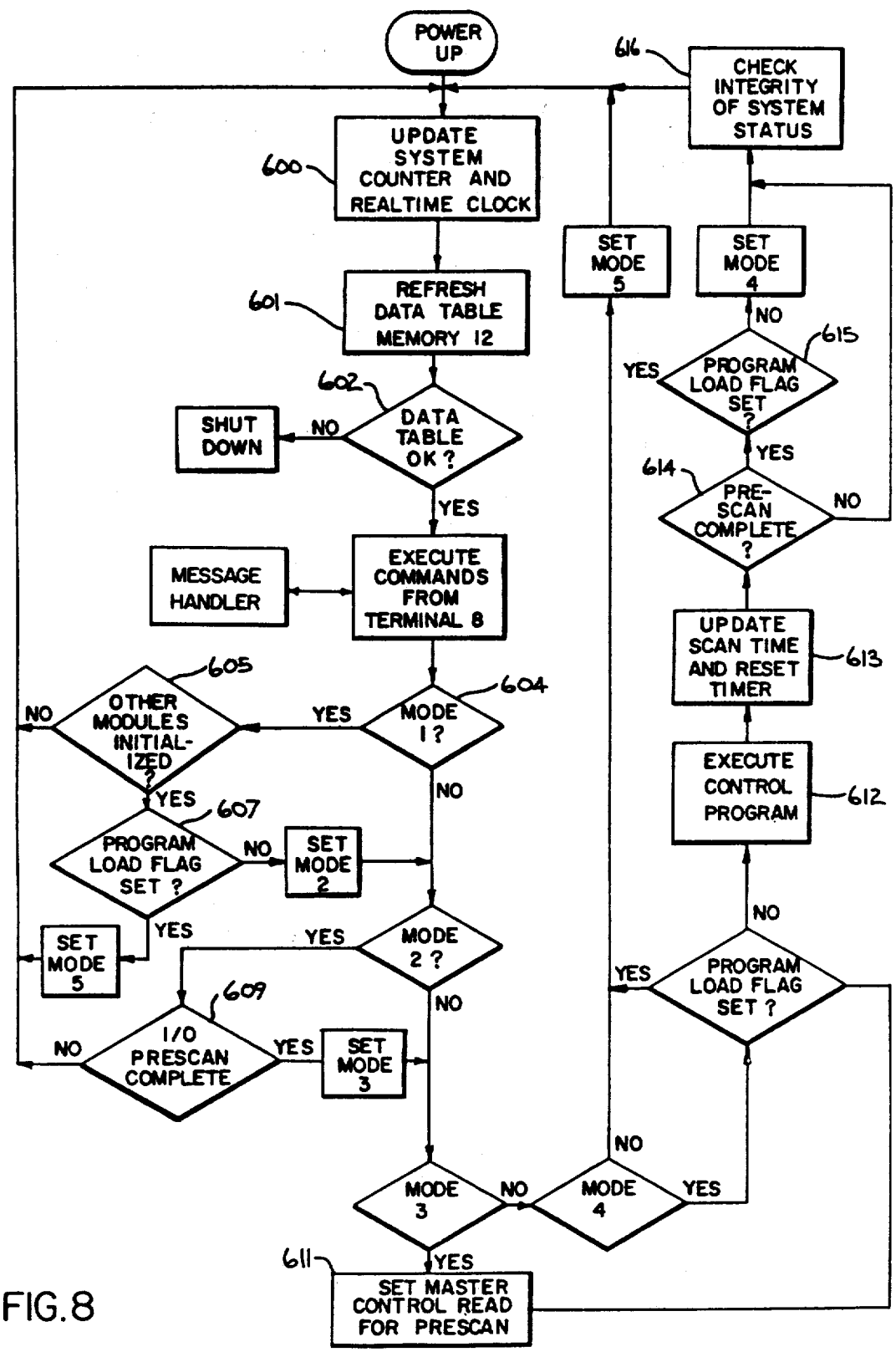
FIG. 8 is a flow chart of the functions performed by the CPU module of FIG. 1.

Referring particularly to FIGS. 8 and 9, regardless of the mode of operation, the CPU module 3 periodically performs a number of housekeeping chores. As indicated by process block 600, a set of instructions are executed to increment the system counter and the real time clock which are both stored in the system data portion 620 of the memory module 2. The system counter indicates to other modules in the system that the CPU module 3 is functioning and the real time clock provides day and time information. As indicated by process block 601 the CPU module 3 then refreshes certain data in its memory 12. More specifically, it reads data from the access control block portion 621 of the memory module 2 which indicates the memory location of various portions of the control program and the data table stored in the memory module 2. These "pointers" are maintained in the CPU memory 12 to reduce the time required to access data in the memory module 2 during execution of the control program. If this data is in error, as indicated by decision block 602, the CPU module is shut down and all output devices are disabled. Normally, however, the CPU module 3 next executes commands it has received from the terminal 8 as indicated by process block 603. As will be explained in more detail hereinafter, the CPU module 3 includes a message handler routine which communicates with other backplane modules, and which couples command messages from the module that supports the terminal 8. Such commands may be, for example, editing commands which call for the deletion or addition of instructions in the control program.

Referring still to FIGS. 8 and 9, after these housekeeping functions have been performed, the CPU module 3 determines which mode it is operating in and performs the functions required. Immediately following power-up the CPU module is in mode 1 as determined by decision block 604, and the only function performed is to determine if the other modules in the system have been initialized and are ready to run. This is determined by instructions indicated by decision block 605 which examine the system status counter 606 stored in the system data portion of the memory module 2. As will be explained in more detail hereinafter, the system I/O scanner module 7 is responsible for setting the system status counter 606 to the number of modules present during power-up. As each module initializes itself, it decrements the system counter. Until this counter is decremented to zero, the CPU module 3 remains in the mode 1 loop comprised of blocks 600–605.

When all system modules have initialized the CPU module 3 may switch to mode 2. Before doing so, however, a check is made to determine if the system has been set to the "program load mode." This is indicated at decision block 607 and is accomplished by examining the system mode field 608 in the system status portion 620 of the memory module 2. As will be explained in more detail hereinafter, it is another one of the functions of the system I/O scanner module 7 to monitor the front panel switches through the front panel interface module 11 and to maintain the system mode field 608.

In mode 2 the CPU module 3 waits for the I/O scanner module 7 to perform an I/O prescan in which the data tables in both memory module 2 and CPU ram 12 are initialized to the current state of all input devices connected to the programmable controller. Instructions indicated by decision block 609 are executed to examine an I/O prescan counter 610 in the system status portion of memory module 2. Each I/O scanner module 7 and system I/O bus interface module 6 in the system decrements this I/O prescan counter 610 when it has completed its prescan, and when the counter 610 reaches zero, the CPU module 3 switches to mode 3.

In mode 3 the CPU module 3 executes a "prescan" of the control program to build a table of target addresses for jump instructions and subroutine calls as described in U.S. Pat. No. 4,115,853. As indicated by process block 611, a master control relay is first set by the CPU module 3 to insure that all logic decisions made during the control program prescan are false and that no output devices are energized. Also, during the prescan no branches jumps or subroutine calls are executed to insure that each and every instruction in the control program is fetched and executed. As indicated by process block 612, each control program instruction is fetched from the memory module 2, mapped to the proper microprogram in the CPU module 3 and executed. The last microinstruction in each microprogram includes a FETCH code which directs the CPU module 3 to read the next control program instruction from the memory module 2.

This sequence continues until the "END" instruction is fetched. The END instruction functions to reset the control program counter to the start of the control program and to read the scan counter 76 (FIG. 4). The scan counter 76 is reset to zero and the scan time is saved in the system data section (FIG. 9) as indicated by process block 613 in FIG. 8. The scan time is a measure of the time required to execute the control program and is particularly useful in time-critical applications where the effects of changes to the control program during program development cannot be easily predicted.

Referring still to FIG. 8, if the control program prescan is complete as determined at decision block 614, the CPU module 3 is ready to run. First, however, a check is made at decision block 615 to determine if the program load mode has been requested, but if not, the module is set to mode 4. Regardless of the mode, after the control program has been executed a check is made of the system data section to determine if any major fault conditions have occurred as indicated at process block 616. The system loops back to commence another scan if no problems exist. Otherwise, the system shuts down.

Referring particularly to FIG. 1, the control program instructions, or "macroinstructions," are loaded into the memory module 2 using the terminal 8. The terminal 8 operates in combination with the peripheral processor module 5 to not only load macroinstructions into the memory module 2, but to also edit the resulting control program and to monitor the system operation as the control program is being executed by the CPU module 3. As will become more evident from the description to follow, a number of macroinstructions infer or expressly define operands, which are stored in the I/O image and data table memory 12. This memory 12 is on the CPU module 3 and is constructed of very high speed devices which enable the macroinstructions to be executed more efficiently. Typically, each macroinstruction is prefetched by the CPU module 3 from the memory module 2 and it is held until the previous macroinstruction has been executed. When that is completed, the macroinstruction operation code is mapped to a stored microprogram which carries out the indicated functions. Typically, the function is carried out with one or more operands located in the I/O image and data table memory 12.

The macroinstruction set includes many instructions which are common to programmable controllers such as bit manipulating instructions and timers and counters. Others are less common and some are unique either in the function they perform or the manner in which they perform the function. The macroinstruction set can be grouped into a number of subsets as set forth in Table A. The microprograms for a representative sampling of these macroinstructions is set forth in Appendix B.

Referring particularly to FIGS. 10A-10E, each macroinstruction includes an operation code and an operand or operand address. The "rung control" and "program control" macroinstructions are one 16-bit word in length and each includes an 8-bit operation code. The rung control instructions also include an 8-bit offset number which may be added to the macroinstruction counter to branch around control program instructions which are not to be executed. The program control instructions include an 8-bit label number which identifies an entry in the label table which is stored in the CPU ram 12 and which is created during the control program prescan.

The "test/control bit" macroinstructions are formed by a 16-bit word containing the 8-bit operation code and a 4-bit pointer code followed by one or more operand address words. "Timer/counter" macroinstructions are similar except they include a 7-bit timer/counter number and a single bit (L) which indicates whether or not the macroinstruction includes additional words for addressing beyond the range of the 7-bit timer/counter number.

The "arithmetic/logic" instructions are more complex. In addition to the first word which contains the 8-bit operation code, they include one or more words which indicate the address of a first source of data, a second source of data and a destination for the output of the arithmetic or logical operation. The first word of the arithmetic and logic instructions also includes a bit (I) which indicates if any of the data to be operated upon is floating point and a bit (F) which indicates if any of the data to be operated upon is more than one word (i.e., a file). The remaining 5 bits in the first word indicate the total number of words in the macroinstruction. If a data file is operated upon as indicated by the F bit, the first word in an arithmetic or logic macroinstruction is followed by one or more file control words which indicate how the file is to be processed.

The address structure referred to above in connection with FIGS. 10c-10e is shown in more detail in FIG. 11. It is comprised of one or two words as determined by a single bit (L) in the first word. Another bit (F) in the first word indicates if a file is being addressed and the first four bits of the word indicate which of the sixteen sections of the data table is being addressed. The remaining ten bits of the first word identify a location in the indicated data table section or they form the most significant bits of a much larger address when a second word is present in the structure. The structure of the data table portion of the memory module 2 is shown in FIG. 14 and it should be apparent from the above description that the size of any of the sixteen sections of this data table can range to a very large capacity.

When arithmetic or logic macroinstructions operate on a file, they require a file control word shown in FIG. 10e. The structure of such file control words is shown in more detail in FIG. 12. The structure is comprised of one or two words as determined by the first two bits of the first word and the same two bits determine in which of two modes, complete or distributed complete, the file is to be operated upon. In the complete mode the file control word is a transfer number which indicates the number of words to be operated upon in the indicated file or files. Each time the macroinstruction is executed, the arithmetic or logic operation is sequentially performed on the number of words in the file indicated by this number. In contrast, the distributed complete mode of operation requires a rate number in addition to the transfer number, and each time the macroinstruction is executed, only the number of words indicated by the rate number are operated upon. This continues until the total number of words indicated by the transfer number are operated upon. This distributed complete mode of operation on a data file enables the operations to be distributed over a number of scans so that the control program scan time is not excessive when an operation on a large data file is made.

Referring particularly to FIG. 13, for each timer and counter required by the control program there exists a three-word data structure in the timer or counter sections of the data table stored in memory module 2. This structure includes a control word which indicates the status of the timer or counter, a preset value word, and an accumulated value word. The accumulated value word stores the number of counts or time increments which have taken place and the preset value word stores the total with which the accumulated value is compared.

TABLE A

| MACROINSTRUCTION SET | |
|---|---|
| 1. Rung Control Instructions | |
| STRT | Transparent "start of rung" instruction which includes a program counter offset to the first conditional or branch output instruction in the rung. It sets the condition of the rung to the state of the master control relay (MCR) and it provides the information needed to skip instructions that need not be executed. |
| STMC | Same as STRT, but it sets the rung condition true irrespective of the MCR or ZCL state. |
| BST | Defines the start of a branch in a rung and includes a program counter offset to the next NXB instruction to allow skipping of instructions in a false branch. |
| NXB | Defines the start of another branch and includes a program counter offset to the next NXB or BND instruction to allow skipping of instructions in a false branch. |
| BND | Defines the end of one or more branches and checks to determine if any of the branches are true. If not, it includes the program counter offset to the output instruction to enable skipping of unnecessary instructions. |
| STOB | Defines the start of output branches each containing an output instruction. It contains the program counter offset to the first output instruction to enable skipping of further test instructions when the rung or output branch tests false. |
| NXOB | Defines start of additional output branches and contains the program counter offset to the output instruction in the branch it |

TABLE A-continued
MACROINSTRUCTION SET

|  |  |  |
|---|---|---|
|  |  | defines. |
|  | 2. | Program Control Instructions |
| MCR |  | Defines a master control relay that is included as an output instruction in a rung. When set false, all rungs which follow are set false by STRT instructions, thus enabling the MCR to control entire blocks of output devices. Rungs which start with an STMC instruction are not affected by the state of the MCR. |
| LBL |  | Creates a table containing the absolute memory address of targets for JMP and JSR instructions. See U.S. Pat. No. 4,115,853. |
| JMP |  | A conditional jump to its corresponding LBL instruction. The jump is made if the rung in which it appears is true. |
| JSR |  | A call to a subroutine identified by the corresponding LBL instruction. The return program counter value is saved and the call occurs only if the rung containing the JSR instruction is true. |
| RET |  | Signals the end of a subroutine and returns to the instruction following the JSR instruction which called the subroutine. |
| ZCL |  | Defines the start and end of a block of instructions which are to be skipped when the rung containing the first ZCL instruction is false. |
| HALT |  | Unconditional emergency stop of the programmable controller processor with a fault indication. |
| END |  | Unconditional end of program which resets the watchdog timer and restarts the execution of the control program at its beginning. The END instruction also defines the set time of the watchdog timer enabling the user to control the maximum allowable scan time. |
|  | 3. | Test Bit Instructions |
| XIC XOE |  | Test the status of a bit in the I/O image table. The rung condition remains true if the bit is on (1) and is set false if the bit is off (0). The instruction includes the address of the I/O image table word and a bit pointer which identifies the particular bit in that word. |
| XIO XOD |  | Same as XIC and XOE except rung condition is set false when the tested bit is on (1) and remains unchanged when the bit is off (0). |
|  | 4. | Control Bit Instructions |
| OTE |  | If the rung condition is true and the master control relay (MCR) is inactive this instruction sets an indicated bit in the I/O image table on (1). Otherwise, the bit is set off (0). |
| OTL |  | Same as OTE except that the indicated bit is not set off (0), but is instead left unchanged. |
| OTU |  | If the rung condition is true and the master control relay (MCR) is inactive, this instruction resets a bit in the I/O image table to off (0). Otherwise, no action occurs. |
|  | 5. | Timer/Counter Instructions |
| CTU |  | If the rung condition becomes true and the master control relay (MCR) is inactive, the indicated counter is incremented one count. |
| CTD |  | Same as CTU but the indicated counter is decremented one count. |
| RTO |  | This retentive timer instruction sets a "done bit" to on (1) at a preset time interval after the rung condition becomes true. If the rung condition becomes false during the time interval, timing stops but the accumulated time is retained. |
| RES |  | This instruction resets the accumulated count in an indicated counter or it resets the accumulated time in a retentive timer. |
| TON |  | This timer instruction sets a "done bit" to on (1) at a preset time interval after the rung condition becomes true. If the rung condition becomes false the done bit is reset to off (0) and the accumulated time is reset. |
| TOF |  | This timer instruction resets a "done bit" to off (0) at a preset time interval after the rung condition becomes false. If the rung condition becomes true, the done bit is set to on (1) and the accumulated time is reset. |
|  | 6. | Arithmetic and Logical Instructions |
| ADD |  | This instruction adds two source operands together and stores the sum in the indicated destination. The appropriate status register bits (result zero, carry, overflow and sign) are set. |
| SUB |  | This instruction subtracts the second source operand from the first source operand and stores the difference in the indicated destination. The appropriate status register bits are set. |
| MULT |  | This instruction multiplies the two source operands together and stores the product in the indicated destination. The appropriate status register bits are set. |
| DIV |  | This instruction divides the first source operand by the second source operand and stores the quotient at the indicated destination. The appropriate status register bits are set. |
| NEG |  | This instruction subtracts the first source operand from zero and stores the result in the indicated destination. The appropriate status register bits are set. |
| SQRT |  | This instruction takes the square root of the first source operand and stores the result at the indicated destination. The appropriate status register bits are set. |
| MOVE |  | This instruction moves the data at the first source operand to the indicated destination and sets the appropriate status register bits. Data is automatically converted when the source and destination are different data type sections of the data table 623. |
| CMP |  | This instruction subtracts the second source operand from the first source operand and sets the rung condition false if the comparison fails. The particular comparison to be made is indicated by the destination operand and includes: Equal Not Equal Greater Than Less Than Greater Than Or Equal To Less Than Or Equal To |
| LIMIT TEST |  | This instruction sets the rung condition false if the first source operand is not between the second source operand and the destination operand. |
| AND |  | This instruction performs a logical AND on each bit of the first source operand with the corresponding bits of the second source operand. The results are stored in the destination operand and the appropriate status register bits are set. |
| OR |  | Same as the AND instruction except a logical OR is performed on each bit. |
| XOR |  | Same as the AND instruction except an exclusive OR function is performed on each bit. |
| NOT |  | This instruction takes the complement of each bit in the first source operand and stores the result in the destination. The appropriate status register bits are set. |
|  | 7. | Transparent Instructions |
| SKIP |  | This instruction is employed to set off portions of the control program which contains nonexecutable data. Such data may be, for example, comments which are to be displayed on the terminal 8. |

It is an important feature of the present invention that the arithmetic and logic macroinstructions may operate upon data of different types in the data table 623. For example, a binary integer stored in section 5 of the data table 623 may be added (ADD) to a BCD integer stored in section 7, and the result stored as a floating point number in section 6. The necessary data conversions are performed automatically and are completely transparent to the user.

Figure 17:
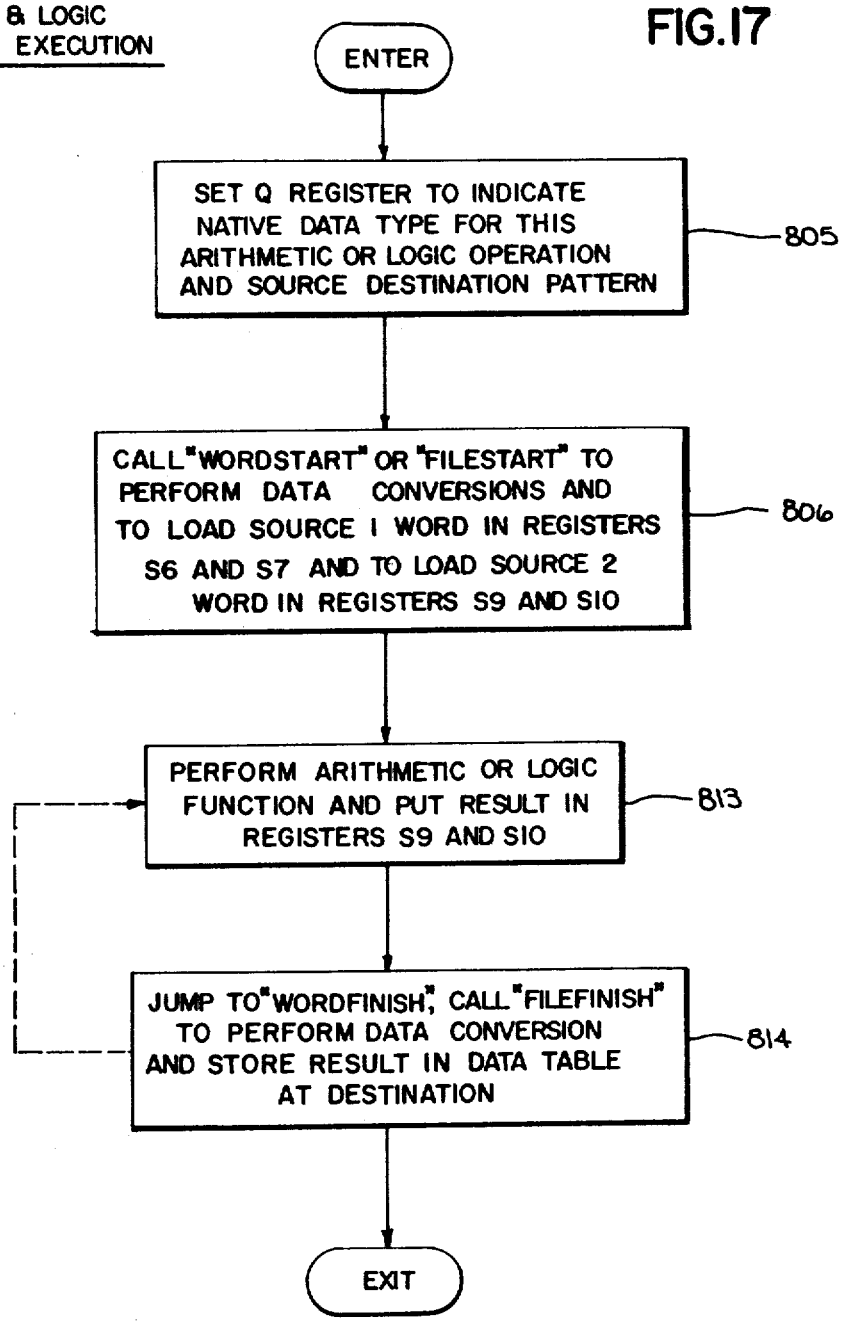
FIG. 17 is a flow chart which illustrates the execution of an arithmetic or logic instruction by the processor module of FIG. 2.

Referring particularly to FIG. 17, all arithmetic and logic instructions are executed using a set of common routines. The microcode for such an instruction includes microinstructions indicated by process block 805 which set a Q register in the ALU 26 to indicate the "native" data type for the particular operation being performed as well as the source/destination pattern. The native data type is the type employed by the central processor 24 to perform the arithmetic or logic operation. In the preferred embodiment, for example, all arithmetic operations are performed with signed, binary integers (SI). The source/destination pattern is determined by the operation being performed. For example, an ADD macroinstruction is accompanied by two source addresses and a destination address (SSD), whereas a square root macroinstruction (SQRT) is accompanied by a single source address and a destination address (SD).

Figure 18:
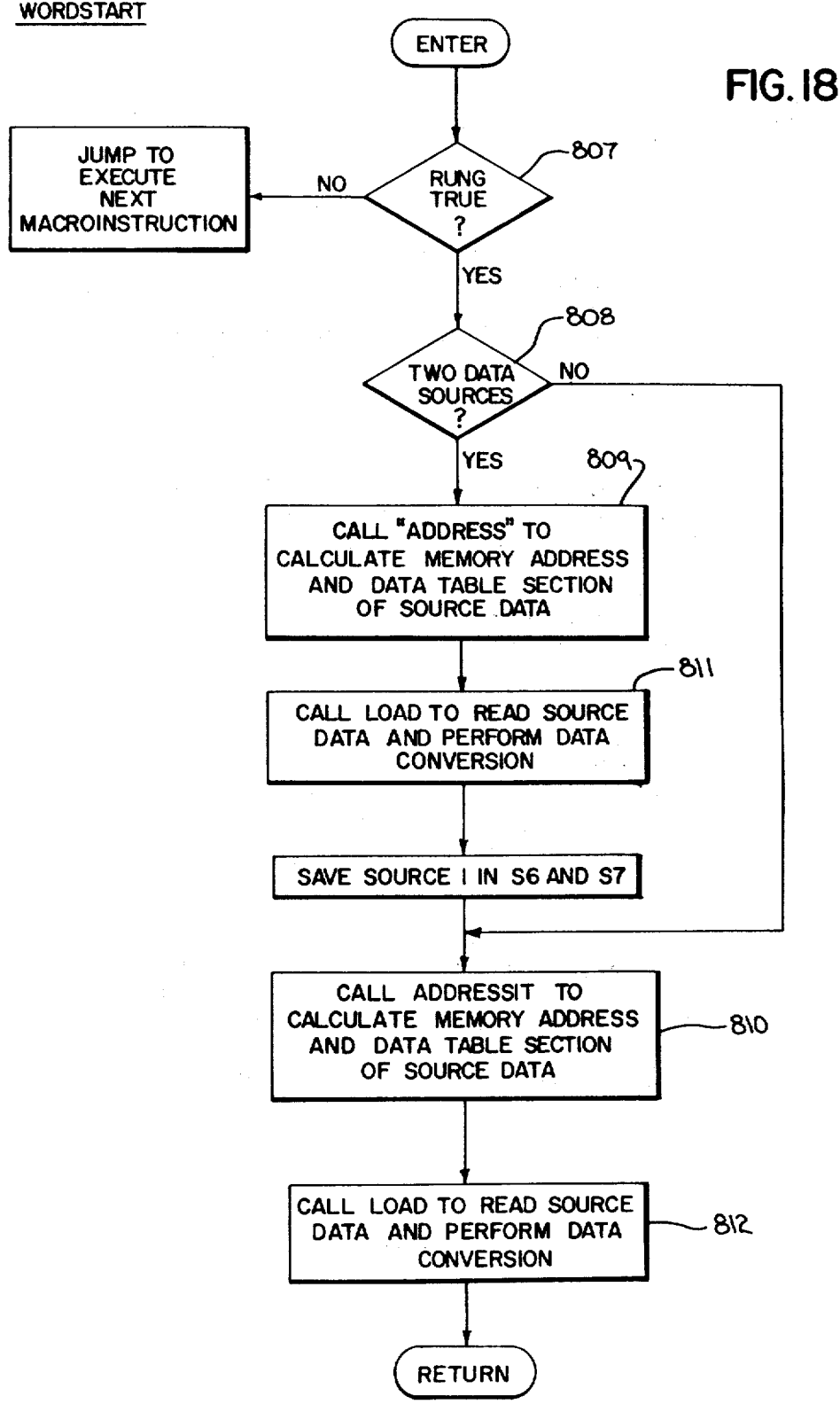
FIG. 18 is a flow chart which illustrates the execution of the wordstart microroutine which forms part of the flow chart of FIG. 17.

A subroutine is then called to read the indicated source data and convert it to the native data type. As indicated by process block 806, if a file is operated on, FILESTART is called, otherwise, WORDSTART is called. Referring to FIG. 18, the WORDSTART microsubroutine includes instructions indicated by decision block 807 which determine if the rung in which the macroinstruction is located is true. If not, the microroutine is exited and the next macroinstruction is executed. Otherwise, the Q register is tested at decision block 808 to determine if a single or double source of data is required. Subroutines indicated by process blocks 809 and 810 are called to read the source address(es) from the control program and calculate the memory address(es) of the source data and their data table section number. A subroutine indicated by process blocks 811 and 812 is then called to read the source data and convert it to the native data type. The converted source data is stored in ALU registers S6 and S7 and registers S9 and S10 prior to returning to the calling routine.

Referring again to FIG. 17, the arithmetic or logic function is then performed on this converted source data as indicated at process block 813. The result is stored in ALU registers S9 and S10 and a subroutine indicated by 814 is then executed to convert the result and write it to the destination address. A FILEFINISH subroutine is called when a file is being operated upon, otherwise a WORDFINISH subroutine is called.

Figure 19:
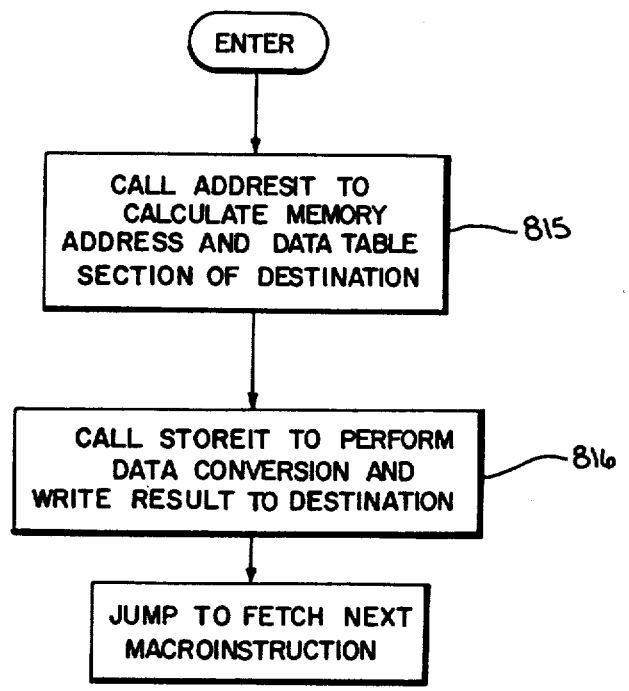
FIG. 19 is a flow chart which illustrates the execution of the wordfinish microroutine which forms part of the flow chart of FIG. 17.

Referring to FIG. 19, the WORDFINISH subroutine calls the ADDRESSIT subroutine as indicated by process block 815 to calculate the memory address and data table section number of the destination address contained in the macroinstruction. A subroutine (STOREIT) indicated at 816 is then called to perform the necessary data conversion on the result in registers S9 and S10 and to write the converted data to the calculated memory address. The system then jumps to a routine for reading the next macroinstruction and mapping to its associated microprogram.

The microcode for many of these subroutines is listed in Appendix B.

Figure 20:
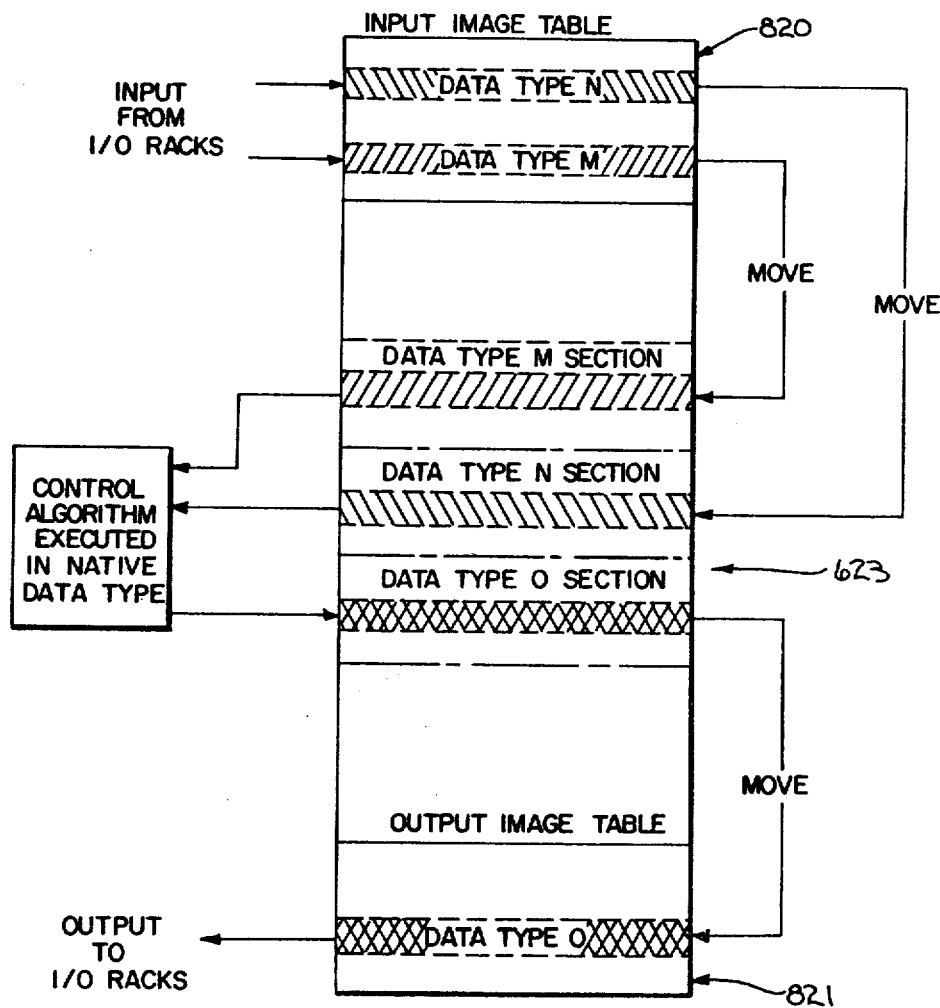
FIG. 20 is a schematic representation of the flow of data and the conversions that are performed on such data by the processor module of FIG. 2.

Referring particularly to FIG. 20, the transparent data conversions which are made during the execution of arithmetic and logic macroinstructions assume that the operands are stored in the appropriate data table sections. As will be explained in more detail below, the I/O modules 6 and 7 operate to input data of various types from the I/O racks 16 and store such data in the input image table 820. Similarly, the I/O modules 6 and 7 output data from the output image table 821 directly to the I/O racks 16. The user must transfer the data from the input image table 820 to the proper section in the data table 623 using the "MOVE" macroinstruction in the control program. Similarly, altered data in the data table 623 must be transferred to the output image table 821 by a MOVE macroinstruction in order to output it to the proper I/O rack 16. The MOVE macroinstruction is unique in that it does not perform a data conversion when it is transferring data from the input image table 820 or to the output image table 821.

In the example illustrated in FIG. 20, the user's control program may contain macroinstructions which perform the following functions:

| MOVE | type n data word from input image table to type n data table section; |
|------|--------------------------------------------------------------------|
| MOVE | type m data word from input image table to type m data table section; |
| ADD  | type n data word to type m data word and store result as type o data word; |
| MOVE | type o word to output image table address corresponding to desired I/O rack. |

It should be apparent that other macroinstructions can be employed to implement any desired control algorithm. Also, regardless of the complexity of this algorithm, the user need not be concerned about data conversions. Input and output circuits of various types may thus be employed in the I/O racks 16 to interface with the many commercially available sensing devices and operating devices used in industrial environments.

The sections of the data table 623 are divided into files. A file includes one or more data words and it is the smallest data structure supported by the system. Any data word within a file can be separately addressed and it can be either read from the memory module 2 when identified as a source operand, or written to the memory module 2 when identified as a destination operand. When the control program is comprised of macroinstructions which identify single memory words as operands, the execution time of each separate macroinstruction is relatively short and does not significantly effect the overall scan time of the programmable controller.

The programmable controller of the present invention will perform operations on entire files containing more than one memory word, and the effect of such macroinstructions on the scan time can be very significant. For example, and ADD macroinstruction which identifies files as its data sources will sequentially add each word in one source file to each corresponding word in the second source file and store the result in the destination file. If the files are large, the time required to execute such a macroinstruction may extend the control program scan time beyond acceptable limits.

This problem is solved by enabling operations to be performed on files in a distributed mode of operation. When a file operation is performed using the distributed mode, only a portion of each file is operated upon during a single scan through the control program. That is, rather than operating on the entire file each time the macroinstruction is executed, only a few words in the file are operated upon. Because the programmable controller repeatedly scans the control program, it performs the operation on additional words in the file during each scan until the entire file is completed. The rate at which the distributed file operation is performed determines the number of file words operated upon during each scan through the control program, and thus the total number of scans required to complete the file operation.

Referring particularly to FIG. 12, when an arithmetic or logic operation is performed on a file, the macroinstruction includes a file control word which indicates the manner in which the file operation is to be executed. The file control word takes one of four possible forms indicated at 825, 826, 827 or 828 in FIG. 12. The control word structures 825 and 827 are single words, whereas the structures 826 and 828 are double word structures which enable expanded addressing capability. The second bit in the first control word indicates if a single word (o) or double word (1) structure is defined. The first bit in the control word indicates if the distributed mode (1) of file operation is defined or not (o). The control word structures 827 and 828 relate to the distributed mode of file operation and they are distinguished by a rate number which indicates the number of file words to be operated upon during each scan through the control program. The control word structures 825 and 826 on the other hand, are distinguished by a mode number which indicates one of three modes in which the file operation can be performed. All four control word structures 825-828 include a counter pointer which designates a counter structure stored in section 4 of the data table 820. The designated counter is employed as an index register which is added to the source or destination operand address to calculate the absolute memory address of each file word.

There are thus four distinct modes in which file operations can be performed: DISTRIBUTED; ALL; INCREMENTAL; and NONE. For the DISTRIBUTED mode of operation, the operation to be performed on the file will start upon a false to true transition of the rung decision and it will continue until the entire file is processed. During any single scan through the control program, however, only the number of words indicated by the rate number will be operated upon. An enable bit is set during the file operation to indicate that the operation has started, but is not complete. Upon completion of the entire file, a file done bit is set and when the rung decision then goes false, the counter, file done bit and enable bit are all reset.

The ALL mode of operation is similar to the DISTRIBUTED mode of operation, but the entire file is operated upon during the program scan in which the rung decision goes true. Although the file operation is thus performed faster, if the file is large, this mode of operation can significantly increase the control program scan time, and hence degradate the response time of the programmable controller.

The INCREMENTAL mode of operation is similar to the DISTRIBUTED mode in that one file word is operated upon during each scan through the control program (i.e. the rate=1). A significant difference however, is that each individual operation requires a false to true transition of the rung decision.

The NONE mode of operation performs the indicated function on the file word pointed to by the counter. The counter is not incremented and the operation is performed once during each scan through the control program as long as the rung decision remains true.

Figure 23:
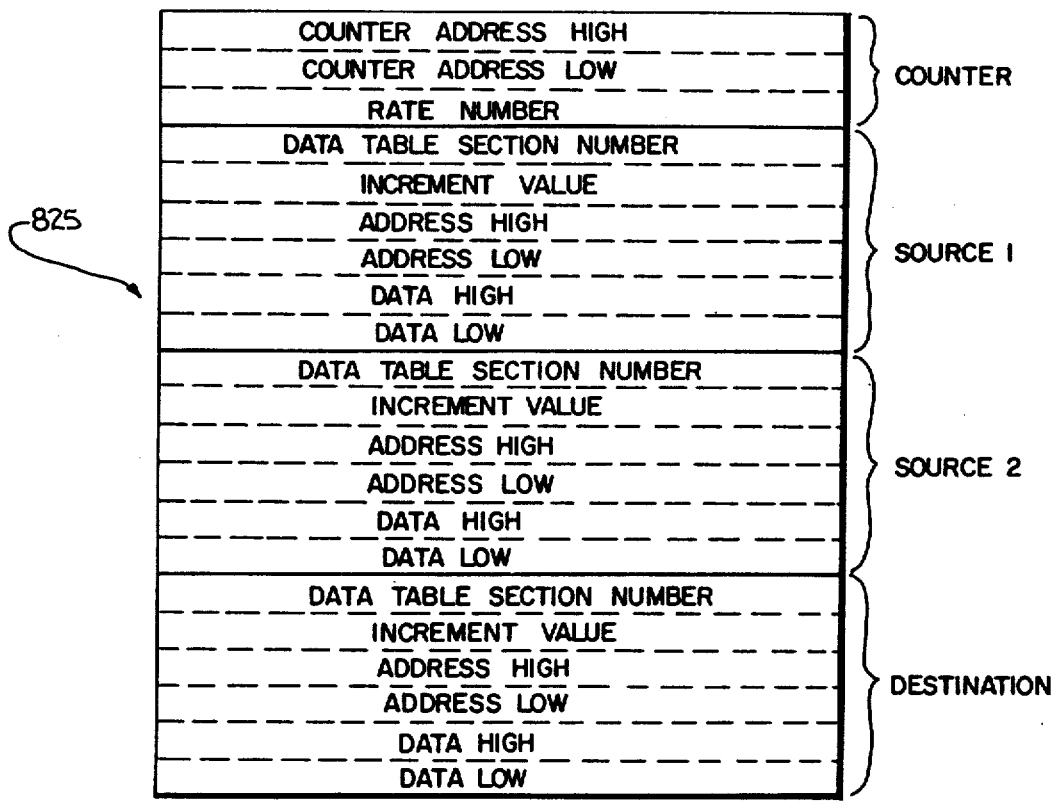
FIG. 23 is a schematic representation of a pointer table which is employed by the processor module during the execution of arithmetic and logic instructions as illustrated in FIG. 17.

The file operations are implemented by employing two distinct microroutines during the execution of macroinstructions. These are labeled FILESTART and FILEFINISH and they are listed in Appendix C. These microroutines employ a pointer table 825 which is stored in the processor read/write memory 12 and which is illustrated in FIG. 23. The pointer table 825 is initialized at the start of each file operation and it is employed to store the base address of each source file and the destination file as well as the address of the counter which is used as an index into those files. The pointer table 825 also stores a rate number and other data which is employed by the FILESTART and FILEFINISH microroutines.

Referring particularly to FIG. 13, the counter structure associated with each file operation includes a control word, preset value word and accumulated value word. The control word stores a done bit (D) and an enable bit (E) which are employed to control file operations as will now be explained.

Figure 21:
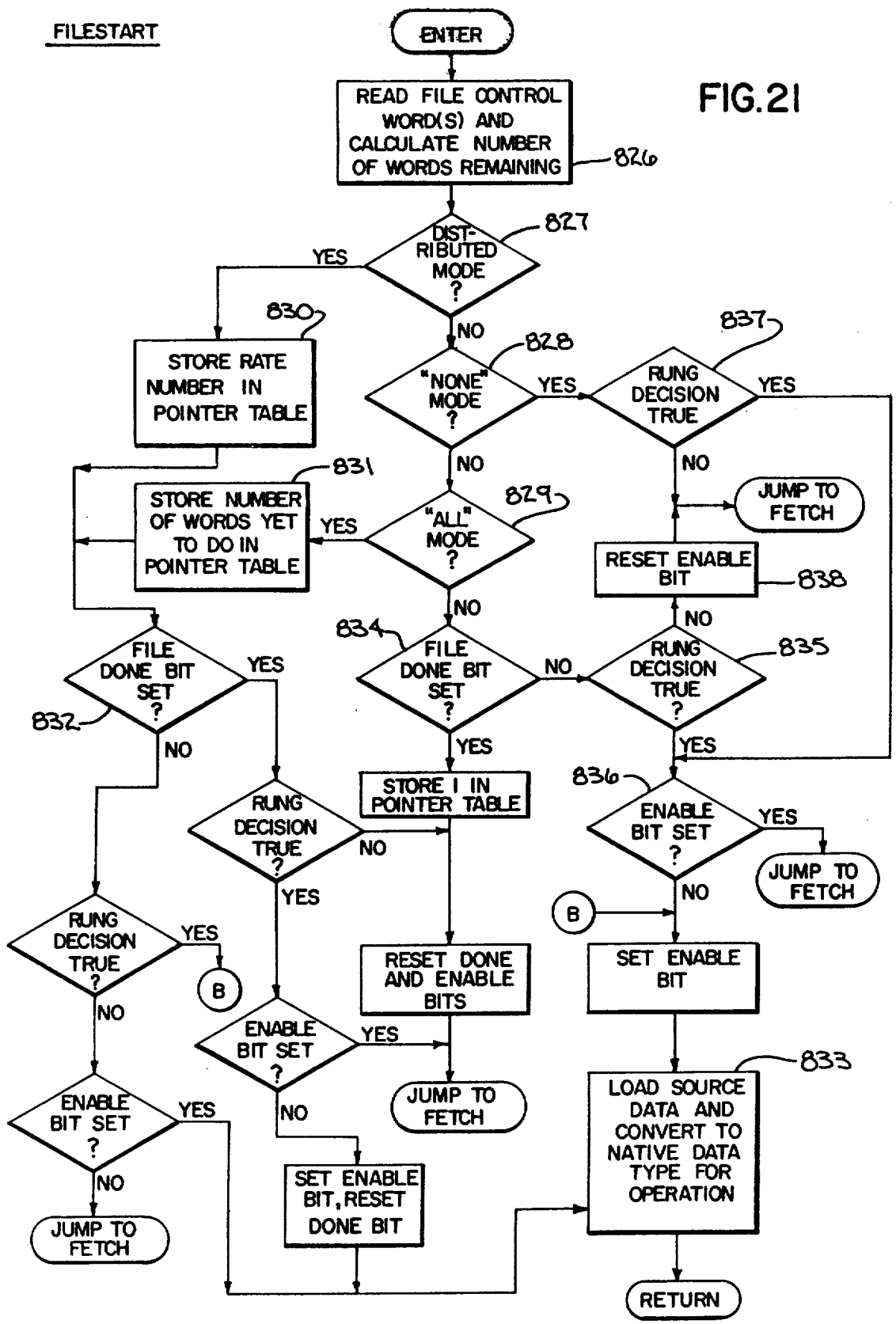
FIG. 21 is a flow chart which illustrates the execution of the filestart microroutine which forms part of the flow chart of FIG. 17.

Referring particularly to FIG. 21, the FILESTART microroutine is called when an operation is to be performed on a file. As indicated by process block 836 it includes microinstructions which read the file control word portion of the macroinstruction and initialize the pointer table 825 with the indicated data. A series of tests indicated by decision blocks 827-829 are then performed to determine the mode in which the file operation is to be performed. If in the distributed mode, the rate number from the file control word is loaded into the pointer table 825 as indicated by process block 830. On the other hand, if in the "ALL" mode, the total number of file words is loaded into the pointer table 825, as is indicated by process block 831. In either case, if the DONE bit is not set, as indicated at decision block 832, the file operation is performed on the addressed source words as indicated by process block 833.

If the file operation is in the "NONE" mode or the "INCREMENTAL" mode, the indicated logic or arithmetic operation is performed on single file words. If the INCREMENTAL mode is indicated and the DONE bit is not set, as determined at decision block 834, an operation is performed on the addressed file word(s) if the rung decision is true at 835 and the enable bit is reset as indicated at 836. If in the "NONE" mode, the same result occurs if the rung decision is true as indicated at 837 and the enable bit is set. The enable bit is reset at 838 each time the rung decision goes false when in the INCREMENTAL mode, and hence an operation on a single file word(s) is performed after each false-to-true transition of the rung status. Similar tests of the done and enable bits and the rung decision bit are made in all modes of operation. These tests are indicated by the remaining decision and process blocks in FIG. 21.

When the system returns from the FILESTART microroutine, the logical or arithmetic operation is performed on the file word(s) indicated by the pointer table 825 and the associated counter structure. Following this, a call to the FILEFINISH microroutine is made to determine if the operation is completed or if further file words are to be processed during the current scan through the control program.

Figure 22:
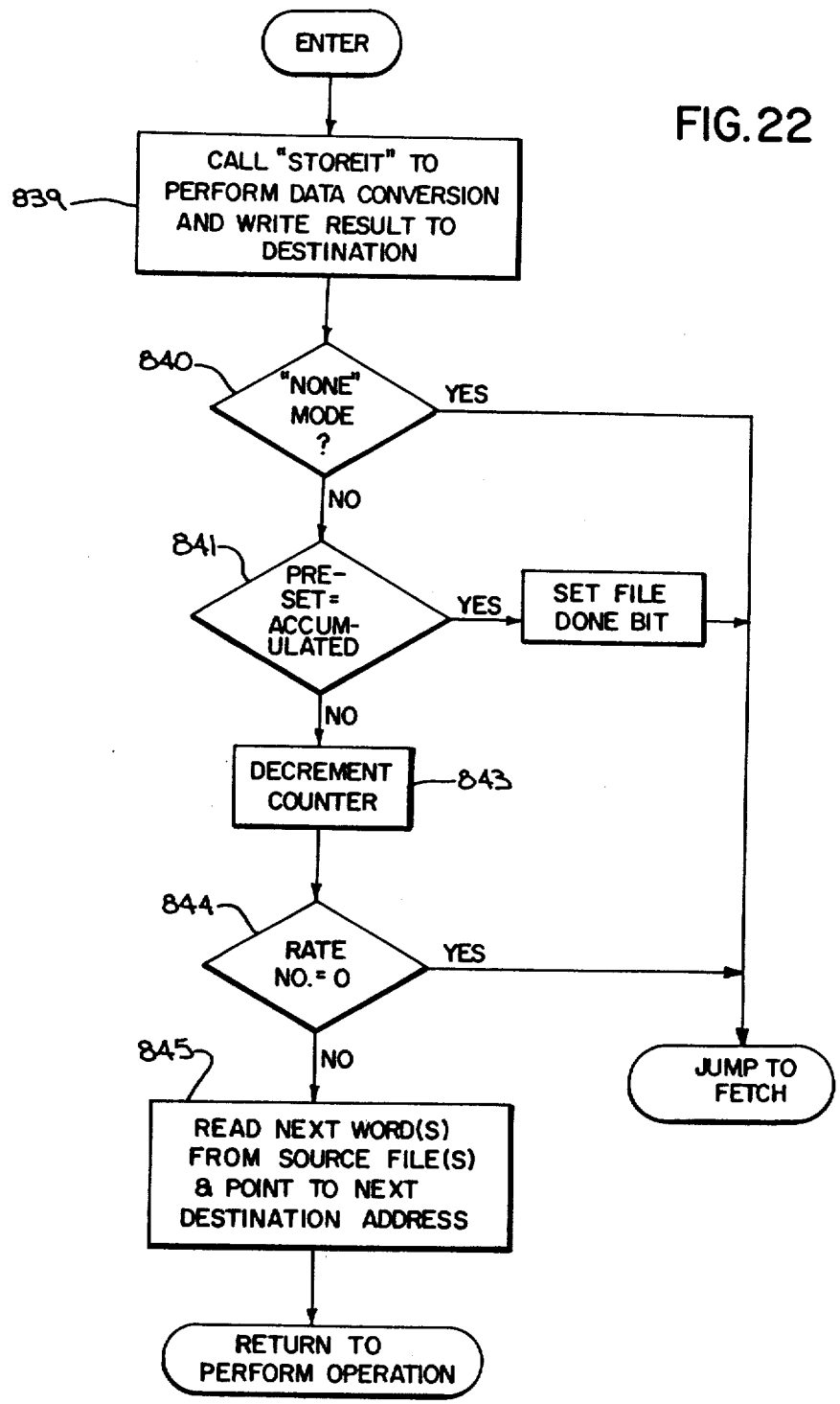
FIG. 22 is a flow chart which illustrates the execution of the filefinish microroutine which forms part of the flow chart of FIG. 17.

Referring particularly to FIG. 22, when the FILEFINISH microroutine is entered the "STOREIT" microroutine is called as indicated at 839 to write the result of the logic or arithmetic operation to the destination address in the data table 623. As explained previously, this microroutine also performs any necessary data conversions. If the NONE mode is active as determined at decision block 840 the system returns to fetch and execute the next macroinstruction, otherwise, the counter preset and accumulated values are checked at 841 to determine if the file has been completely operated upon. If so, the DONE bit is set at 842 and the next macroinstruction is fetched and executed. If the file has not been completely operated upon, the rate counter in the pointer table is decremented at 843 and tested at decision block 844 to determine if further file words are to be operated upon during this program scan. If not, the next macroinstruction is executed, otherwise, the next source file word, or words, are read from the data table 623 and the next destination address is calculated as indicated at 845. The system then returns to the microroutine from which it was called to perform another operation on the addressed file words.

System I/O Scanner Module

The system I/O scanner 7 is a single board microprocessor based module which directly interfaces the system backplane bus 1 with from one to four serial I/O buses which each connect to one or more I/O racks 16. The module 7 will also support communications with the front panel interface 11, and through a connector on the front panel interface 11, the system I/O scanner module 7 will also support the terminal 8. Indeed, although the system I/O scanner module 7 may be employed along with the other system modules as shown in FIG. 1, it is contemplated that the module 7 may also be configured as the sole means for performing I/O functions on small systems containing only a CPU module 3, a memory module 2 and a front panel interface 11.

Figure 7:
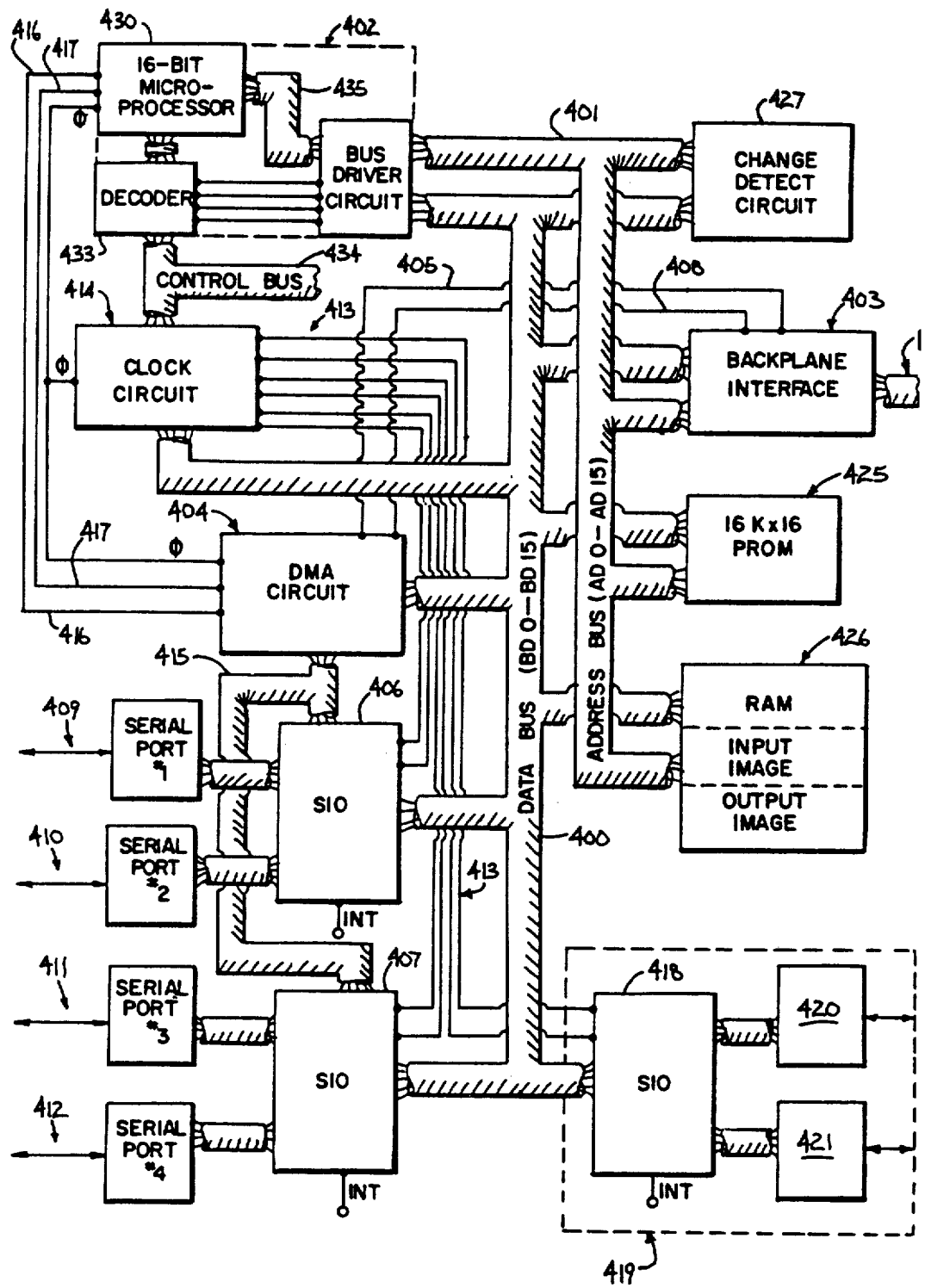
FIG. 7 is a block diagram of the I/O interface module which forms part of the system of FIG. 1.

Referring particularly to FIGS. 1 and 7, the system I/O scanner module 7 is structured about a sixteen-bit data bus 400 and a sixteen-bit address bus 401 which are controlled by a microprocessor circuit 402. The buses 400 and 401 are coupled to the system backplane bus 1 through a backplane interface circuit 403 and when data is to be transferred to or from the system backplane bus 1, the backplane interface circuit 403 makes a request to a DMA circuit 404 through a BPREQ control line 405. The DMA circuit 404 acknowledges the request through a BPACK control line 408 when the backplane interface circuit 403 can have access to the buses 400 and 401 to perform its data transfer.

The DMA circuit 404 responds not only to requests from the backplane interface circuit 403, but also to similar requests received from two serial input/output circuits (SIOs) 406 and 407. The two SIOs 406 and 407 provide an interface to four serial I/O buses 409, 410, 411 and 412 which connect to I/O racks 16. The two channels in each SIO 406 and 407 are driven by clock lines 413 which connect to a clock circuit 414. When the SIOs 406 or 407 are ready to transmit a message or have received a message from a serial port 409-412, they generate a request signal to the DMA circuit 404 through a bus 415. The DMA circuit 404 generates a DMA request to the microprocessor 402 through a request line 416, and when the microprocessor 402 completes execution of its current instruction, it grants the DMA request through a line 417. The DMA circuit 404 then takes control of both the buses and the SIOs 406 and 407 to perform the message data transfer. When an end-of-message character is received by an SIO 406 or 407, it generates an interrupt request on control line INT to the microprocessor 402. As will be explained below, the microprocessor 402 responds to the interrupt by transferring the incoming message to the proper module in the system and by sending a message to one of the I/O racks 16.

Referring particularly to FIG. 7, a third SIO 418 also connects to the module data bus 400 and is driven through a pair of the clock lines 413. The SIO 418 forms part of an optional circuit 419 which interfaces the module 7 to the front panel 11 through a pair of serial ports 420 and 421. Both serial ports 420 and 421 connect to lines in the system backplane bus 1 which in turn connect to the ribbon connector leading to the front panel. Serial port 420 exchanges data at 4800 baud with the processor in the front panel circuit 11 and the serial port 421 exchanges data through an RS 232C connector which is mounted on the front panel. The SIO 418 is interrupt driven and when data is received, the microprocessor 402 is interrupted and vectored to the proper interrupt service routine.

The microprocessor 402 operates in response to instructions which are stored in a read-only memory (PROM) 425. These include interrupt service routines which are executed in response to interrupt requests on the INT control line, programs for executing tasks and communicating through the system backplane 1 with other modules in the system, and programs for configuring and driving the SIOs 406, 407 and 418.

The primary function of the system I/O scanner module 7 is to couple input/output data between the I/O image and data table 12 in the CPU module 3 and the I/O racks 16 which connect to the scanner module 7. The speed with which the scanner module 7 performs this function is an important factor in the operation of the programmable controller system and the preferred embodiment of the invention provides a unique structure to accomplish this. More specifically, a random access memory (RAM) 426 connects to the module buses 400 and 401, and in addition to providing work space for the microprocessor 402, it stores a copy of the output portion of the CPU module's I/O image table memory 12. The microprocessor 402 continuously updates the image table in the RAM 426 by reading output status data from the CPU module 3 and reading input status data from the I/O racks 16. The microprocessor 402 also continuously writes its output image table data to the I/O racks 16 and writes its input status data to the CPU module 3. This continuous updating, or "refreshing", of the I/O devices and associated I/O image tables is done at a relatively low priority and it is performed regardless of whether or not changes are occurring in the status of input/output devices.

Superimposed on this I/O refresh process is a high speed I/O update process which couples data indicative of changes in input/output status data. When data is written to the image table in the RAM 426 by the CPU module 3 (via the backplane interface 403) a change detect circuit 427 is enabled and stores an indication of which line in the RAM image table 426 was changed. The microprocessor 402 operates to repeatedly test the change detect circuit for such changes in I/O status data, and when a change is detected, to rapidly relay the detected change on to the I/O rack 16. In this manner, changes in status data are rapidly processed while the continuous I/O refresh process of all I/O points is carried on in the background.

The system I/O scanner module 7 is thus structured to quickly relay any changes in output points dictated by the CPU module 3 on to the proper I/O rack 16 and to relay any changes in input points detected by the I/O racks 16 on to the CPU module 3. Secondarily, the I/O scanner module 7 may be employed to interface with the terminal 8 and the front panel 11 and it may be employed to initialize the memory module 2 during power-up. For a more detailed description of its structure, reference is made to co-pending U.S. patent application Ser. No. 313,365 filed on Oct. 21, 1981 and entitled "Modular Programmable Controller."

Referring particularly to FIGS. 1, 7, and 14A, the I/O scanner module 7 is responsible for initializing the programmable controller system during power-up, and for performing tasks associated with its six serial ports and its backplane interface. These functions are coordinated by a scheduler program 650 which is entered from any of four interrupt service routines 651–654 or from any of eight task programs 655–662. The scheduler 650 determines which of the tasks 655–662 should be executed by examining a linked list of task control blocks which are stored in the RAM 426 and indicated at 663. If more than one task is to be executed, the scheduler selects that task having the highest priority. That is, the scheduler examines the task control blocks 663 to determine if the I/O scan task 655 is to be executed, then it determines if the block transfer task 656 is to be executed, followed by the front panel serial driver 657, the backplane driver 658 and the timer utility 659. One of the three tasks 660, 661 or 662 is then given priority and the cycle repeats.

The task control blocks 663 store bits of data which indicate those tasks that are ready to be executed. These bits may be set by any of the tasks or by one of the interrupt service routines 651–654. For example, when the real time clock interrupts every one millisecond, the interrupt service routine 651 is executed to make an entry into the task control block 663 which indicates that the timer utility task 659 is to be executed. The scheduler 650 is then entered, and if no other tasks are ready to run, or if the timer utility 659 has priority, the task 659 will then be executed. An interrupt from the front panel 11 or the serial port on the front panel 11 is serviced by the routine 654 which sets a bit in the task control block 663 for either the front panel task 661 or serial port task 662. When these tasks 661 or 662 are then executed, they interpret commands and may in turn set a bit in the task control block for the front panel driver task 657 which transmits data back to the front panel 11.

When an interrupt occurs as a result of data received from one of the I/O racks 16, the service routine 653 is executed. This I/O rack interrupt service routine 653 not only determines which I/O rack 16 requires service, but it also determines if a block transfer of data from the I/O rack 16 has occurred. If so, the block transfer task 656 is enabled; otherwise, the I/O scan task 655 is enabled. The block transfer function is described in more detail in co-pending U.S. patent application Ser. No. 242,132 which was filed on Mar. 9, 1981, and which is entitled "Programmable Controller for Executing Block Transfer With Remote I/O Interface Racks". The I/O scan task 655 will now be described in connection with a power-up routine 664.

Figure 14B:
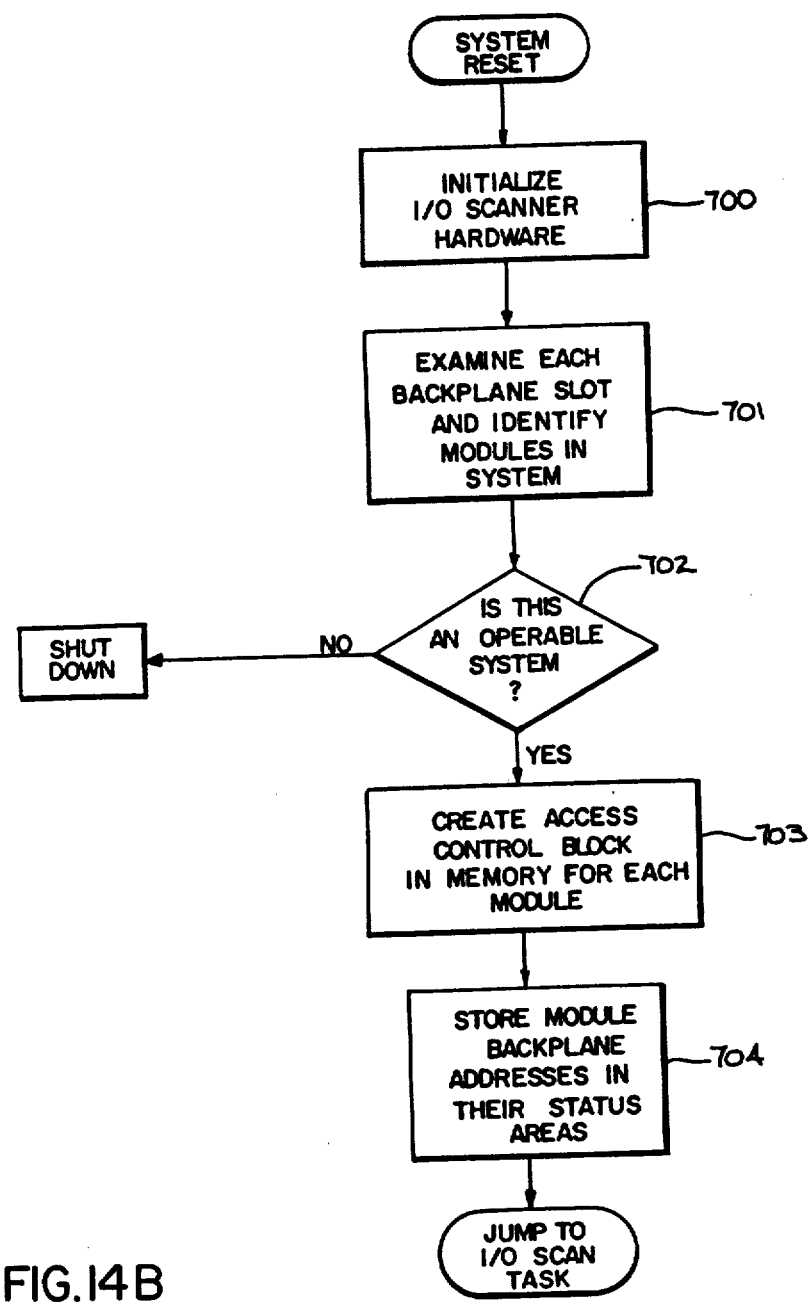

Referring particularly to FIGS. 1, 7 and 14B, the power-up routine in the I/O scanner module 7 is responsible for initializing the programmable controller system during power up. As indicated by process block 700, the first task, however, of the I/O scanner module processor 402 is to execute instructions which initialize the I/O scanner module 7 itself. This includes initialization of the SIOs 406, 407 and 419, the clock circuit 414, the change detect circuit 427 and the RAM 426. The processor 402 then executes instructions indicated by process block 701 to read from each backplane bus module slot to determine what modules are present in the system and which 256K address space they occupy. Instructions indicated by decision block 702 are then executed to determine if an operable programmable controller is configured. If not, the system shuts down.

The I/O scanner module 7 then initializes the sections 620–623 of the memory module 2. More specifically, it creates access control blocks 621 for each module connected to the backplane bus 1 as indicated by process block 703 and it sets up the module status areas 622 as indicated by process block 704. The I/O scanner module 7 also sets the system status counter 606 to the number of modules which require initialization and it sets the I/O prescan counter 610 to the number of I/O scanner modules and I/O bus interface modules present in the system. The power-up routine is then exited and the I/O scan task 655 is entered to complete system initialization.

Figure 14C:
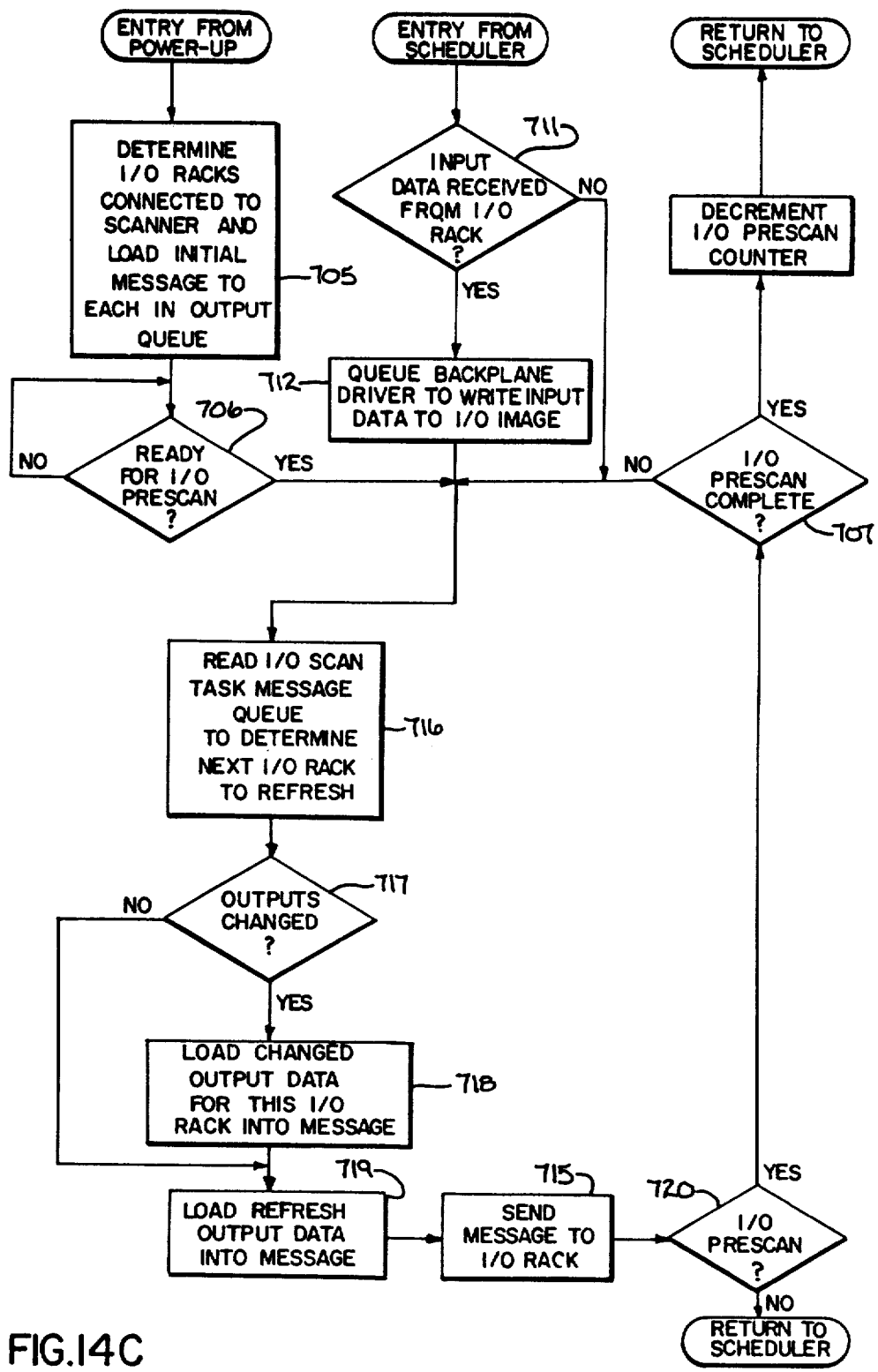

Referring particularly to FIG. 14C, the I/O scan task 655 is entered initially from the power-up program 664. As indicated by process block 705, its first function is to perform an I/O prescan of the I/O racks 16 which are connected to the I/O scanner module 7. More specifically, the adaptors 17 on each I/O rack 16 are interrogated to determine the number and nature of each I/O circuit in the rack 16. Initialization messages are then created and stored in a message queue in the RAM 426 and the module 7 then checks to determine if it can begin the I/O prescan, as indicated by decision block 706.

The I/O scanner module 7 then enters a loop in which messages are output to all I/O racks 16. These initial messages turn all output devices off, and in response, messages are received from each I/O rack 16 which contain data concerning the state of all input devices. When this I/O prescan is complete as determined at decision block 707, the I/O scanner module 7 decrements the I/O prescan counter 610 in the memory module 2 to notify the CPU module 3 that initialization is complete.

Referring particularly to FIGS. 14A and 14C, each time the I/O scanner module 7 receives a message from an I/O rack 16, an interrupt is generated and the I/O rack interrupt routine 653 is executed to queue up the I/O scan task 655. When the I/O scan task is subsequently entered, a check is made at decision block 711 to determine if input data was received. If it was, this data is written into a message queue for the backplane driver task 658 and that task is enabled to write the data to the I/O image table in the CPU module RAM 12 as indicated at process block 712. After the input data has been processed, the I/O scanner module 7 sends output messages to the I/O racks 16. As indicated by process block 716, the message queue for the I/O scan task is examined to determine the next I/O rack 16 to receive refresh output data from the I/O scanner module's output image table. In addition, the change detect RAM 475 is examined to determine if any outputs involving the same I/O rack 16 have been changed. This is accomplished by instructions indicated by decision block 717, and when "change" data is found, it is loaded into the output message queue as indicated by process block 718. As indicated by process block 719, the refresh data is loaded into the output message queue, and it, along with any change data, is sent to the proper I/O rack 16.

A test is made at decision block 720 to determine if this is part of the I/O prescan process, and if not, the I/O scanner module 7 returns to the scheduler to perform other tasks.

It should be apparent that in the preferred embodiment of the invention described herein the I/O scanner module 7 performs a substantial portion of the system initialization during power up. It is also possible to program the peripheral processor module 5, the system I/O bus interface module 6, or the CPU module 3 to perform the system initialization functions. It is necessary, however, that one system module initialize the memory module data structures, since it is these data structures which enable the various system modules to operate in a coordinated manner as a programmable controller.

System Communications

Figure 16:
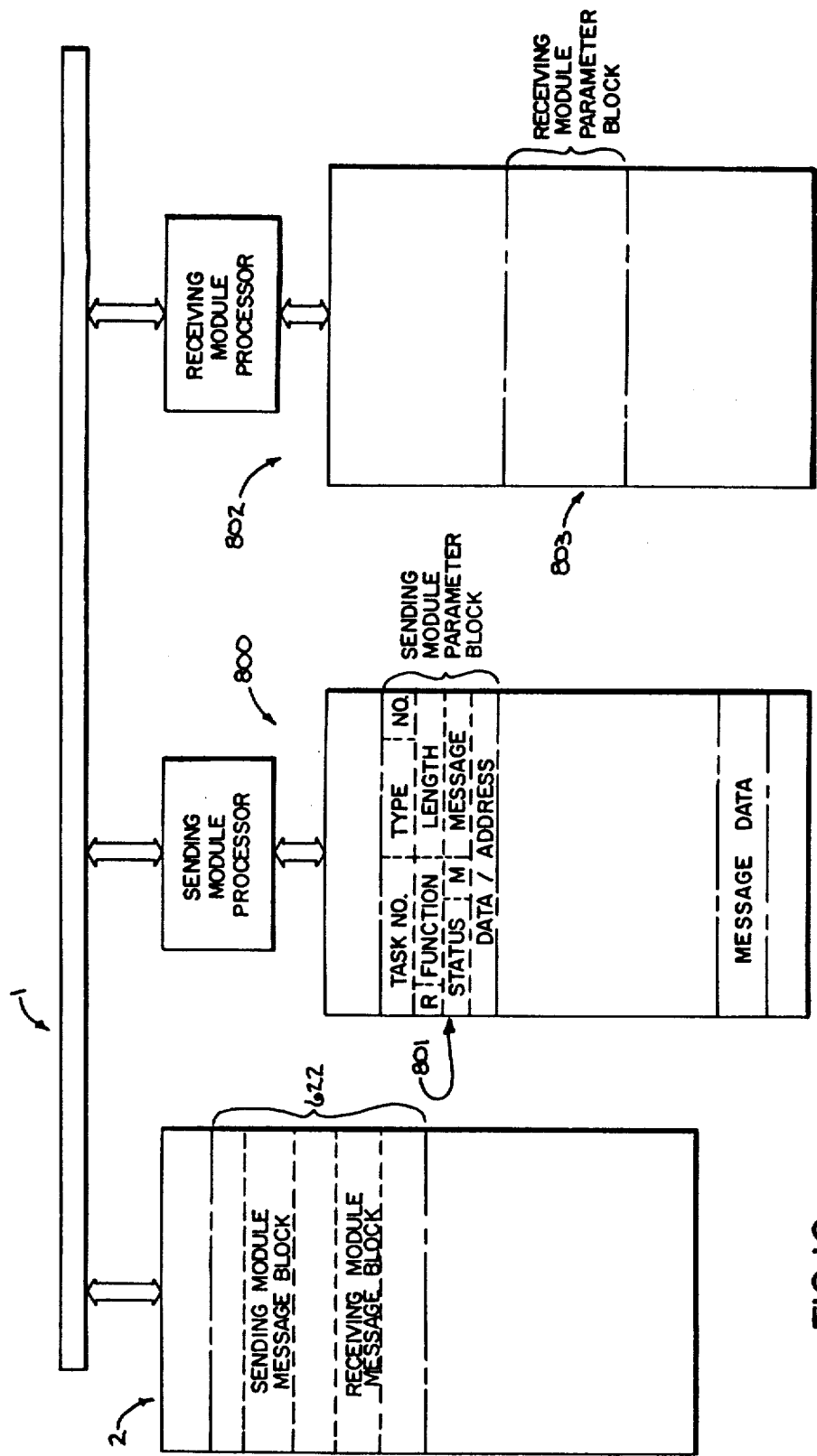
FIG. 16 is a schematic representation of a portion of the system of FIG. 1 used to describe the communication of messages between modules connected to the system backplane bus.

Referring particularly to FIGS. 1, 9C and 16, communication between the modules on the backplane bus 1 is established using the module status blocks 622 stored in the memory module 2. The CPU module 3, the system I/O interface module 6, the peripheral processor module 5, the system I/O scanner module 7 or the communications network module 4 may originate, or send, a message over the backplane bus 1 and any of these same modules may be the designated destination, or receiving, module. As described above with respect to the system I/O scanner module 7, these modules may perform more than one task, and hence the message may originate from a particular task within one module and be received by a particular task in another module. The proper transmission and receipt of messages is carried out by a message handler task on each module which will now be described in more detail.

Referring particularly to FIGS. 9C and 16, when a sending module 800 wishes to send a message to another module, 802, its message handler creates a parameter block 801 and writes the address of that block 801 into the status block 622 for the receiving module 802. More specifically, the sending module message handler loads the parameter block address into the "message address" portion of the module status block 622 at the location indicated by its "next-in pointer". The sending module message handler then increments the next-in pointer number and generates the interrupt address of the receiving module 802 on the system backplane bus 1.

The receiving module 802 includes a backplane message interrupt routine which is executed when the receiving module's interrupt address appears on the backplane bus 1. This routine examines its module status block 622 stored in the memory module 2 to obtain the backplane address indicated by the "next-out pointer". Using this address the receiving module 802 reads the parameter block 801 from the sending module's memory, writes a copy 803 in its own memory, and updates the next-out pointer. The task in the receiving module for which the message is intended is notified of the message, and when that task is subsequently executed, it responds to the message. One response is to reply to the message by altering the receiving module parameter block 803, placing the address of the modified block 803 in the sending module's message block 622, and generating the sending module's interrupt address on the system backplane bus 1. The sending module services this interrupt by copying the receiving module parameter block 803 back to its own memory at 801 where the appropriate sending module task can operate on it. Two way communications is thus established and is "transparent" to the tasks on each module.

| Component Appendix - Central Processor | |
|---|---|
| Reference No. | Description |
| 54, 89, 189 | Quadruple D-type flip-flops 74LS175 manufactured by Texas Instruments, Inc. |
| 33 | Microprogram Controller AM2910 manufactured by Advanced Micro Devices, Inc. |
| 42 | 2K × 4 PROM 82S185 manufactured by Signetics, Inc. |
| 31, 41 | 2K × 8 PROM 82S191 manufactured by Signetics, Inc. |
| 32, 47, 58, 116, 117, 130 131, 132, 139, 73 | Octal D-type transparent flip-flops 74LS374 manufactured by Texas Instruments, Inc. |
| 39 | Octal D-type flip-flop 74LS273 manufactured by Texas Instruments, Inc. |
| 46, 48, 80, 161, 112 | Octal buffers & line drivers 74LS244 manufactured by Texas Instruments, Inc. |
| 43 | Two 32 × 8 PROMS 82S123 manufactured by Signetics, Inc. |
| 26 | Four 4-bit bipolar microprocessor slices AM2903 manufactured by Advanced Micro Devices, Inc. |
| 51 | Data selector/Multiplexer 74LS151 manufactured by Texas Instruments, Inc. |
| 109, 113, 138 | Octal D-type transparent Latch 74LS373 manufactured by Texas Instruments, Inc. |
| 140, 63, 76 | Four synchronous 4-bit counters 74 LS163 manufactured by Texas Instruments, Inc. |
| 67 | Dual 4-bit binary counters 74LS393 and Dual 4-bit decode counters 74LS390 manufactured by Texas Instruments, Inc. |
| 83–88 | Dual D-type positive edge triggered flip-flops 74S74 manufactured by Texas Instruments, Inc. |
| 102 | 8-bit addressable latch 74LS259 manufactured by Texas Instruments, Inc. |
| 91 | 8-line-to-3-line priority encoder 74LS148 manufactured by Texas Instruments, Inc. |
| 105 | Two 32 × 8 PROMs 82S123 manufactured by Signetics, Inc. |
| 150 | Two 4-bit magnitude comparators 74S85 manufactured by Texas Instruments, Inc. |
| 184, 185 | Four-bit shift registers 74S194 manufactured by Texas Instruments, Inc. |
| 196 | Synchronous 4-bit counter 74LSI63 manufactured by Texas Instruments, Inc. |

Appendix A

| Microfield Definition | | |
|---|---|---|
| Mnemonic | Control Lines & Device | Description |
| JUMP3 | microsequencer 33 | If register counter is not zero and condition is false, load PC from stack. When register counter is zero and condition is false, load PC from bus 44. If condition is true, increment PC. |
| CONT | microsequencer 33 | Increment PC. |
| LOOP | microsequencer 33 | If condition is true, |

Appendix A-continued

Microfield Definition

| Mnemonic | Control Lines & Device | Description |
|---|---|---|
| | | increment PC. Otherwise put stack in PC. |
| LOAD | microsequencer 33 | Load register counter from bus 44. |
| RET | microsequencer 33 | Pop stack and load in PC. |
| AGAIN | microsequencer 33 | Loop until register counter is zero then load PC from bus 44. |
| BACK | microsequencer 33 | Same, but load PC from stack. |
| JUMP2 | microsequencer 33 | If condition true, load PC from bus 44. Otherwise, load PC from register counter. |
| VECT | microsequencer 33 | Input microaddress from bus 44. |
| CALL2 | microsequencer 33 | Same as JUMP2, but save PC on stack. |
| PUSH | microsequencer 33 | Load register counter from bus 44, push PC on stack. |
| JUMP | microsequencer 33 | Input microaddress from bus 44. |
| MAP | microsequencer 33 | Input microaddress from bus 44. |
| CALL | microsequencer 33 | Push address to stack, get target from bus 44. |
| RESET | microsequencer 33 | Force PC to zero, clear stack pointer. |
| PIPE | data selector 45 | Select data from bus 44. |
| ALV16 | data selector 45 | Select data from bus 44 and bus 40 and put on bus 44. |
| MACRO | data selector 45 | Select data from bus 44 and ALU port 30. |
| IVECT | Interrupt interface 52 | Enable microaddress on to bus 44. |
| ALU | Gates 56 | Couple microaddress from ALU 26 to bus 44. |
| MAP | MAP ROM 41 | Enable microaddress on to bus 44. |
| VECT | VECTOR ROM 42 | Enable microaddress on to bus 44. |
| INSTR | Gates 46 | Couple macroinstruction to ALU port 27 |
| DATA | Gates 48 | Couple data from bus 22 to ALU port 27. |
| RAM | Gates 48 | Couple data from bus 22 to ALU port 27. |
| BFLOP | | Swap high and low bytes in ALU registers. |
| TIME | control line 75 | Read real time clock latch 73. |
| TIME | control line 81 | Read scan counter gates 80. |
| FLAGS | | Read status of flags saved in register. |
| ADDR | address latch 47 | Store address data in latch 47. |
| BACKL | control line 135 | Store LSB of address in latch 131. |
| FETHI | control line 144 | Store MSB of address in latch 139. |
| BACKH | control line 136 | Store MSB of address in latch 132. |
| FETCH | control line 141 | Load address in macro counter 140. |
| DATA | data latch 58 | Store data in latch 58. |
| BACKD | control line 133 | Store data in latch 130. |
| IRES | control line 108 | Enable decoder 107 to reset interrupt. |
| SYST TIME | control line 77 | Control backplane lines. Store time in scan counter 76. |
| IMASK | control line 103 | Enable addressable latch 102. |
| ILOAD | control line 123 | Load prefetched macro in register 39 |
| IMM | Gates 57 | Couple macroinstruction data to ALU port 28. |
| MASK | Bit Pointer ROM 43 | Generate bit pointer mask to ALU port 28. |
| NMASK | Bit Pointer ROM 43 | Generate inverted bit pointer mask. |
| HOLD | control line 185 | Activate backplane HOLD line 175. |
| BWH | control lines 185 and 187 | Activate backplane write line and hold it. |
| BRH | control lines 185 and 186 | Activate backplane read line and hold it. |
| WRITE | control line 164 | Write data on CPU bus 22. |
| READ | control line 166 | Read data on CPU bus 22. |
| BACKW | control line 187 | Write data on backplane bus 1. |
| BACKR | control line 186 | Read data on backplane bus 1. |
| ZER | | Set carry to zero. |
| ONE | | Set carry to one. |
| ZFL | | Set carry to ALU zero flag state. |
| CAR | | Set carry to carryout of previous ALU operation. |
| TRUE | STATUS MUX 51 | Was the result true? |
| FALSE | STATUS MUX 51 | Was the result false? |
| INTER | STATUS MUX 51 | Is an interrupt request present? |
| PARITY | STATUS MUX 51 | Is a parity error indicated? |
| CARRY | STATUS MUX 51 | Was there a carry? |
| NCARR | STATUS MUX 51 | Was there no carry? |
| OVER | STATUS MUX 51 | Was there an overflow? |
| MOVER | STATUS MUX 51 | Was there no overflow? |
| MINUS | STATUS MUX 51 | Was the result minus? |
| PLUS | STATUS MUX 51 | Was the result not minus? |
| ZERO | STATUS MUX 51 | Was the result zero? |
| NZERO | STATUS MUX 51 | Was the result not zero? |

Appendix B

Microprograms for Selected Macroinstructions
Label Definitions

| | |
|---|---|
| FETCH | Microroutine for fetching next macroinstruction. |
| FLUSH-PIPE | Throw away prefetched macroinstructions. |
| DUMP-PIPE | Skip long macroinstructions. |
| SAVE67 | Save ALU registers 6 and 7. |
| RESTR67 | Restore ALU registers 6 and 7. |
| OUTPUT | Start of output image table. |
| INPUT | Start of input image table. |
| SCANNERMAP | Map of I/O scanners. |
| JUMPTABLE | Table of target addresses for jumps. |
| SUBRLABELS | Table of target addresses for JSRs. |
| ENOUGHTIMES | Initial program scan counter. |
| FIRSTTIME | Flag set to one during first scan. |
| TIMEBASE | Type of timer code storage. |
| FETCHISAVE | Most significant bits of fetch counter. |
| FETCHI-FLSE | Most significant bits of fetch counter. |
| WORDRWFLG | Flag. |
| MSECSUBCTR | Counter for 1 millisecond interrupt. |
| DTXPOINT | Table pointers for active data. |
| PGADDR | Active program counter. |
| SCRATCH | General purpose scratch pad. |
| STCKSTRT | Stack used by branch control instructions. |
| SYSPARFLG | Parity bit in system status register. |
| SYSDOGFLG | Watchdog bit in system status register. |
| SYSBPLFLG | Backplane error bit in system status register. |
| SYS-STATSH | System status register in address bytes. |
| CPU-OPER | Flag indicating CPU is executing control program. |

Rung Control Macroinstructions

```
;BRANCH START (BST)
;THIS INSTRUCTION HAS THE OFFSET FROM THE NEXT INSTRUCTION TO THE
;NEXT NXB/BND INSTRUCTION.  THE ADDRESS OF THE NEXT CONDITIONAL
;INSTRUCTION IS SAVED ON A LIFO STACK ("PUSHED").  THE ADDRESS
;OF THE NEXT NXB/BND IS CALCULATED AND SAVED.  THE OR ACCUMULATOR
;IS INITIALIZED FALSE (0).  NO ADX IS POSSIBLE FOR THIS
;INSTRUCTION.
;REGISTER USAGE:
;               S0-PROGRAM COUNTER
;               S1-ADDRESS OF NEXT CONDITIONAL OR NXOB
;                  INSTRUCTION
;               S4-OR ACCUMULATOR
;               S12-9 OPERAND BITS CALCULATED DURING
;                     INSTRUCTION FETCH.
;               S13-LIFO STACK POINTER
BST-MAP
    DATA    N=S1                        ;SAVE OUTPUT ADDRESS ON STACK
    ADDR    S13-S13-#1
            S1-S12 AND #0FF    WRITE    ;S1=8 DISPLACEMENT BITS
                                        ;WRITE OUTPUT ADDRESS ON STACK
            S1-S0+S1                    ;CALCULATE AND SAVE ADDR. OF
                                        ;NEXT NXB/BND INSTRUCTION
                                        ;BY ADDING THE DISPLACEMENT
                                        ;TO THE PROGRAM COUNTER.
            S4=0, JUMP FETCH            ;SET OR ACCUMULATOR FALSE.
                                        ;GO GET THE NEXT INSTRUCTION.

---------------------------------------

;NEXT BRANCH (NXB)
;THIS INSTRUCTION EXAMINES THE RUNG CONDITION FROM THE PREVIOUS
;BRANCH.  IF TRUE, THE PROGRAM COUNTER IS SET TO THE ADDRESS
;OF THE NEXT NXB/BND.  IF FALSE, IT IS SET TRUE FOR THE NEXT
;BRANCH, THE OR ACCUMULATOR IS LEFT FALSE, AND THE "PROGRAM
;COUNTER IF FALSE" REGISTER IS SET TO THE ADDRESS OF THE NEXT
;NXB/BND.  THE DISPLACEMENT IN THIS INSTRUCTION IS FROM THE NEXT
;INSTRUCTION TO THE NXB/BND.
;REGISTER USAGE:
;               S0-PROGRAM COUNTER
;               S1-ADDRESS OF NEXT NXB/BND
;               S3-RUNG DECISION (0=FALSE, FFFF=TRUE)
;               S4-OR ACCUMULATOR (0=FALSE, FFFF=TRUE)
;               S12-9 OPERAND ADDRESS BITS CALCULATED DURING
;                     INSTRUCTION FETCH.
NXB-MAP
        S1=S12 AND #0FF                 ;S1-DISPLACEMENT
        S1=S0+S1                        ;CALCULATE ADDRESS OF NEXT
                                        ;NXB/BND IN S1.
        S4=S4 OR S3, LOAD FLUSH-PIPE    ;OR ACCUM=OR ACCUM OR RUNG DEC.
                                        ;SETUP FOR 2-WAY JUMP.
        S3=HIGH, JUMP2 FETCH ZERO       ;SET RUNG DECISION TRUE.  GET
                                        ;NEXT INSTRUCTION IF OR ACCUM.
                                        ;IS STILL FALSE.  OTHERWISE
                                        ;GO DIRECTLY TO THE NEXT
                                        ;NXB/BND INSTRUCTION BY
                                        ;JUMPING TO FLUSH-PIPE.

---------------------------------------
```

```
;BRANCH END (BND)
;THIS INSTRUCTION FIRST CHECKS THE STACK POINTER AND, IF THE
;STACK IS EMPTY, FORCES A FALSE RUNG DECISION.  OTHERWISE THE
;STACK IS POPPED TO RESTORE THE ADDRESS OF THE NEXT CONDITIONAL
;INSTRUCTION AND THE RUNG DECISION IS MADE EQUAL TO THE RUNG
;DECISION OF THE LAST RUNG OR'ED WITH THE RESULTS OF THE
;PREVIOUS BRANCHES (THE OR ACCUMULATOR).  IF THE BRANCH RESULT
;IS TRUE (FFFF), THE NEXT INSTRUCTION IS EXAMINED.  OTHERWISE
;THE NEXT CONDITIONAL INSTRUCTION IS FETCHED.
;A LIFO POP IS DONE BY READING FROM THE MEMORY ADDRESSED BY THE
;STACK POINTER, AND THEN INCREMENTING THE STACK POINTER.
;ON INPUT, S3 IS THE DECISION OF THE LAST BRANCH.  ON OUTPUT, IT
;IS THE RESULT OF THE ENTIRE BRANCH.
;REGISTER USAGE:
;             S0-PROGRAM COUNTER
;             S1-ADDRESS OF NEXT CONDITIONAL INSTRUCTION
;             S3-RUNG DECISION (0=FALSE, FFFF=TRUE)
;             S4=OR ACCUMULATOR (0=FALSE, FFFF=TRUE)
;             S13=LIFO STACK POINTER
BND-MAP
        N=S13=#STCKSTRT              ;IF STACK EMPTY, FORCE A
                                     ;FALSE RUNG DECISION
ADDR    N=S13, JUMP FORCE-FALSE      ;BY JUMPING TO FORCE-FALSE.
              CARRY
        S1=RAM READ                  ;RESTORE ADDRESS OF OUTPUT
                                     ;INSTRUCTION FROM STACK.

S3=S3 OR S4, LOAD
              FLUSH-PIPE             ;RUNG DEC=RUNG DEC OR OR ACC.
                                     ;SETUP FOR 2-WAY JUMP.

S13=S13+1, JUMP 2
              FETCH NZERO            ;INC STACK POINTER TO FINISH
                                     ;POP OPERATION.
                                     ;FETCH NEXT INST. IF RUNG IS
                                     ;STILL TRUE.  OTHERWISE
                                     ;GO DIRECTLY TO THE NEXT
                                     ;CONDITIONAL INSTRUCTION BY
                                     ;JUMPING TO FLUSH-PIPE.

FORCE-FALSE
        S3=0, JUMP FLUSH-PIPE        ;FORCE RUNG DECISION FALSE.
                                     ;FETCH THE NEXT CONDITIONAL
                                     ;INSTRUCTION BY JUMPING TO
                                     ;FLUSH-PIPE.
```

---

```
;START OUTPUT BRANCH (STOB)
;THIS INSTRUCTION HAS THE OFFSET FROM THE NEXT INSTRUCTION TO
;THE FIRST OUTPUT INSTRUCTION.  AN NXOB OR OBND OF RUNG MUST
;IMMEDIATELY FOLLOW THE OUTPUT INSTRUCTION.  THE STOB PUSHES THE
;RUNG DECISION ON THE STACK FOR THE FOLLOWING NXOB'S.  IF THE
;RUNG DECISION IS FALSE THE PC IS SET TO THE OUTPUT, OTHERWISE
;THE NEXT INSTRUCTION IS EXECUTED.
;REGISTER USAGE:
;             S0-PROGRAM COUNTER
;             S1-ADDRESS OF OUTPUT INSTRUCTION
;             S3-RUNG DECISION (0=FALSE, FFFF=TRUE)
;             S12-9 OPERAND ADDRESS BITS CALCULATED DURING
;                   INSTRUCTION FETCH
;             S13-LIFO STACK POINTER
```

```
STOB-MAP
              S1=S12 AND #0FF            ;S1=DISPLACEMENT
DATA          N=S3                       ;SET UP STACK DATA
ADDR          S13=S13-1                  ;SET UP STACK ADDRESS
              LOAD FLUSH-PIPE WRITE      ;WRITE RUNG DECISION ON STACK.
                                         ;SETUP FOR 2-WAY JUMP.
              S1=S0+S1, JUMP2 FETCH
                     NZERO               ;CALCULATE ADDRESS OF
                                         ;OUTPUT IN S1 BY ADDING THE
                                         ;OFFSET TO THE PC.
                                         ;FETCH NEXT INSTRUCTION IF
                                         ;RUNG DECISION IS TRUE.
                                         ;OTHERWISE GO DIRECTLY TO
                                         ;THE NEXT CONDITIONAL INST.
                                         ;BY JUMPING TO FLUSH-PIPE.
```

---

```
;OUTPUT BRANCH END (OBND)
;THIS INSTRUCTION REMOVES THE RUNG DECISION SAVED BY THE STOB
;FROM THE STACK.  THIS RECALLS THE DECISION OF A HIGHER LEVEL IN
;NEXTED OUTPUT BRANCHES
;REGISTER USAGE:
;         S3-RUNG DECISION (0=FALSE, FFFF=TRUE)
;         S13-LIFO STACK USED BY BRANCH INSTRUCTIONS
DBND-MAP
ADDR          N=S13                      ;SET UP FOR STACK POP
              S3-RAM READ                ;READ SAVED RUNG DECISION
              S13=S13+1, JUMP FETCH      ;POP STACK, GET NEXT
                                         ;INSTRUCTION
```

---

Program Control Instructions

```
;MASTER CONTROL RELAY (MCR)
;THIS IS THE OUTPUT INSTRUCTION THAT GENERATES THE VALUE OF THE
;MCR REGISTER (=FFFF TRUE, =0000 FALSE).  THIS INSTRUCTION IS
;EXECUTED UNCONDITIONALLY EACH TIME IT IS ENCOUNTERED.  THE
;INSTRUCTION COPIES THE PRESENT STATE OF THE RUNG DECISION INTO
;THE MCR DECISION REGISTER.
;REGISTER USAGE
;         S3-RUNG DECISION (0000=FALSE, FFFF=TRUE)
;         S8-STATE OF MCR (0000=FALSE, FFFF=TRUE)
MCR-MAP
              S8-S3, JUMP FETCH          ;COPY RUNG DECISION TO MCR
                                         ;STATE
```

---

```
;JUMP TO TARGET (JMP)
;THIS INSTRUCTION EXECUTES A CONDITIONAL JUMP TO THE ADDRESS
;SPECIFIED BY THE VALUE OF THE TARGET
JUMP-MAP
              JUMP FETCH
```

```
;CALL SUBROUTINE AT TARGET (CALL)
;THIS INSTRUCTION EXECUTES A CALL TO THE SUBROUTINE AT THE
;ADDRESS SPECIFIED BY THE VALUE OF THE TARGET
CALL-MAP
          JUMP FETCH
```

- - - - - - - - - - - - - - - - - - - - - - - - - - - - - - -

Bit Instructions

```
;XIC ON IMATE TABLE (XIC)
;BIT TEST, THE RUNG DECISION REMAINS TRUE (FFFF) IF THE BIT IS ON
;AND IS SET FALSE (0) IF THE BIT IS OFF.
;REGISTER USAGE:
;         S0-PROGRAM COUNTER
;         S1-ADDRESS OF OUTPUT INSTRUCTION.
;         S3-RUNG DECISION (0=FALSE, FFFF=TRUE)
XIC-MPA
          N=RAM AND MASK READ         ;TEST BIT FROM IMAGE
          N=S1-S0, JUMP FETCH NZERO   ;JUMP IF RUNG STAYS TRUE
          S3=0, JUMP FETCH ZERO       ;SET RUNG COND FALSE,
                                      ;JUMP IF FETCH NEXT INST
          N=S1-S0-1                   ;TEST FOR SKIP ONE INST

EXAMINE
ILOAD     S0=S0+1, JUMP FETCH ZERO    ;SET PC TO SKIP ONE, DO A
                                      ;DUMMY ILOAD, FETCH OUTPUT

N=S1-S0
FETCH     S0=S1, JUMP FETCH PLUS      ;SET FETCH COUNTER TO OUTPUT
ADDR      N=#FETCHISAVE               ;HIGH COUNT MUST ALSO BE
                                      ;CHANGED

FETHI     N=RAM, JUMP FETCH READ      ;SET HIGH FETCH COUNT GOTO
                                      ;FETCH
```

- - - - - - - - - - - - - - - - - - - - - - - - - - - - - - -

```
;OUTPUT ENERGIZE (OTE)
;IF THE RUNG DECISION IS TRUE, THE BIT ADDRESSED IS SET TO A 1,
;OTHERWISE IT IS RESET TO A 0.  THIS INSTRUCTION HAS NO EFFECT ON
;THE RUNG DECISION.  THE DATA TABLE LOCATION IS ONLY UPDATED IF
;THERE IS A CHANGE IN THE ADDRESSED BIT.  NOTIFICATION OF OUTPUT
;CHANGES IS DONE BY SAVING ALL CHANGES FOR A SLOT AND THEN DUMPING
;THE CHANGES FOR THAT SLOT TO THE SCANNER WHEN THE NEXT OUTPUT
;INSTRUCTION REFERENCES A DIFFERENT SLOT.
;OTL ENTERS AT SET.  OTU ENTERS AT RESET.
;REGISTER USAGE:
;         S3-RUNG DECISION (0=FALSE, FFFF=TRUE)
;         S6-HOLDS PREVIOUS SLOT NUMBER
;         S7-HOLDS PREVIOUS SLOT DATA
;         S12-9 OPERAND ADDRESS BITS CALCULATED DURING
;                INSTRUCTION FETCH.
;         Q-SCRATCH REGISTER
OTE-MAP
          N=S3                        ;TEST RUNG CONDITION
          S14=RAM, JUMP SET NZERO
                  READ                ;GET DATA, SET ON IF RUNG
                                      ;TRUE
```

```
RESET                                           ;TURN BIT OFF
DATA      Q=S14 AND NMASK, JUMP OTE-COMMON
SET                                             ;TURN BIT ON
DATA      Q=S14 OR MASK
OTE-COMMON
          N=S6 WRITE                            ;TEST FOR PREVIOUS CHANGE
                                                ;WRITE I/O IMAGE TO CPU RAM
SET-FLAG
          N=S14 XOR Z, JUMP TEST
                       PLUS                     ;JUMP IF PREVIOUS CHANGE
                                                ;CHECK FOR CURRENT CHANGE
          S6=HIGH, JUMP FETCH ZERO              ;SET FLAG TO NO CHANGE
                                                ;JUMP IF NO CHANGE
          S6-S12, JUMP FETCH                    ;SETCHANGE DETECTED FLAG
                                                ;JUMP TO FETCH
                                                ;HANDLE PREVIOUS CHANGE
TEST
BACKD     N=S7                                  ;SET LAST SLOT DATA IN BPLANE
                                                ;LATCH
          N=S6 XOR S12                          ;CHECK FOR SAME SLOT AS LAST
                                                ;CHANGE
          S=7Q, JUMP FETCH ZERO                 ;JUMP IF SAME SLOT AS LAST
                                                ;SAVE PRESENT SLOT DATA
          LL6=S6 + 0100                         ;FIND INDEX TO SCANNER LOOKUP
                                                ;TABLE
ADDR      S6=S6-#1                              ;SET ADDRESS IN LOOKUP TABLE
BACKH     N=RAM         READ                    ;GET AND SET HIGH ADDRESS OF
                                                ;SCANNER
ADDR      N=S6 + 1, JUMP TEST1
                       ZERO                     ;JUMP IF NO SCANNER ASSIGNED
                                                ;TO SLOT
BACKL     N=RAM         READ                    ;GET AND SET LOW ADDRESS OF
                                                ;SCANNER
          CONT          BACKW                   ;WRITE DATA TO SCANNER
TEST1
          N=S14 XOR Q, JUMP
                       SET-FLAG                 ;TEST FOR CURRENT CHANGE
                                                ;SET UP FLAGS FOR NEXT RUNG

- - - - - - - - - - - - - - - - - - - - - - - - - - - - - - - - -

;OUTPUT LATCH (OTL)
;THIS IS THE BIT LATCH INSTRUCTION.  IF THE RUNG DECISION IS
;TRUE, EXECUTION CONTINUES IN THE OT3 MICROROUTINE.  OTHERWISE,
;NO ACTION OCCURS, AND THE NEXT INSTRUCTION IS EXECUTED.  THIS
;INSTRUCTION HAS NO EFFECT ON THE RUNG DECISION.
;REGISTER USAGE:
;                   SAME AS OTE MICROROUTINE
OTL-MAP
          N=S3, LOAD SET                        ;SETUP FOR 2 WAY JUMP.
          S14-RAM, JUMP2 FETCH
                   ZERO READ                    ;READ THE OUTPUT IMAGE
                                                ;FROM RAM INTO S14.
                                                ;IF RUNG IS FALSE, GET
                                                ;NEXT INSTRUCTION
                                                ;ELSE TURN THE OUTPUT
                                                ;ON BY JUMPING TO SET
                                                ;IN THE OTE MICRO-
                                                ;ROUTINE
```

```
;OUTPUT UNLATCH (OTU)
;THIS IS THE BIT UNLATCH INSTRUCTION, IF THE RUNG DECISION
;IS TRUE, EXECUTION CONTINUES IN THE OTE MICROROUTINE TO
;RESET THE ADDRESSED BIT TO A 0.  OTHERWISE, NO ACTION OCCURS,
;AND THE NEXT INSTRUCTION IS EXECUTED.  THIS INSTRUCTION HAS
;NO EFFECT ON THE RUNG DECISION
;REGISTER USAGE:
;                    SAME AS OTE MICROROUTINE
OTU-MAP
            N=S3, LOAD RESET              ;SETUP FOR 2 WAY JUMP.
                                          ;TEST RUNG DECISION.
            S14=RAM, JUMP2 FETCH
                   ZERO READ              ;READ THE OUTPUT IMAGE
                                          ;FROM RAM INTO S14.
                                          ;IF RUNG IS FALSE, GET
                                          ;NEXT INSTRUCTION
                                          ;ELSE TURN THE OUTPUT
                                          ;OFF BY JUMPING TO RESET
                                          ;IN THE OTE MICRO-
                                          ;ROUTINE.
```

TIMER/COUNTER INSTRUCTIONS

```
;COUNTER EQUATES AND MASKS.
CU          = 08000          ;COUNTER UP ENABLED BIT OF
                             ;COUNTER CONTROL WORD.
CD          = 04000          ;COUNTER DOWN ENABLED BIT OF
                             ;COUNTER CONTROL WORD.
OF          = 01000          ;OVERFLOW BIT OF COUNTER
                             ;CONTROL WORD.
UF          = 0800           ;UNDERFLOW BIT OF COUNTER
                             ;CONTROL WORD.
DN          = S2000          ;COUNTER DONE BIT OF COUNTER
                             ;CONTROL WORD.
NOTDN       = ODFFF          ;MASK TO RESET DN BIT.
OFUF        = 01800          ;MASK FOR OVERFLOW AND
                             ;UNDERFLOW BITS
CTU__INC    = 00001          ;COUNTER UP INCREMENT.
CTD__INC    = OFFFF          ;COUNTER DOWN INCREMENT.
RES__CNTRL  = OC1FF          ;MASK TO RESET THE DN, OV, UF,
                             ;EN, ZR COUNTER CONTROL BITS.
```

```
;COUNTER UP (CTU)
;THIS INSTRUCTION INCREMENTS THE ADDRESSED LOCATION EACH TIME THE
;RUNG DECISION BECOMES TRUE.  IT SETS THE CONTROL BITS AS PRE-
;VIOUSLY DESCRIBED. CTU __ MAP IS ENTERED DIRECTLY FROM THE
;CTU INSTRUCTION. CTU __ VECT IS ENTERED WHEN A CTU INSTRUCTION
;IS EXPANDED BY AN ADX.
;
;REGISTER USAGE:
;           S3-RUNG DECISION (0=FALSE, FFFF=TRUE)
;           S5-ACCUMULATED VALUE
;           S6-PRESET VALUE (SAVED ON MACRO STACK)
```

```
;               S7-ACCUMULATED VALUE (SAVED ON MACRO STACK)
;               S8-STATE OF MCR.
;               S9-ADDRESS IN CPU RAM OF THE BASE ADDRESS OF THE
;                   COUNTER AREA IN MAIN MEMORY.
;               S10=-1 FOR COUNTER UP, 0 FOR COUNTER DOWN.
;               S12-MISCELLANEOUS SCRATCH.
;               S15,S14-ADDRESS OF COUNTER STRUCTURE.
;               Q-SCRATCH
CTU __ MAP
        S10=HIGH, JUMP  LCNTR __ CMN   ;FLAG AS COUNTER UP.
                                       ;GO TO COMMON STUFF.
```

---

```
;COUNTER DOWN (CTD)
;THIS INSTRUCTION DECREMENTS THE ADDRESSED LOCATION EACH TIME THE
;RUNG DECISION BECOMES TRUE.  IT SETS THE CONTROL BITS AS PRE-
;VIOUSLY DESCRIBED.  CTD __ MAP IS ENTERED DIRECTLY FROM THE CTD
;INSTRUCTION.  CTD __ VECT IS ENTERED WHEN A CTD INSTRUCTION IS
;EXPANDED BY AN ADX.
;
;REGISTER USAGE:
;               S3-RUNG DECISION (0=FALSE, FFFF=TRUE)
;               S5-ACCUMULATED VALUE
;               S6-PRESET VALUE (SAVED ON MACRO STACK)
;               S7-ACCUMULATED VALUE (SAVED ON MACRO STACK)
;               S8-STATE OF MCR,
;               S9-ADDRESS IN CPU RAM OF THE BASE ADDRESS OF THE
;                   COUNTER SECTION OF MAIN MEMORY.
;               S10=-1 IF COUNTER UP, 0 IF COUNTER DOWN.
;               S12-MISCELLANEOUS SCRATCH.
;               S15,S14-ADDRESS OF COUNTER STRUCTURE.
;               Q-SCRATCH
CTD __ MAP
        S10=0, JUMP  LCNTR __ CMN  ;FLAG AS COUNTER DOWN.
                                   ;GO DO COMMON STUFF.
```

---

```
;CTUCODE SUBROUTINE
;THIS SUBROUTINE HANDLES THE COUNTER UP (CTU) INSTRUCTION.
;
;REGISTER USAGE:
;               S3=RUNG DECISION
;               S5=T/C FLAGS
;               S6=PRESET VALUE
;               S8=STATE OF MCR.
;               S9=INCREMENT (1) FOR COUNTER UP.
;               S7=ACCUMULATED VALUE
;               S10=BIT LOCATION OF OF.
;               S12=BIT LOCATION OF UF.
;               Q=MASK FOR COUNT UP (CU).
;
CTUCODE
        Q=#CU                       ;Q=BIT LOCATION OF CU

S9=#CTU __ INC
```

```
            S10=OF                         ;S10=BIT LOCATION OF OF

S12=UF                         ;S11=BIT LOCATION OF UF

N=S3 AND S8, JUMP COUNT __COM
                                           ;CHECK RUNG DECISION.
                                           ;GO CONTINUE IN COMMON SECTION

&S2
;
;CTDCODE SUBROUTINE
;THIS SUBROUTINE HANDLES THE COUNTER DOWN (CTD) INSTRUCTION.
;
;REGISTER USAGE:
;           S3=RUNG DECISION
;           S5=T/C FLAGS
;           S6=PRESET VALUE
;           S7=ACCUMULATED VALUE
;           S8=STATE OF MCR,
;           S9=INCREMENT (-1) FOR COUNTER DOWN.
;           S10=BIT LOCATION OF UF,
;           S12=BIT LOCATION OF OF.
;           Q=MASK FOR COUNT DOWN (CD).
;
CTDCODE
            Q=#CD                          ;Q=BIT LOCATION OF CD

S10=#UF                        ;S10=BIT LOCATION OF UF

S12=#OF                        ;S12=BIT LOCATION OF OF

S9=#CTD __INC                  ;S9=INCREMENT FOR CTD.

N=S3 AND S8, JUMP COUNT __COM
                                           ;CHECK RUNG DECISION.
                                           ;GO CONTINUE IN COMMON SECTION.

;COUNT __COM SUBROUTINE.
;THIS SUBROUTINE HANDLES THE COUNTER UP AND COUNTER DOWN
;INSTRUCTIONS BASED ON PARAMETERS PASSED TO IT IN REGISTERS
;S9,S10,S12, AND Q.
;
;REGISTER USAGE:
;           S5=T/C FLAGS
;           S6=PRESET VALUE
;           S7=ACCUMULATED VALUE
;           S9=INCREMENT FOR COUNTER.
;           S10=BIT LOCATION OF OVERFLOW/UNDERFLOW BIT
;           S12=BIT LOCATION OF UNDERFLOW/OVERFLOW BIT
;           Q=BIT LOCATION OF OF/UF BIT
;
COUNT __COM
            N=S5 AND Q, JUMP RUNGOFF ZERO  ;CHECK FIRST TIME RUNG
                                           ;IS TRUE.
                                           ;IF RUNG FALSE, JUMP.

N=S7+S9, JUMP ENER NZERO       ;CHECK COUNTER
                                           ;OVERFLOW/UNDERFLOW.
                                           ;IF NOT 1ST TIME, DON'T
                                           ;INC./DEC. ACCUM. VALUE.
```

```
            S7=S7+S9, JUMP OVERUNDER OVER    ;UPDATE ACCUM. VALUE.
                                             ;IF OVERFLOW/UNDERFLOW, JUMP

ENER
        N=S5 AND #OFUF                       ;PREVIOUS OVERFLOW OR
                                             ;UNDERFLOW?
        CALL DOCMP ZERO                      ;IF NOT, TEST ACCUM. AGAINST
                                             ;PRESET IN DOCMP SUBROUTINE.
        S5=S5 OR Q, RET                      ;SET CU/CD BIT

OVERUNDER
        N=S5 AND S12                         ;PREVIOUS UNDERFLOW/OVERFLOW?
        JUMP NOTUNOV ZERO                    ;NO, SET OF/UF BIT.
        S5=NOT S12 AND S5, CALL DOCMP        ;RESET UF/OF BIT
                                             ;TEST ACCUM. AGAINST
                                             ;PRESET IN DOCMP SUBROUTINE.

XIT
        S5=S5 OR Q, RET                      ;SET CU/CD BIT

NOTUNOV
        S5=S5 OR S10, JUMP XIT               ;SET OF/UF BIT

RUNGOFF
        N-S5 AND #OFUF                       ;PREVIOUS OVERFLOW OR
UNDERFLOW?

Q=NOT Q, CALL DOCMP ZERO             ;IF NOT, TEST ACCUM.
                                             ;AGAINST PRESET IN DOCMP
                                             ;SUBROUTINE.
        S5=S5 AND Q, RET                     ;RESET CU/CD
;DOCMP SUBROUTINE
;THIS SUBROUTINE COMPARES THE ACCUMULATED VALUE WITH THE PRESET
;VALUE.  IT SETS OR RESETS THE DN BIT.
;
;REGISTER USAGE:
;              S5=T/C FLAGS
;              S6=PRESET VALUE
;              S7=ACCUMULATED VALUE
;              S12=SCRATCH
;
DOCMP
        S12=#DN                              ;SETUP S12 WITH MASK.

N=S6 XOR S7                          ;CHECK SIGN BITS.

N=S7-S6, JUMP DIFFSIGN MINUS         ;COMPARE ACC. TO PRESET.
                                             ;IF NUMBERS ARE OF
                                             ;DIFFERENT SIGN, GO
                                             ;HANDLE.
RESDN
        S5=NOT S12 AND S5, RET NCARR         ;IF NO CARRY ACCUM. PRESET.
                                             ;RESET DN BIT AND RETURN.
SETDN
        S5=S5 OR S12, RET                    ;OTHERWISE SET DN.

DIFFSIGN
        N=S7, LOAD RESDN                     ;IF ACCUMULATED IS POSITIVE,
                                             ;SET THE DN BIT. OTHERWISE
                                             ;RESET IT.
```

```
        N=0, JUMP2 SETDN PLUS        ;INSURE NCARR CONDITION SO
                                     ;ROUTINE WILL RETURN AT RESDN.

DOCMP
        S12=#DN                      ;SETUP S12 WITH MASK.

N=S6 XOR S7                  ;CHECK SIGN BITS.

N=S7-S6, JUMP DIFFSIGN MINUS ;COMPARE ACC, TO PRESET.
                                     ;IF NUMBERS ARE OF
                                     ;DIFFERENT SIGN, GO
                                     ;HANDLE.
RESND
        S5=NOT S12 AND S5, RET NCARR ;IF NO CARRY ACCUM. PRESET.
                                     ;RESET DN BIT AND RETURN.
SETDN
        S5=S5 OR S12, RET            ;OTHERWISE SET DN.

DIFFSIGN
        N=S7, LOAD RESDN             ;IF ACCUMULATED IS POSITIVE,
                                     ;SET THE DN BIT. OTHERWISE
                                     ;RESET IT.

N=0, JUMP2 SETDN PLUS        ;INSURE NCARR CONDITION SO
                                     ;ROUTINE WILL RETURN AT RESDN.
```

---

Arithmetic and Logical Instructions

```
;LOGICAL INSTRUCTIONS
;
;WORD AND ("AND" WORD AT SOURCE 1 WITH WORD AT SOURCE 2)
AND_MAP
        Q=#NC_SSD
                CALL WORDSTART
        S10=S10 AND S7
        S9=S9 AND S6,   JUMP CWORDFINISH        LATCH

;FILE AND
ANDF_MAP
        Q=#NC_SSD
                CALL FILESTART
AND_NEXT
        S10=S10 AND S7
        S9=S9 AND S6,   CALL CFILEFINISH        LATCH
                        JUMP AND_NEXT
```
---
```
;WORD OR ("OR" WORD AT SOURCE 1 WITH WORD AT SOURCE 2)
OR_MAP
        Q=#NC_SSD
                CALL WORDSTART
        S10=S10 OR S7
        S9=S9 OR S6,    JUMP CWORDFINISH        LATCH
```

```
;FILE OR
ORF_MAP
        Q=#NC_SSD
                            CALL FILESTART
OR_NEXT
        S10=S10 OR S7
        S9=S9 OR S6,        CALL CFILEFINISH    LATCH
                            JUMP OR_NEXT
```

---

```
;WORD MOVE (MOVE WORD FROM SOURCE TO DESTINATION)
MOV_MAP
        Q=#NC_SD
                            CALL WORDSTART
        S9=S9,              JUMP CWORDFINISH    LATCH

;FILE MOVE
MOVE_MAP
        Q=#NC_SD
                            CALL FILESTART
MOV_NEXT
        S9=S9,              CALL CFILEFINISH    LATCH
                            JUMP MOV_NEXT
```

---

```
;LIMIT TEST
LIM_SI_MAP
        Q=#SI_SSD
                            CALL WORDSTART
        N=S6-S9-1
        N=S7-S10-C
                            JUMP SETFLSE CARRY
        S6=S9
        S7=S10,             CALL ADDRESSIT
                            CALL LOADIT
        N=S6-S9-1
        N=S7-S10-C
        S3=HIGH,            JUMP STOP NCARR
        S3=LOW,             JUMP STOP
SETFLSE
        S3=LOW,             JUMP STOP
```

---

```
;WORD & FILE ARITHMETIC INSTRUCTIONS
;
;ARITHMETIC ADDITION
;
;WORD ADD SIGNED INTEGER
ADD_SI_MAP
        Q=#SI_SSD
                            CALL WORDSTART
                            CALL ADD_SI
                            JUMP WORDFINISH
```

```
;WORD ADD FLOATING POINT
ADD_FP_MAP
        Q=#FP_SSD
                                CALL WORDSTART
                                CALL ADD_FP
                                JUMP WORDFINISH

;FILE ADD SIGNED INTEGER
ADDF_SI_MAP
        Q=#SI_SSD
                                CALL FILESTART
ADD_NEXT
                                CALL ADD_SI
                                CALL FILEFINISH
                                JUMP ADD_NEXT

- - - - - - - - - - - - - - - - - - - - - - - - - - - - -

;ARITHMETIC SUBTRACTION
;
;WORD SUBTRACT SIGNED INTEGER
SUB_SI_MAP
        Q=#SI_SSD
                                CALL WORDSTART
                                CALL SUB_SI
                                JUMP WORDFINISH

- - - - - - - - - - - - - - - - - - - - - - - - - - - - -

;ARITHMETIC MULTIPLICATION
;
;WORD MULTIPLY SIGNED INTEGER
MUL_SI_MAP
        Q=#SI_SSD
                                CALL WORDSTART
                                CALL MUL_SI
                                JUMP WORDFINISH

- - - - - - - - - - - - - - - - - - - - - - - - - - - - -

;ARITHMETIC DIVISION
;
;WORD DIVIDE SIGNED INTEGER
DIV_SI_MAP
        Q=#SI_SSD
                                CALL WORDSTART
                                CALL DIV_SI
                                JUMP WORDFINISH

;WORD DIVIDE FLOATING POINT

;FILE DIVIDE FLOATING POINT
DIVE_SI_MAP
        Q=#SI_SSD
                                CALL FILESTART
```

```
DIV_NEXT
                        CALL DIV_SI
                        CALL FILEFINISH
                        JUMP DIV_NEXT
```

---

```
;ARITHMETIC SQUARE ROOT
;
;WORD SQUARE ROOT SIGNED INTEGER
;SQR_SI_MAP
         Q=#SI_SD
                        CALL WORDSTART
                        CALL SQR_SI
                        JUMP WORDFINISH
;FILE SQUARE ROOT SIGNED INTEGER
;SQRF_SI_MAP
         Q=#SI_SD
                        CALL FILESTART
SQR_NEXT
                        CALL SQR_SI
                        CALL FILEFINISH
                        JUMP SQR_NEXT
```

---

Routines Employed by Arithmetic & Logic Instructions

```
;WORD START
;ROUTINE TO HANDLE THE SETUP FOR WORD INSTRUCTIONS, ALSO
   TESTS RUNG DECISION
;IF THE RUNG IS FALSE THE INSTRUCTION IS EXITED, IF TRUE,
   NEXT S0 IS COMPUTED
;ONE OR TWO SOURCES ARE ADDRESSED, DATA IS LOADED AND A
   RETURN IS EXECUTED.

WORD START
         N=S3 AND S8
                  JMPOP DUMP_PIPE ZERO      ;JUMP IF RUNG IS FALSE
                  CALL NEXT_S0              ;GET NEXT S0 SAVE S13
ADDR     N=#WORDRWCTRL          WRITE       ;NEXT VALUE OF PC
DATA     S11=Q
         N=S11 AND #SD          WRITE       ;READ WRITE CONTROL
                  JUMP ONEWSRC NZERO        ;JUMP IF ONE SOURCE
TWOWSRC
                  CALL SAVE67               ;SAVE REGISTERS 6 AND 7
                  CALL ADDRESSIT            ;SET ADDRESS
                  CALL LOAD                 ;LOAD DATA
         S6=S9                              ;SAVE DATA
         S7=S10
ONEWSRC
                  CALL ADDRESSIT            ;SET ADDRESS
                  JUMP LOAD                 ;LOAD DATA
                                            ;RETURN IS DONE FROM LOAD
```

;ROUTINE TO HANDLE WORD INSTRUCTIONS FINISHING, GOES DIRECTLY
  TO FETCH
;SAVES THE DATA, ADDRESSES THE DESTINATION, READS THE DATA
  BACK FROM RAM,
;STORES THE DATA AT THE PROPER MAIN MEMORY ADDRESS, RESTORES
  REGISTERS 6 & 7
;IF NECESSARY, THEN JUMPS TO FETCH.

```
WORDFINISH
ADDR      N=S13-#5
DATA      N=S10
ADDR      N=S13-#6              WRITE     ;DATA HIGH
DATA      N=S9
          CALL ADDRESSIT        WRITE     ;DATA LOW
          CALL REFRAM
          CALL STOREIT                    ;WRITE DATA

ADDR      N=#WORDRWCTRL
          N=RAM AND #SD         READ      ;READ-WRITE CONTROL
                                           WORD
          CALL RESTR67 ZERO               ;CALL IF 6&7 SAVED
          JMPOP FETCH                     ;GO TO NEXT INSTRUCTION
```

- - - - - - - - - - - - - - - - - - - - - - - - - - - -

;THIS ROUTINE LOADS DATA WHO'S ADDRESS IS POINTED TO BY THE
; REGISTER POINTER'S CURRENT DATA BLOCK ADDRESS
;         N-1   DATA TABLE SECTION
;         N-2   INCREMENT VALUE
;         N-3   ADDRESS HIGH
;         N-4   ADDRESS LOW
;         N-5   DATA HIGH
;         N-6   DATA LOW

```
LOAD
  ADDR    N=S13-#4
  BACKL   S14=RAM               READ      ;ADDRESS LOW
  ADDR    N=S13-#3
  BACKH   S15=RAM               READ      ;ADDRESS HIGH
LOAD_COM
          JUMP LOADFROMCPU PLUS
  ADDR    N=S13-#1              BRH       ;DATA
          S9=DATA,              HOLD

S2=RAM-#6             READ DA   ;SECTION NUMBER
          S10=LOW,
          JUMP NOT6L NZERO      HOLD      ;JUMP IF NOT SECT 6
  BACKL   N=S14+1               HOLD
  BACKH   N=S15+C               HOLD
          CONT                  BACKR DA  ;DATA 2ND WORD
          S10=DATA,
          CALL INTER IVECT      DA
SKIPIT
  ADDR    N=#WORDRWCTRL         BACKR     ;DUMMY READ
          N=RAM AND #SICONV     READ      ;RWCONTROL
          CALL CONVERTFR N ZERO           ;CONVERT IF NECESSARY
```

```
SKIP_CONVER
  ADDR      N=S13-#5
  DATA      S10=S10
  ADDR      N=S13-#6                WRITE     ;DATA HIGH
  DATA      S9=S9
            RET                     WRITE     ;DATA LOW

S_LOAD
  BACKL     S14=S9
  BACKH     S15=S10, JUMP LOAD_COM

LOADFROMCPU
  ADDR      S9=S14
  DATA      S9=RAM                  READ      ;DATA LOW
            S10=LOW,
            JUMP SKIP_CONVER                  ;DATA HIGH = 0
NOT6L
            N=S2-#6
            JUMP SKIPIT NZERO                 ;JUMP IF NOT SECT12
TN12L
  ADDR      N=#WORDRWCTRL
            N=RAM AND #CONV         READ      ;READ WRITE CONTROL
            JUMP SKIPIT NZERO
  ADDR      N=#POINTERFLG
            S2= -RAM                READ      ;POINTER FLAG
            S2=S2+1, JUMP LSECTION ZERO
                     JUMP LFILE ZERO
  BACKL     N=S14+1
  BACKH     N=S15+C
            S10=LOW                 BACKR DA;2ND DATA WORD
            S9=DATA AND #WORDMASK   DA
                     RET
LSECTION
            LL9=BFLOP
            LL9=S9
            LL9=S9
            LL9=S9
            S9=S9 AND #SECTIONMASK
                     RET
LFILE
            S9=S9 AND #FILEMASK
                     RET

- - - - - - - - - - - - - - - - - - - - - - - - - - -

STOREIT
  ADDR      N=#WORDRWCTRL
            N=RAM AND #SICONV       READ      ;RWCONTROL
            CALL CONVERTTO NZERO
STORENC
  ADDR      N=S13-#4
  BACKL     S14=RAM                 READ      ;ADDRESS LOW
  ADDR      N=S13-#3
  BACKH     S15=RAM                 READ      ;ADDRESS HIGH
STOREA
  BACKD     N=S9, JUMP STOREINCPU PLUS        ;DATA LOW
  ADDR      N=S13-#1
            S2=RAM-#6               READ      ;SECTION #
            JUMP NOTS6 NZERO                  ;JUMP IF NOT SECTION 6
            CONT                    BWH
```

```
BACKL      N=S14+1                    HOLD
BACKH      N=S15+C                    HOLD
BACKD      N=S10                      HOLD      ;DATA 2ND WORD
                      RET             BACKW     ;DATA 2ND WORD
S-STORE
  BACKL    S14=S9
  BACKH    S15=S10,   CALL REFRAM
           S15=S15,   JUMP STOREA
STOREINCPU
  ADDR     N=S14
  DATA     N=S9
  ADDR     N=#S1FOFLG                 WRITE     ;DATA TO CPU RAM
NOTIFY
           S14=RAM                    READ      ;TEST FOR OUTPUT IMAGE
                                                 TABLE
           RL2=S14,   RET ZERO                  ;RETURN IF IN INPUT TABLE
                                                ;NOTIFICATION OF SCANNER
                                                ;ROUTINE FOR THIS
                                                 RACK/SLOT

RL2=S2
           S2=S2 AND #01FE
                                                ;INDEX INTO SCANNER MAP
  ADDR     S2=S2+#0200                          ;SCANNER ADDRESS HIGH
           S5=RAM                     READ
  ADDR     N=S2+1,    RET ZERO                  ;RETURN IF NO SCANNER
           S14=S14 AND #07
  BACKL    N=RAM+S14                  READ      ;SCANNER ADDRESS LOW
  BACKH    N=S5+C
                      RET             BACKW     ;NOTIFY SCANNER

NOTS6
           N=S2-#6
                      JUMP INS12 ZERO
  ADDR     N=#S1F0FLG
                      JUMP NOTIFY BACKW         ;DATA, WRITE IF NOT
                                                 SECT 12
                                                ;NOTIFY SCANNER IF IN
                                                 OUTPUT IMAGE

INS12
  ADDR     N=#WORDRWCTRL
           N=RAM AND #CONV            READ      ;RW CONTROL
                      JUMP INS12CONV NZERO
                      RET             BACKW     ;NO SPECIAL CASE WRITE
                                                 DATA

INS12CONV
  ADDR     N=#POINTERFLG
           S2=-RAM                    READ      ;POINTER FLAG
           S2=S2+1,
                      JUMP SECTION ZERO BRH     ;READ DATA IN SECTION
                                                 12
                                                ;JUMP IF MODIFY OF
                                                 SECTION #
                      JUMP FILE ZERO  HOLD      ;JUMP IF MODIFY OF
                                                 FILE#
WORD
  BACKL    N=S14+1
  BACKH    N=S15+C
           S9=S9 AND #WORDMASK        BRH    DA ;SECOND WORD
                                                ;MAKE SURE WORD # FITS
           S2=DATA AND #NWORDMASK     DA        ;MASK OFF WORD #
```

```
BACKD      N=S2 OR S9
                           RET         BACKW       ;NEW WORD POINTER
FILE
           S9=S9 AND #FILEMASK         HOLD        ;MAKE SURE IT FITS
           S2=DATA AND #NFILEMASK      HOLD        ;MASK OFF FILE #
BACKD      N=S2 OR S9                  HOLD        ;PUT IN FILE #
                           RET         BACKW       ;NEW FILE POINTER

SECTION
           S2=DATA                     HOLD
           LL9=BFLOP                   HOLD
           LL9=S9                      HOLD        ;PUT SECTION # INTO MSBS
           LL9=S9                      HOLD
           LL9=S9                      HOLD
           S9=S9 AND #SECTIONMASK      HOLD        ;MAKE SURE IT FITS
           S2=S2 AND #NSECTIONMASK
                                       HOLD        ;MASK OFF SECTION #
BACKD      N=S2 OR S9                  HOLD        ;PUT IN SECTION #
                           RET         BACKW       ;NEW SECTION POINTER

----------------------------------------

;ENTRANCE POINT FOR CONVERSION FROM THE DATA TABLE TYPE
CONVERTER
    ADDR    N=S13-#1
            N=RAM                                  READ
                           JUMP TYPESER ALU16
;ENTRANCE POINT FOR CONVERSION TO THE DATA TABLE TYPE
CONVERTTO
    ADDR    N=S13-#1
            N=RAM                                  READ
                           JUMP TYPESTO ALU16
&A16
TYPESFR
                           RET                     ;SECTION 0
                           RET                     ;SECTION 1
                           RET                     ;SECTION 2
                           JUMP BIN_SI             ;SECTION 3
                           JUMP SI16_SI32          ;SECTION 4
                           JUMP SI16_SI32          ;SECTION 5
                           JUMP FLOAT_SI           ;SECTION 6
                           JUMP BCD_SI             ;SECTION 7
                           JUMP BIN_SI             ;SECTION 8
                           JUMP BIN-SI             ;SECTION 9
                           JUMP BIN_SI             ;SECTION 10
                           RET                     ;SECTION 11
                           JUMP BIN_SI             ;SECTION 12
                           RET                     ;SECTION 13
                           RET                     ;SECTION 14
                           RET                     ;SECTION 15
TYPESTO
                           RET                     ;SECTION 0
                           RET                     ;SECTION 1
                           RET                     ;SECTION 2
                           JUMP SI_BIN             ;SECTION 3
                           JUMP SI32_SI16          ;SECTION 4
                           JUMP SI32_SI16          ;SECTION 5
                           JUMP SI_FLOAT           ;SECTION 6
                           JUMP SI_BCD             ;SECTION 7
                           JUMP SI_BIN             ;SECTION 8
```

```
            JUMP SI_BIN          ;SECTION 9
            JUMP SI_BIN          ;SECTION 10
            RET                  ;SECTION 11
            JUMP SI_BIN          ;SECTION 12
            RET                  ;SECTION 13
            RET                  ;SECTION 14
            RET                  ;SECTION 15
```

---

```
;ROUTINES FOR CONVERSION TO AND FROM DOUBLE PRECISION SIGNED
INTEGER
 SI16_SI32
            S9=S9
            S10=LOW,    RET PLUS
            S10=HIGH,   RET

SI32_SI16
            S10=S10
            N=S10 + 1,  JUMP PSI32JMP ZERO
            S9=S9,      JUMP MSI32JMP ZERO
                        JUMP CONV_ABORT
PSI32JMP
            N=S9
                        RET PLUS
                        JUMP CONV_ABORT
MSI32JMP
                        RET MINUS
                        JUMP CONV_ABORT
```

---

```
;<<CONVERT BCD TO SIGNED INTEGER (RANGE 0 TO 9999)>>
 PCD_SI
            Q=S9                            ;SAVE DATA
            S9=LOW                          ;CLEAR WORKING REGISTERS
            S10=LOW,    LOAD 3
 RCDA_SI
            LL9Q=S9,    AGAIN BCDA_SI       ;GET MSD INTO S9
                                            ;S9 HOLDS RUNNING
 RCDB_SI                                     ANSWER
                                            ;3 MORE DIGITS TO DO
            PUSH 2                          ;RESET S10
            S10=LOW                         ;GET NEXT 4 BITS IN S10
            LL10Q=S10
            LL10Q=S10
            LL10Q=S10
            LL10Q=S10
            S9=S9+S9                        ;MULTIPLY PREVIOUS
                                             RUNNING
            S14=S9                          ; ANSWER BY 10
            S14=S14+S14
            S14=S14+S14                     ;S14 HOLD 8 TIMES
                                             PREVIOUS
            S9=S14+S9                       ;S9 HOLDS TWICE PREVIOUS
            S9=S9+S10,  BACK                ;PREVIOUS X10 PLUS NEXT
                                             DIGIT
 GOBACK
            S10=LOW                RET      ;DONE RETURNS POSITIVE
                                             VALUE
```

```
;<<CONVERT SIGNED INTEGER TO BCD (RANGE 0 TO 9999)>>
SI_BCD
          S14=S9                                  ;COPY SIGNED INTEGER
                                                   TO S14

Q=LOW,   JUMP BCD_ABORT MINUS           ;JUMP IF TOO BIG/SMALL
          N=S14-#10000                            ;TEST FOR GREATER
                                                   THAN 9999
          S9=LOW , JUMP BCD_ABORT PLUS            ;CLEAR S9HOLDS RESULTANT
          S5=#4                                   ;SET DIGIT COUNTET TO 4
          S15=#1000                               ;INITIALIZE TO THOUSANDS
SI_BCDA                                            PLACE
          S14=S14-S15                             ;DETERMINE DIGIT IN
                                                   THIS PLACE
          S9=S9+1  JUMP SI_BCDA PLUS              ;REPEAT TILL DONE
          S14=S14+S15,     LOAD 3                 ;ADJUST FOR EXTRA
                                                   SUBTRACT
          S9=S9-#1
          S5=S5-#1                                ;DECREMENT & TEST COUNT
          S10=LOW,      RET ZERO                  ; FOR DONE
ROTRES
          LL9Q=S9,          AGAIN ROTRES          ;SHIFT RESULT LEFT 4
          N=S5-#1                                  BITS
          S15=Q+1,    JUMP SI_BCDA ZERO           ;JUMP IF 1'S DIGIT NEXT
          S15=#10                                 ;SET TO 10'S DIGIT
          N=S5-#2
          Q=LOW,      JUMP SI_BCDA ZERO           ;JUMP IF 10'S DIGIT NEXT
          S15=#100                                ;SET TO 100'S DIGIT
          Q=LOW,      JUMP SI_BCDA                ;JUMP 100'S DIGIT NEXT
BCD_ABORT
          N=S10
                      JUMP SM_ABORT MINUS
                      JUMP BIG_ABORT
```

- - - - - - - - - - - - - - - - - - - - - - - - - - - -

APPENDIX C

Microprograms for Filestart and Filefinish Routines

```
FILESTART
                    CALL NEXT_S0           ;GET
    ADDR    N=#FIRSTTIME                   ;TEST FOR PRESCAN
            N=RAM                  READ    ;FIRSTTIME
                    JUMP STOP NZERO        ;STOP IF IN PRESCAN
    ADDR    N=#WORDRWCTRL
    DATA    N=Q
    ILOAD   S0=S0+1                WRITE   ;READWRITE CONTROL
            Q=LOW,  CALL INTER IVECT       ;GET FILE CONTROL WORD
            N=INSTR AND #04000
            S9=INSTR, JUMP ONELONG ZERO    ;JUMP IF FILE CONTROL
                                            IS 1
                                           ;WORD
TWOLONG                                    ;LOAD 2ND WORD OF FILE
    ILOAD   S0=S0+1                        ;CONTROL
                    CALL INTER IVECT       ;COUNTER # INTO S15
            S15=INSTR AND #07FFF           ;RATE/MODE INTO S14
            S14=S9 and #03FFF
                    JUMP HAVE_EM ONELONG
            S15=S9 AND #03FF               ;COUNTER #
            RL9=BFLOP
            RL14Q=S9 AND #001E             ;MOVE RATE/MODE TO LSBITS ;COMPUTE COUNTER ADDRESS
HAVE_EM                                    ;ON ENTRY S15= COUNTER#
                    CALL S_COMP_CTR_ADR    ;         S14=RATE BACKL   N=S2+1
    BACKH   N=S5+C
                    CONT    BACKR DA;READ PRESET VALUE
            Q=DATA, CALL INTER IVECT  DA
    BACKL   N=S2+#2
    BACKH   N=S5+C
                    CONT    BACKR DA;READ ACCUMULATED VALUE
            Q=Q-DATA, CALL INTER IVECT DA;CALCULATE WORDS
                                            REMAINING
                                           ;IN FILE
    BACKL   S2=S2
    BACKH   S5=S5
            N=S9 AND #08000        BACKR DA;READ CONTROL WORD
            S15=DATA, JUMP TOBEORNOT NZERO
                                   DA      ;JUMP IF DISTRIBUTED
                                           ;MODE SPECIAL
            S14=-S14
            S14=S14+1
            S14=S14+1, JUMP INST_ABORT PLUS;JUMP IF MODE NOT ALLOWED
            S14=S14+1, JUMP COMPLETE ZERO  ;JUMP IF COMPLETE MODE
            S14=S14+1, JUMP NOINCREMENT ZERO
                                           ;JUMP IF "NONE" MODE ;OTHERWISE INCREMENTAL
INCREMENTAL                                ;MODE
            N=S15 AND #FILEDONEBIT
            N=S3 and S8,   JUMP DBSET
                           NZERO           ;JUMP IF DONE BIT SET
```

```
           DATA    S14=S14+1   JUMP INCT NZERO        ;SET RATE = 1
                                                      ;JUMP IF RUNG TRUE
INCF                                                  ;RUNG FALSE
  BACKD          N=S15 AND  #RES_EN
                             JUMP STOP     BACKW      ;RESET ENABLED BIT
INCT                                                  ;RUNG TRUE
                 N=S15 AND  #FILEENABIT
                             JUMP STOP   NZERO        ;JUMP IF ENABLED
  ADDR           N=S13-#3
                             JUMP SETENABIT WRITE    ;RATE
                                                      ;SET ENABLE AND DO IT

COMPLETE                                              ;
           S14=Q,         JUMP RATELTTODO             ;RATE = TODO FOR COMPLETE
                                                      ;JUMP

NONINCREMENT                                          ;
  ADDR     N=#WORDRWCTRL
  DATA     N=RAM OR #NOINCBIT        READ             ;RW CONTROL
           N=S3 and S8,     LOAD SETENABIT
           S14=S14+1,       JUMP2 STOP ZERO
                                       WRITE          ;RW CONTROL, NO INC
                                                       BIT SET
                                                      ;SET RATE = 1
                                                      ;JUMP IF RUNG FALSE
                                                      ;OTHERWISE JUMP TO
TOBEORNOT                                             ;SETUPDONE
           N=Q-S14
                             JUMP RATELTTODO PLUS    ;IF TODO RATE<THEN
           S14=Q                                      ;SET RATE=TODO
RATELTTODO
  DATA     S14=S14
  ADDR     N=S13-#3
           N=S15 AND #FILEDONEBIT WRITE              ;PUSH RATE
           N=S3 AND S8,    JUMP DBSET NZERO          ;JUMP IF DONE BIT SET
                           JUMP SETENABIT NZERO      ;JUMP IF RUNG TRUE
           N=S15 AND #FILEENABIT
                           JUMP SETUPDONE NZERO      ;JUMP IF ALREADY STARTED
                           JUMP STOP                 ;DONT DO ANY THING DBSET                                                 ;DONE BIT SET
                       JUMP DBSETT NZERO             ;JUMP IF RUNG TRUE
DBSETF
  BACKD    N=S15 AND  #RES_DN_FD_EN
                             CONT          BACKW     ;RESET DONE AND ENABLE
                                                      BITS
  BACKL    N=S2+#2
  BACKH    N=S5+C
  BACKD    N=LOW                                     ;CLEAR ACCUMULATED
                       JUMP STOP    BACKW            ;JUMP DBSETT                                                ;DONE BIT SET, RUNG TRUE
           N=S15 AND  #FILEENABIT
  BACKD    N=LOW,      JUMP STOP   NZERO             ;STOP IF ENABLE BIT SET
  BACKL    N=S2+#2                                   ;CONTINUE IF NOT SET
  BACKH    N=S5+C
                       CONT         BACKW            ;RESET COUNTER AC-
                                                      CUMULATED
  BACKH    N=S5
  BACKL    N=S2
```

```
                   N=S15 AND #RES_DN_EN           ;RESET DONE BIT
SETENABIT
   BACKD          S15=S15 OR #FILEENABIT          ;SET FILE ENABLE BIT
                              CONT      BACKW    ;FILE CONTROL WORD
SETUPDONE
                              CALL INTER IVECT
                   N=S14
                              JUMP STOP ZERO
                   S13=S13-#3
   ADDR            N=#WORDRWCTRL
                   N=RAM AND #S_OR_SD     READ   ;READWRITE CONTROL FLAGS
                              JUMP ONESRC NZERO
TWOSRC
                              CALL SAVE67        ;SAVE S6 and S7
                              CALL ADDRESSIT     ;SET UP ADDRESS
                              CALL MODIFY        ;CHANGE IF NECESSARY
                              CALL LOAD          ;LOAD SOURCE DATA
                   S6=S9                          ;SAVE DATA
                   S7=S10
                   S13=S13-#6                     ;CHANGE STACK POINTER
ONESRC
                              CALL ADDRESSIT     ;SET UP ADDRESS
                              CALL MODIFY        ;CHANGE IF NECESSARY
   ADDR            N=#WORDRWCTRL
                   N=RAM AND #SS          READ   ;READWRITE CONTROL WORD
                              JUMP LOADSRC2 NZERO
                   N=RAM AND #S           READ
                              JUMP READYORNOT NZERO
                   S13=S13-#6
DESTINATION
                              CALL ADDRESSIT     ;SET UP ADDRESS
                              CALL MODIFY        ;CHANGE IF NECESSARY
                   S13=S13+#6
LOADSRC2
                              CALL LOADIT        ;LOAD SOURCE DATA
READYORNOT
                   S13=S13-#6
                   Q=Q
                              RET

----------------------------------------

;THIS ROUTINE HANDLES THE FINISHING OF A FILE INSTRUCTION AND
;THE DECISION TO JUMP TO FETCH OR TO RETURN TO COMPLETE
;ANOTHER PASS THROUGH THE INSTRUCTION

FILEFINISH
                              CALL STOREIT
   ADDR            N=#WORDRWCTRL
                   N=RAM AND #NOINCBIT    READ   ;RW CONTROL WORD
                              JUMP STOP NZERO

S_FDONE                                          ;SET UP S13 POINTER
   ADDR            S13=#OLDS13
                   S13=RAM                READ   ;OLD VALUE OF S13
   ADDR            N=S13-#1
                   S15=RAM                READ   ;COUNTER ADDRESS HIGH
   ADDR            N=S13-#2
   BACKL           S14=RAM+1              READ   ;COUNTER ADDRESS LOW
   BACKH           S15=S15+C
                              CONT       BACKR DA;READ COUNTER PRESET
```

```
                S2=DATA      CALL INTER IVECT
                                        DA
BACKL      S14=S14+1
BACKH      S15=S15+C
                             CONT       BACKR DA ;READ COUNTER AC-
                                                  CUMULATED
BACKD      S5=DATA+1                    DA       ;INCREMENT ACCUMULATED
           N=S5-S2                      BACKW    ;UPDATED COUNTER ACCUM.
                JUMP SETDONEBIT CARRY
                                        DA       ;JUMP IF PRE = ACU
ADDR       S13=S13-#3
DATA       N=RAM-#1                     READ     ;DECREMENT RATE COUNT
                JUMP STOP ZERO          WRITE    ;JUMP IF DONE
                CALL REFRESHIT                   ;REFRESH S1
ADDR       N=#WORDRWCTRL
           N=RAM AND #SD                READ     ;READ WRITE CONTROL
                JUMP REFRDEST NZERO
           S13=S13-#6
           S6=S9
           S7=S10,     CALL REFRESHIT            ;REFRESH S2
REFRDEST
           S13=S13-#6                            ;REFRESH DESTINATION
                                                  ADDR
ADDR       N=S13-#2
           S9=RAM                       READ     ;INCREMENT VALUE
                JUMP REFRDEST1 ZERO              ;JUMP IF ADDR NOT
                                                  CHANGING
                CALL MOD_ADDR1                   ;MODIFY ADDRESS
REFRDEST1
           S13=S13+#6                            ;POINT TO SOURCE 2 DATA
ADDR       N=S13-#5                              ;POINT TO HIGH DATA
           S10=RAM                      READ     ;LOAD HIGH DATA
ADDR       S13=S13-#6                            ;POINT TO LOW DATA AND
                                                 ;POINT S13 TO DESTI-
                                                  NATION
           S9=RAM,     RET              READ     ;LOAD LOW DATA, RETURN
SETDONEBIT
 BACKL     S14=S14-#2
 BACKH     S15=S15-#0-C
           CONT                         BRH      ;CONTROL WORD
BACKD      N=DATA OR #FILEDONEBIT HOLD
                JUMP STOP               BACKW    ;CONTROL WORD
```

We claim:
1. A programmable controller which comprises:
a data table for storing data of different types in respective data table sections;
memory means for storing a control program which includes arithmetic instructions that operate on data in different data table sections; and
a processor for sequentially reading the control program instructions from the memory and operating upon data stored in the data table, the processor including;
 (a) means responsive to a source operand address associated with an arithmetic instruction read from the memory means, for reading data from an indicated data table section and converting it to a native data type;
 (b) means responsive to the last named means and to an operation code associated with an arithmetic instruction read from the memory means, for performing the indicated arithmetic function on source data which has been converted to the native data type; and
 (c) means responsive to the last named means, and to a destination operand address associated with an arithmetic instruction read from the memory means, for converting the data which results from the arithmetic operation from the native data type to the data type of the data table section indicated by the destination operand address and for writing the converted data to the indicated data table section.

2. The programmable controller as recited in claim 1 which includes:
an image table for storing data of various data types which is input from sensing devices connected to the programmable controller;
means coupled to the image table for inputting data from the sensing devices and storing it in the image table;
and in which the processor further includes:
 (d) means responsive to a control program instruction read from the memory means for reading addressed data from the image table and writing it to the data table section which stores its data type.

3. The programmable controller as recited in claim 2 in which the processor further includes:
 (e) means responsive to a control program instruction read from the memory means for reading addressed data from the data table and writing it to the image table.

4. In a programmable controller which inputs data of various types from sensing devices connected to it and performs operations on such data in response to instructions in a stored control program, the improvement therein comprising:
a data table having a plurality of sections, each of which stores data of a particular type;
means responsive to instructions in the control program for storing the input data from sensing devices in the data table section which stores the same data type;
means for executing instructions in the control program which includes means for converting source data read from a data table section to a native data type, means for performing operations on the converted source data, means for converting the data resulting from one of said operations to the data type of a destination section of said data table, and means for writing said converted result data to the destination section of said data table.

5. The programmable controller as recited in claim 4 in which the operation performed is indicated by an operation code in the instruction being executed, the source data table section is selected by a source operand address in the instruction being executed, and the destination data table section is selected by a destination operand address in the instruction being executed.

6. The programmable controller as recited in claim 4 in which the means for storing input data in the data table includes:
an image table for storing input data at locations associated with each of the sensing devices;
scanner means for continuously inputting data from the sensing devices and storing the data in the associated image table location; and
means responsive to instructions in the control program for moving input data from selected locations in the image table to selected data table sections.

7. The programmable controller as recited in claim 4 in which operating devices connect to the programmable controller, and the programmable controller includes means responsive to instructions in the control program for outputting data from selected data table sections to operating devices which employ the same data type.

8. In a programmable controller having a processor which continuously and repeatedly scans a stored control program by reading and executing instructions in the stored control program to input data from sensing devices, perform logical operations on such data, and output the data which results from such logical operations to operating devices, the improvement therein comprising:
file execution means forming part of the processor for executing file instructions which form part of the control program and which require operation on data files comprised of a plurality of separately addressable data elements, said file execution means including:
 (a) detector means for detecting the presence of a first code in a file instruction read from the control program by said processor, which code indicates that the file operation is to be carried out in a distributed mode;
 (b) rate means coupled to the detector means for detecting the presence of a rate code in the file instruction read from the control program by said processor, which rate code indicates the number of file data elements to be operated upon during each scan through the control program;
 (c) transfer means coupled to the detector means for detecting the presence of a transfer code in the file instruction read from the control program by said processor, which transfer code indicates the total number of file data elements to be operated upon;
 (d) counter means for storing an indication of the file data elements which have been operated upon;
 (e) operation means coupled to the counter means, the transfer means and the rate means for performing an operation on a number of file data elements which have not been operated upon, said number being determined by said rate code; and
 (f) means coupled to the counter means, the transfer means and the operation means for detecting when all file data elements have been operated upon; wherein operations on data files may be performed over a plurality of scans through the control program to thereby distribute their execution time.

9. In a programmable controller having a processor which reads instructions from a control program and executes them to examine the state of input devices and control the state of output devices, the improvement which comprises:

memory means connected to the processor for storing a data table having a plurality of sections, each section storing a specific data type;

wherein said processor includes means for addressing sections of said data table and means for reading data from and writing data to addressed sections of the data table and means for converting the data type read from one section into the data type of other sections such that processing of data in the data table is accomplished with automatic conversion of data types.

10. In a programmable controller which stores a control program comprised of a series of control instructions that direct a processor to examine the state of input devices and operate output devices, and in which the processor repeatedly and continuously scans the control program to provide prompt responses to changes in the states of input devices, the improvement comprising:

addressable storage means coupled to the processor for storing a data file comprised of a plurality of separately addressable lines; and means associated with said processor for executing a file control instruction in said control program that directs a function to be performed on said data file, said executing means comprising:

(a) means for reading a rate number in said file control instruction;

(b) means for storing said rate number;

(c) means for performing the function indicated by said file control instruction during each scan through the control program on successive portions of said data file, and wherein the number of lines in each portion is determined by the stored rate number.

* * * * *